(12) United States Patent
Goldsmith et al.

(10) Patent No.: US 12,420,434 B1
(45) Date of Patent: Sep. 23, 2025

(54) KINEMATICS OF A MECHANICAL END EFFECTOR

(71) Applicant: Figure AI Inc., San Jose, CA (US)

(72) Inventors: Jake Goldsmith, San Jose, CA (US);
Michael Stevens, San Jose, CA (US);
Jacob Daniel Webb, San Jose, CA (US)

(73) Assignee: FIGURE AI INC., San Jose, CA (US)

( * ) Notice: Subject to any disclaimer, the term of this patent is extended or adjusted under 35 U.S.C. 154(b) by 0 days.

(21) Appl. No.: 19/223,945

(22) Filed: May 30, 2025

Related U.S. Application Data

(63) Continuation of application No. PCT/US2025/010425, filed on Jan. 6, 2025.

(60) Provisional application No. 63/573,226, filed on Apr. 2, 2024, provisional application No. 63/561,315, filed on Mar. 5, 2024, provisional application No. 63/620,633, filed on Jan. 12, 2024, provisional application No. 63/617,762, filed on Jan. 4, 2024.

(51) Int. Cl.
*B25J 15/00* (2006.01)
*B25J 15/02* (2006.01)

(52) U.S. Cl.
CPC ....... *B25J 15/0009* (2013.01); *B25J 15/0213* (2013.01)

(58) Field of Classification Search
CPC ............................ B25J 15/0009; B25J 15/0213
See application file for complete search history.

(56) References Cited

U.S. PATENT DOCUMENTS

| | | |
|---|---|---|
| 5,394,766 A | 3/1995 | Johnson |
| 7,024,276 B2 | 4/2006 | Ito |
| 7,308,336 B2 | 12/2007 | Takenaka |
| 7,319,918 B2 | 1/2008 | Takenaka |
| 7,379,789 B2 | 5/2008 | Takenaka |
| 7,386,364 B2 | 6/2008 | Mikami |
| 7,664,569 B2 | 2/2010 | Shimizu |
| 7,864,159 B2 | 1/2011 | Sweetser |
| 8,511,964 B2 | 8/2013 | Linn |
| 8,660,695 B2 | 2/2014 | De La Rosa Tames |
| 8,770,749 B2 | 7/2014 | Mccabe |
| 9,134,547 B2 | 9/2015 | Mccabe |
| 9,205,556 B1 | 12/2015 | Magnusson |
| 9,205,560 B1 | 12/2015 | Edsinger |
| 9,346,165 B1 | 5/2016 | Metzger |

(Continued)

FOREIGN PATENT DOCUMENTS

| | | |
|---|---|---|
| CN | 102357889 | 2/2012 |
| CN | 209615545 | 11/2019 |

(Continued)

OTHER PUBLICATIONS

International Search Report and Written Opinion for PCT/US2025/010425 dated May 7, 2025.

(Continued)

*Primary Examiner* — Stephen A Vu

(57) ABSTRACT

A mechanical end effector for a humanoid robot includes a plurality of identical finger assemblies. Each of the finger assemblies is removably connected to a frame. Each of the finger assemblies is fully self-contained and operable independently of every other one of the finger assemblies and independently of every other component connected to the frame. Each of the finger assemblies includes a single electric motor and is configured to be fully operable using only the single electric motor.

27 Claims, 41 Drawing Sheets

(56) References Cited

U.S. PATENT DOCUMENTS

| | | |
|---|---|---|
| 9,383,594 B2 | 7/2016 | Mccabe |
| 9,494,415 B2 | 11/2016 | Sweetser |
| 9,574,646 B1 | 2/2017 | Edsinger |
| 9,575,335 B1 | 2/2017 | Mccabe |
| 9,592,603 B2 | 3/2017 | Hardouin |
| 9,789,607 B1 | 10/2017 | Whitman |
| 9,789,612 B2 | 10/2017 | Hoffman |
| 9,796,078 B2 | 10/2017 | Angle |
| 9,821,466 B2 | 11/2017 | Bingham |
| 9,868,210 B1 | 1/2018 | Whitman |
| 9,910,297 B1 | 3/2018 | Mccabe |
| 9,992,474 B2 | 6/2018 | Grunnet-Jepsen |
| 10,007,994 B2 | 6/2018 | Grunnet-Jepsen |
| 10,018,256 B1 | 7/2018 | Magnusson |
| 10,189,158 B2 | 1/2019 | Edsinger |
| 10,203,209 B2 | 2/2019 | Roumeliotis |
| 10,310,362 B2 | 6/2019 | Grunnet-Jepsen |
| 10,349,245 B2 | 7/2019 | Tokuchi |
| 10,537,998 B2 | 1/2020 | Salisbury |
| 10,656,511 B2 | 5/2020 | Grunnet-Jepsen |
| 10,780,578 B2 | 9/2020 | Blankespoor |
| 10,890,921 B2 | 1/2021 | Gillett |
| 10,921,558 B2 | 2/2021 | Yao |
| 10,924,638 B2 | 2/2021 | Swaminathan |
| 10,946,528 B2 | 3/2021 | Gupta |
| 10,960,539 B1 | 3/2021 | Kalakrishnan |
| 11,180,205 B2 | 11/2021 | Amino |
| 11,188,821 B1 | 11/2021 | Kalakrishnan |
| 11,333,954 B2 | 5/2022 | Bull |
| 11,347,030 B2 | 5/2022 | Yao |
| 11,402,726 B2 | 8/2022 | Bull |
| 11,416,003 B2 | 8/2022 | Whitman |
| 11,435,745 B2 | 9/2022 | Lee |
| 11,498,223 B2 | 11/2022 | Williams |
| 11,546,504 B2 | 1/2023 | Kim |
| 11,554,484 B2 | 1/2023 | Jung |
| 11,599,009 B2 | 3/2023 | Bull |
| 11,600,010 B2 | 3/2023 | Doutre |
| 11,602,853 B2 | 3/2023 | Stoianovici |
| 11,686,884 B2 | 6/2023 | Shinohara |
| 11,707,852 B1 | 7/2023 | Hurst |
| 11,736,677 B2 | 8/2023 | Grunnet-Jepsen |
| 11,807,067 B2 | 11/2023 | Mancini |
| 11,833,680 B2 | 12/2023 | Deits |
| 11,850,738 B2 | 12/2023 | Chernyak |
| 11,851,120 B2 | 12/2023 | Fay |
| 11,999,423 B2 | 6/2024 | Whitman |
| 12,036,670 B2 | 7/2024 | Geating |
| 12,054,208 B2 | 8/2024 | Swilling |
| 12,070,863 B2 | 8/2024 | Whitman |
| 12,077,229 B2 | 9/2024 | Whitman |
| 12,097,626 B2 | 9/2024 | Ikeda |
| 12,122,044 B2 | 10/2024 | Webb |
| 12,134,181 B2 | 11/2024 | Klingensmith |
| 12,172,537 B2 | 12/2024 | Gonano |
| 12,214,497 B2 | 2/2025 | Whitman |
| 12,235,652 B2 | 2/2025 | Whitman |
| 12,240,117 B2 | 3/2025 | Chebotar |
| 12,251,831 B2 | 3/2025 | Murphy |
| 2004/0103740 A1 | 6/2004 | Townsend et al. |
| 2010/0280662 A1 | 11/2010 | Abdallah |
| 2013/0175816 A1 | 7/2013 | Kawasaki |
| 2014/0265401 A1 | 9/2014 | Allen Demers et al. |
| 2016/0052574 A1 | 2/2016 | Khripin |
| 2016/0064263 A1 | 3/2016 | Hosek |
| 2017/0075143 A1 | 3/2017 | Saylor |
| 2017/0106738 A1 | 4/2017 | Gillett |
| 2017/0299898 A1 | 10/2017 | Gallina |
| 2018/0104823 A1 | 4/2018 | Kaku |
| 2019/0025611 A1 | 1/2019 | Saylor |
| 2019/0105783 A1 | 4/2019 | Al Moubayed |
| 2019/0278079 A1 | 9/2019 | Mccabe |
| 2019/0329413 A1 | 10/2019 | Johnson |
| 2019/0337166 A1 | 11/2019 | Keeney-Ritchie |
| 2020/0009739 A1 | 1/2020 | Moon |
| 2020/0096792 A1 | 3/2020 | Mccabe |
| 2020/0330246 A1 | 10/2020 | Tognetti et al. |
| 2020/0409183 A1 | 12/2020 | Saylor |
| 2021/0387346 A1 | 12/2021 | Gillett |
| 2022/0388174 A1 | 12/2022 | Stathis |
| 2022/0390952 A1 | 12/2022 | Yu |
| 2022/0395974 A1 | 12/2022 | Balasubramanian |
| 2022/0410380 A1 | 12/2022 | Lu |
| 2023/0143315 A1 | 5/2023 | Whitman |
| 2023/0173683 A1 | 6/2023 | Gomez |
| 2023/0182296 A1 | 6/2023 | Sermanet |
| 2023/0347514 A1 | 11/2023 | Xiao |
| 2024/0003380 A1 | 1/2024 | Vyas |
| 2024/0181637 A1 | 6/2024 | Gillett |
| 2024/0217104 A1 | 7/2024 | Neville |
| 2024/0228191 A1 | 7/2024 | Kumar |
| 2024/0300109 A1 | 9/2024 | Shaw |
| 2025/0147517 A1 | 5/2025 | Swilling |

FOREIGN PATENT DOCUMENTS

| | | |
|---|---|---|
| CN | 212287717 | 1/2021 |
| CN | 112959343 | 6/2021 |
| CN | 115503013 | 12/2022 |
| CN | 117047810 | 11/2023 |
| GB | 2472046 | 4/2013 |
| GB | 2496335 | 5/2013 |
| KR | 20180107353 | 10/2018 |
| WO | 2009030922 | 3/2009 |
| WO | 2019234706 | 12/2019 |
| WO | 2023107501 | 6/2023 |
| WO | 2023110778 | 6/2023 |
| WO | 2024058844 | 3/2024 |
| WO | 2024085904 | 4/2024 |
| WO | 2024112350 | 5/2024 |
| WO | 2024112351 | 5/2024 |
| WO | 2024123766 | 6/2024 |
| WO | 2024163992 | 8/2024 |
| WO | 2025019583 | 1/2025 |
| WO | 2025042802 | 2/2025 |
| WO | 2025072321 | 4/2025 |

OTHER PUBLICATIONS

Available online at https://youtu.be/YsdnsNjvwKo?si=bu2dXk8mQaL86C2M, at least as early as Aug. 23, 2023.
Available online at https://www.youtube.com/watch?v=q8ldbodRG14, at least as early as May 22, 2019.
Available online at https://youtu.be/GtPs_ygfaEA?si=7lv6MEFvFoaacKfa, at least as early as Aug. 15, 2023.
Available online at https://www.youtube.com/watch?v=G6JE7mNYz2A, at least as early as Oct. 17, 2024.
Available online at https://www.youtube.com/watch?v=FuNFr7V7KFQ, at least as early as Aug. 19, 2024.
Available online at https://www.youtube.com/watch?v=GzX1qOIO1bE, at least as early as May 13, 2024.
Available online at https://youtu.be/_MBd_XfXy9M?si=PbEHUJpRUFqaxS3J, at least as early as Jun. 26, 2023.
Available online at https://youtu.be/SHPxcRBIXNO?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://www.youtube.com/watch?v=jWTWWuzB6Cg, at least as early as Aug. 27, 2024.
Available online at https://www.youtube.com/watch?v=B-ebMigAHzQ, at least as early as Sep. 30, 2024.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://www.youtube.com/watch?v=DrNcXgoFv20, at least as early as Oct. 18, 2024.
Available online at https://youtu.be/BNSZ8Fwcd20?si=_YnVgjYblVuhASk1, at least as early as Oct. 27, 2023.

(56) References Cited

OTHER PUBLICATIONS

Available online at https://youtu.be/SS3Ga2HQQ0s?si=Dwr3sJuCsOeUoSLj, at least as early as Nov. 20, 2023.
Available online at https://www.youtube.com/watch?v=iWC8rSjDywU, at least as early as Oct. 18, 2024.
Available online at https://youtu.be/sih1DeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=oXBYZxa25vc&t=1s, at least as early as Apr. 3, 2013.
Available online at https://www.youtube.com/watch?v=LBem19AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFI, at least as early as Mar. 6, 2023.
Available online at https://www.youtube.com/watch?v=bUrLuUxv9gE, at least as early as Aug. 30, 2024.
Available online at https://www.youtube.com/watch?v=-9EM5_VFIt8, at least as early as Apr. 16, 2024.
Available online at https://www.youtube.com/watch?v=29ECwExc-_M&t=2s, at least as early as Apr. 17, 2024.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=bdVrWxjK2vo, at least as early as Sep. 17, 2024.
Available online at https://www.youtube.com/watch?v=qw2y0kceAv0, at least as early as Oct. 15, 2024.
Available online at https://www.youtube.com/watch?v=B_I2k7MZEKg, at least as early as Jun. 30, 2024.
Available online at https://www.youtube.com/watch?v=CbA9wA9etGA, at least as early as Sep. 19, 2024.
Available online at https://www.youtube.com/watch?v=zLhA-RWBBYU, at least as early as Jul. 5, 2024.
Available online at https://www.youtube.com/watch?v=_mQJw8VhZ7w&t=111s, as least as early as Oct. 5, 2022.
Available online at https://www.youtube.com/watch?v=1fC7b2LjVW4, at least as early as Jul. 12, 2016.
Available online at https://www.youtube.com/watch?v=UPOLcE1vwA0, at least as early as Apr. 28, 2016.
Available online at https://www.youtube.com/watch?v=UBbk180ZbTc, at least as early as Oct. 14, 2024.
Available online at https://www.youtube.com/watch?v=UHe1zSQwep0, at least as early as Oct. 14, 2024.
Available online at https://www.youtube.com/watch?v=MCbGeC-kuBM, at least as early as Aug. 5, 2024.
Available online at https://www.youtube.com/watch?v=ujdK3yd2gHY, at least as early as Jul. 2, 2024.
Available online at https://www.youtube.com/watch?v=-HizP4UQvug, at least as early as Apr. 25, 2024.
Available online at https://www.youtube.com/watch?v=ioOkbUQqmZ0, at least as early as Nov. 9, 2022.
Available online at https://www.youtube.com/watch?v=zmqWU2dQKZ8, at least as early as Oct. 24, 2024.
Available online at https://www.youtube.com/watch?v=q8ldbodRG14, at least as early as Feb. 26, 2024.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
Pateromichelakis et al., Head-eyes system and gaze analysis of the humanoid robot Romeo, 2014, IEEE, p. 1374-1379 (Year: 2014).
Jeung et al., Realization of human neck motion with novel robotic mechanism, 2016, IEEE, p. 482-486 (Year: 2016).
International Search Report for PCT/US2025/016930 dated Jun. 10, 2025.
Barker et al., Natural head movement for HRI with a muscularskeletal head and neck robot, 2017, IEEE, p. 587-592 (Year: 2017).
Gao et al., Development of a low motion-noise humanoid neck: Statics analysis and experimental validation, 2010, IEEE, p. 1203-1208 (Year: 2010).
International Search Report for PCT/US2025/012544.
International Search Report for PCT/US2025/011450.
Keselman et al., "Intel RealSense stereoscopic depth cameras," in Proceedings of the IEEE Conference on Computer Vision and Pattern Recognition Workshops, pp. 1-10, 2017.

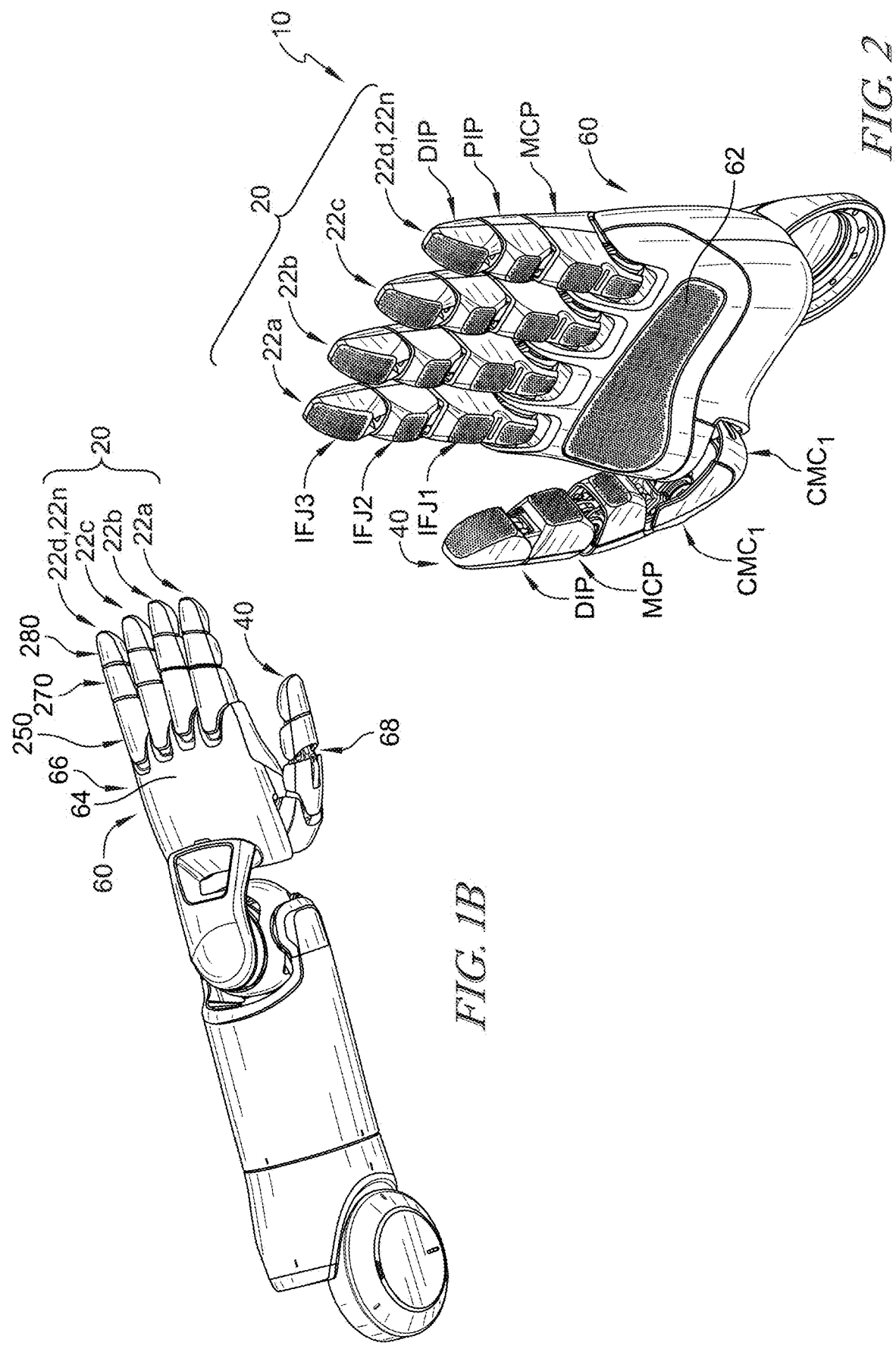

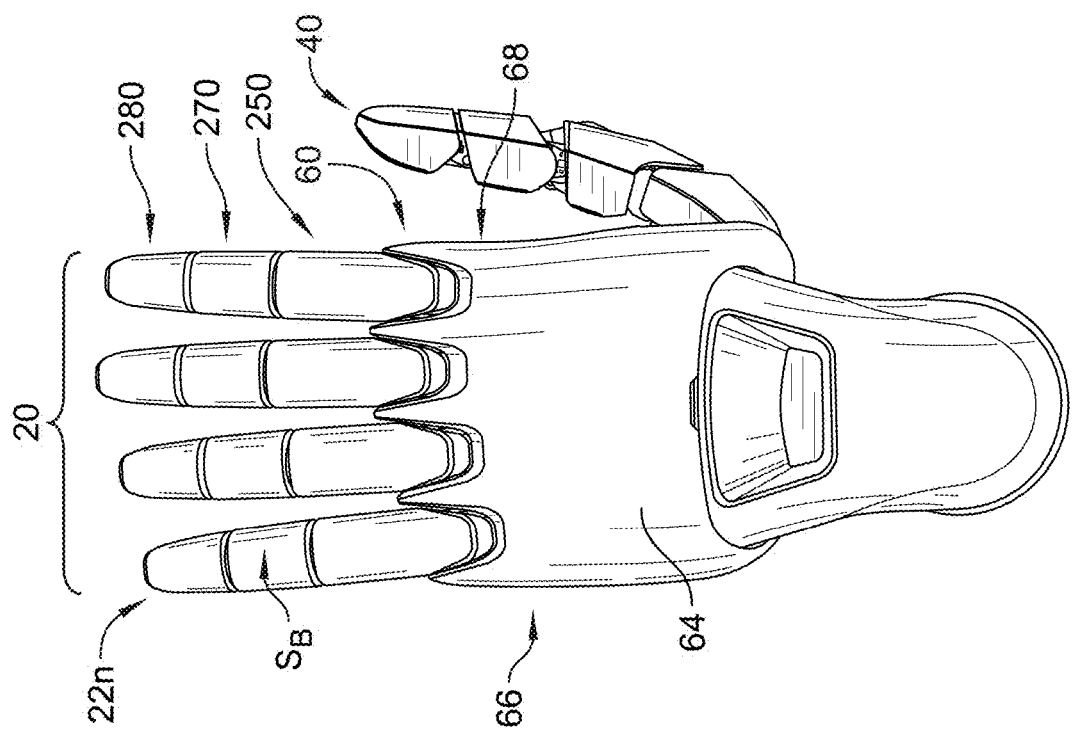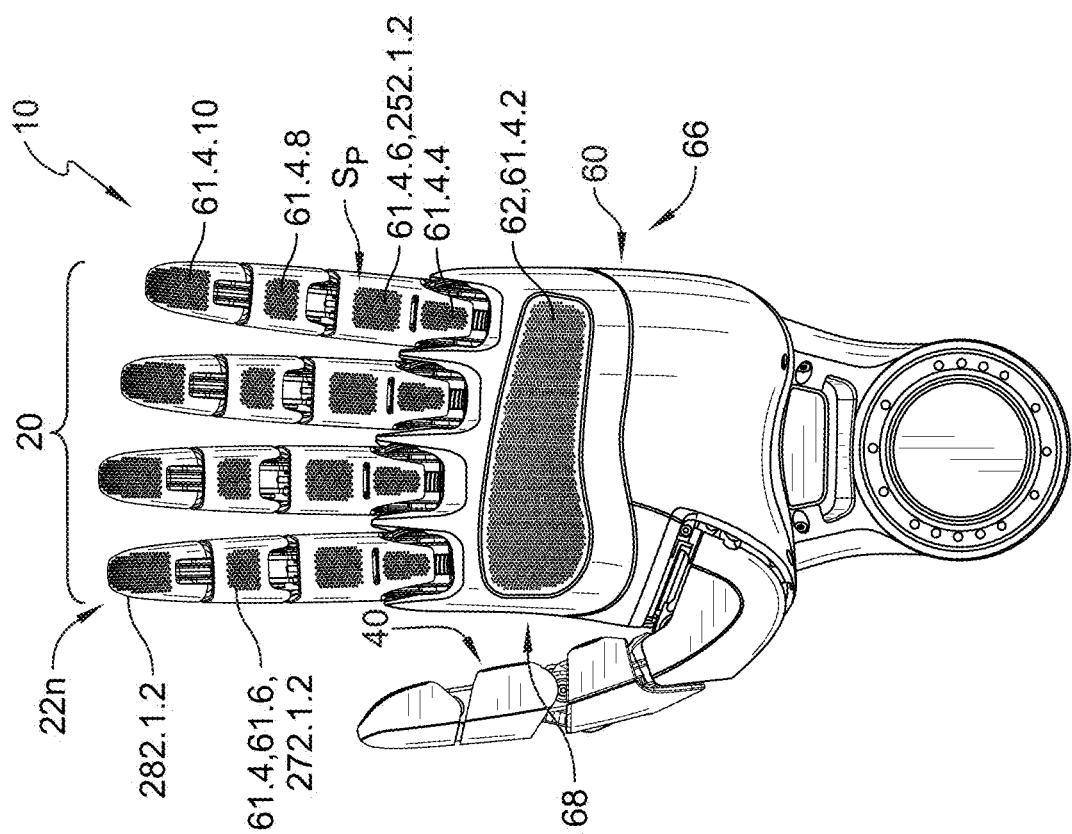

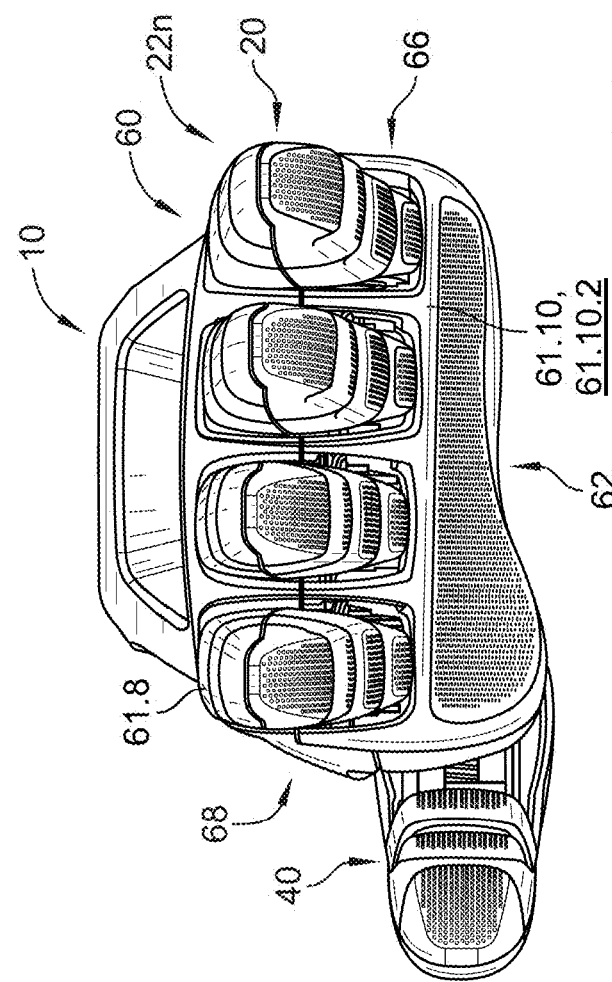
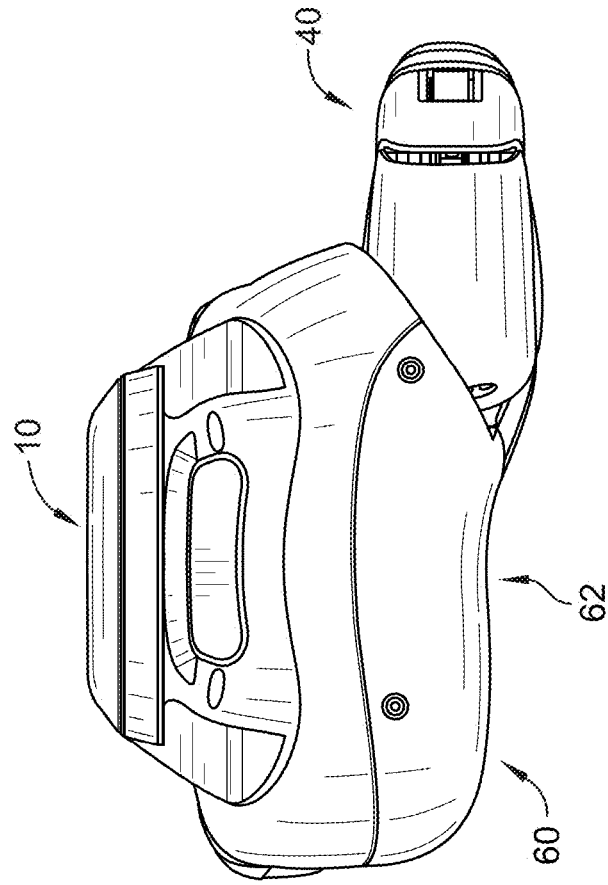

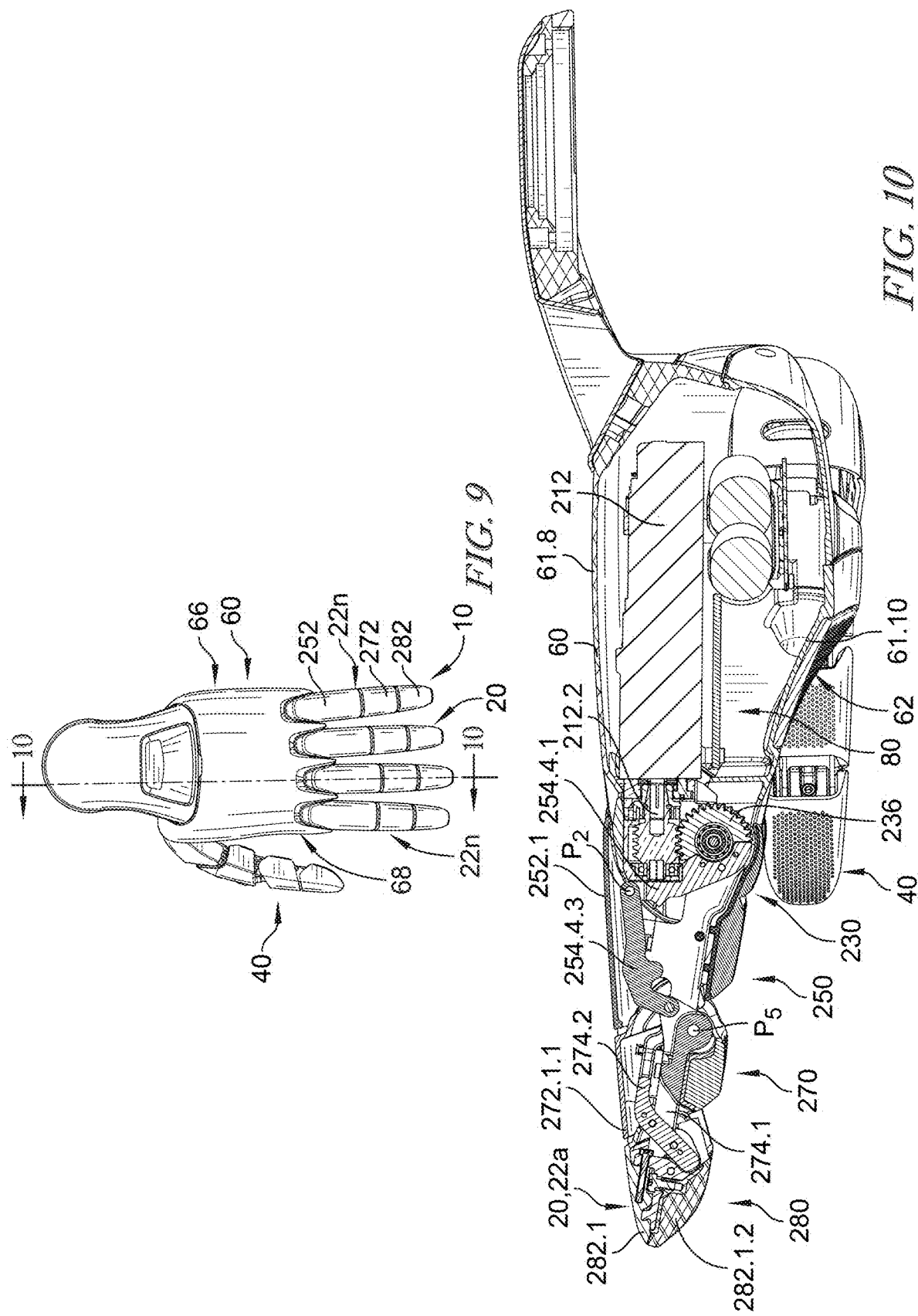

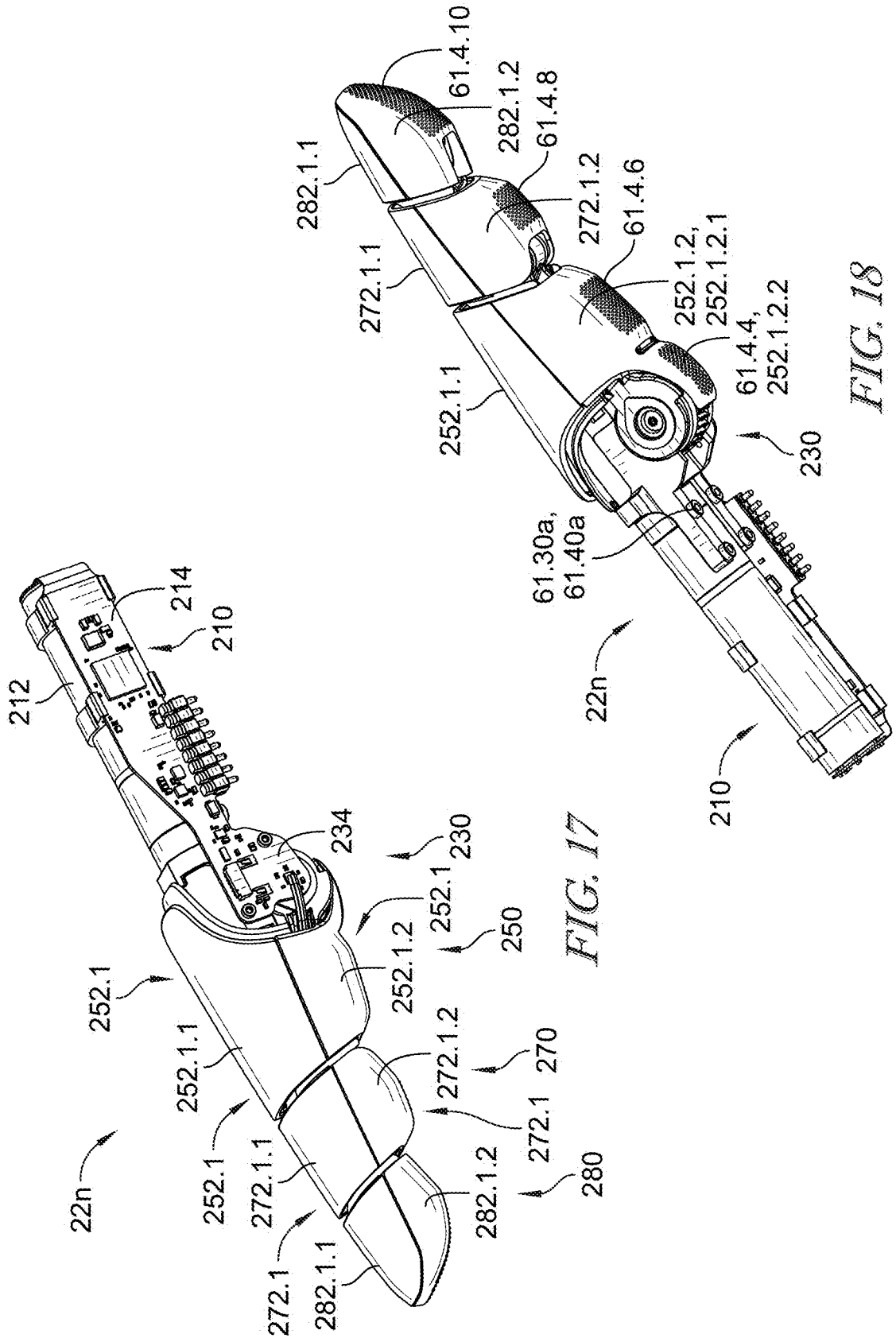

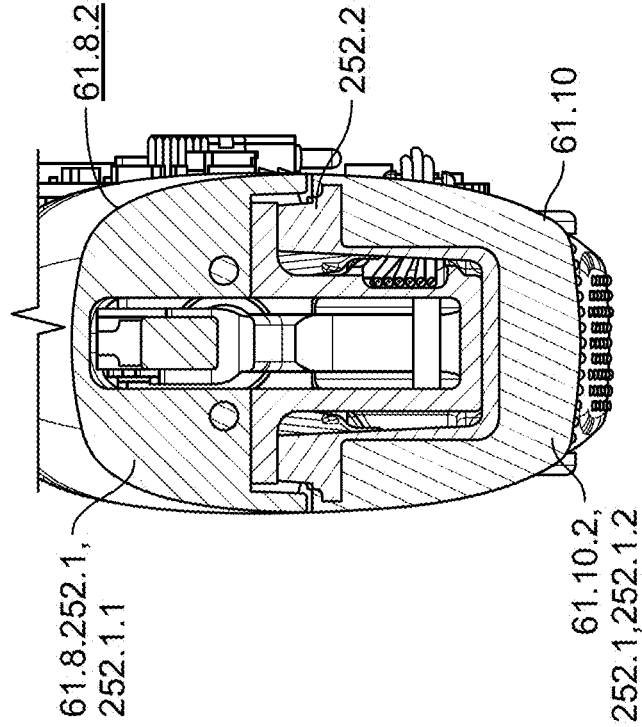
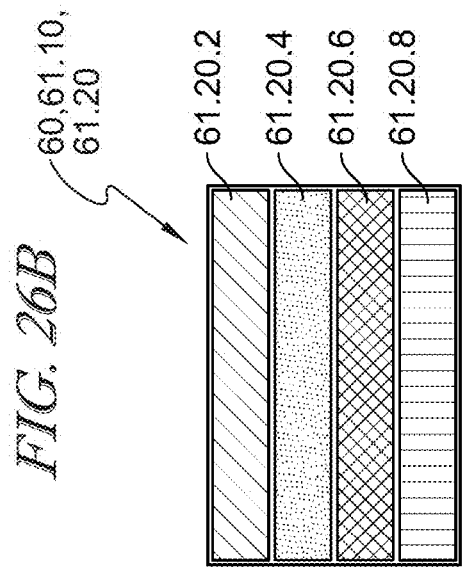
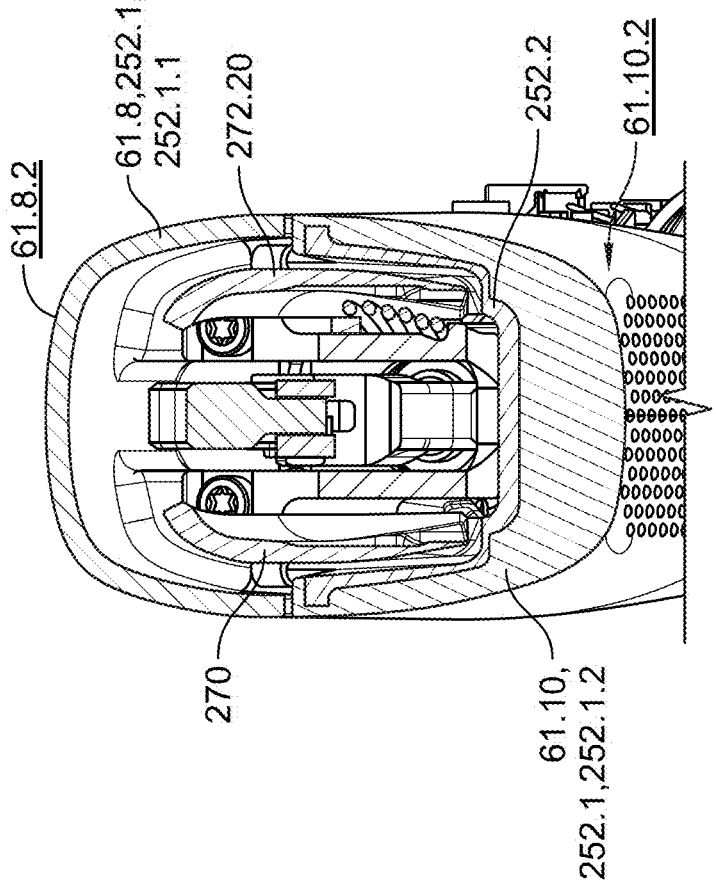
FIG. 26B
FIG. 27
FIG. 26A

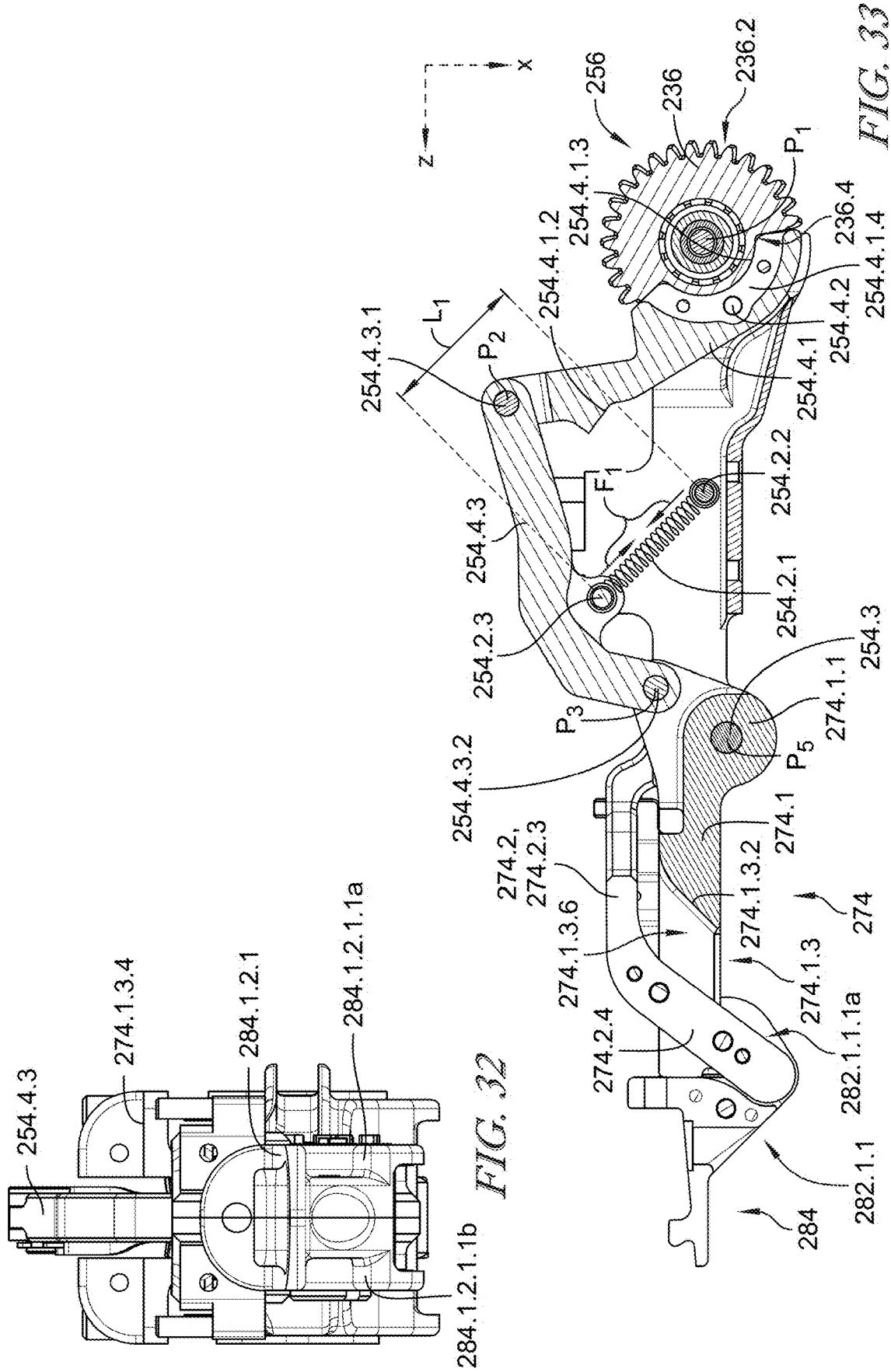

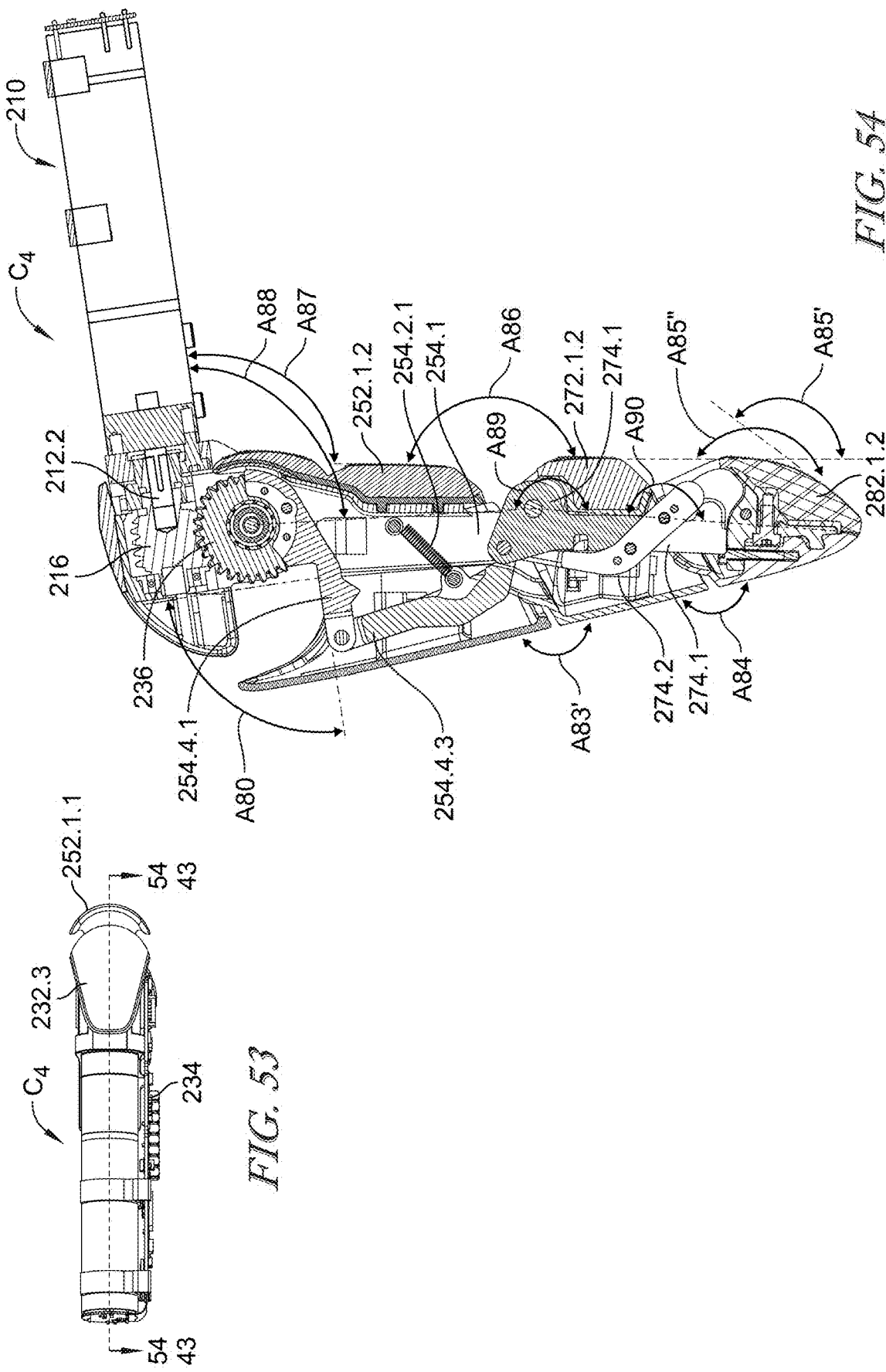

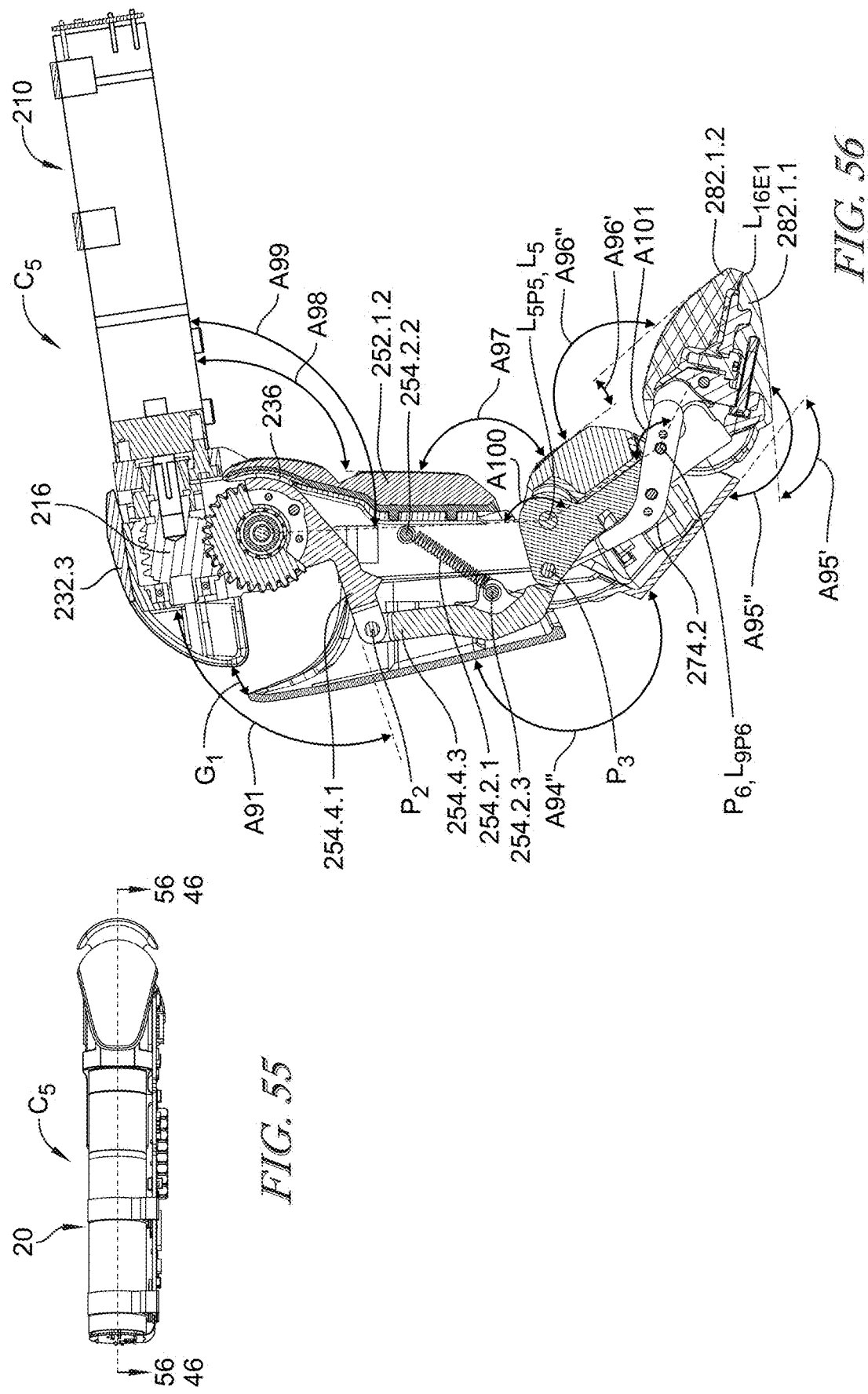

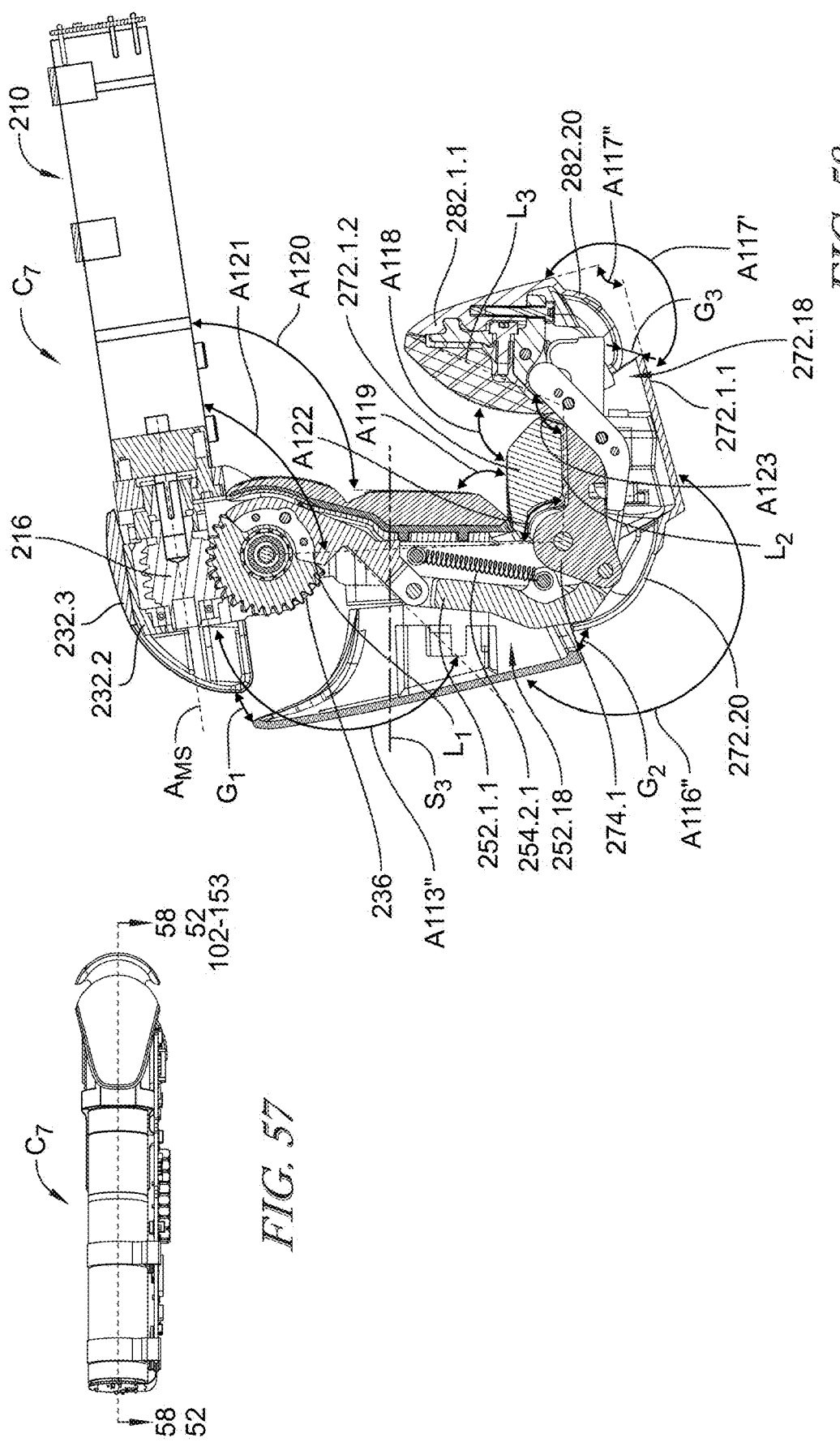

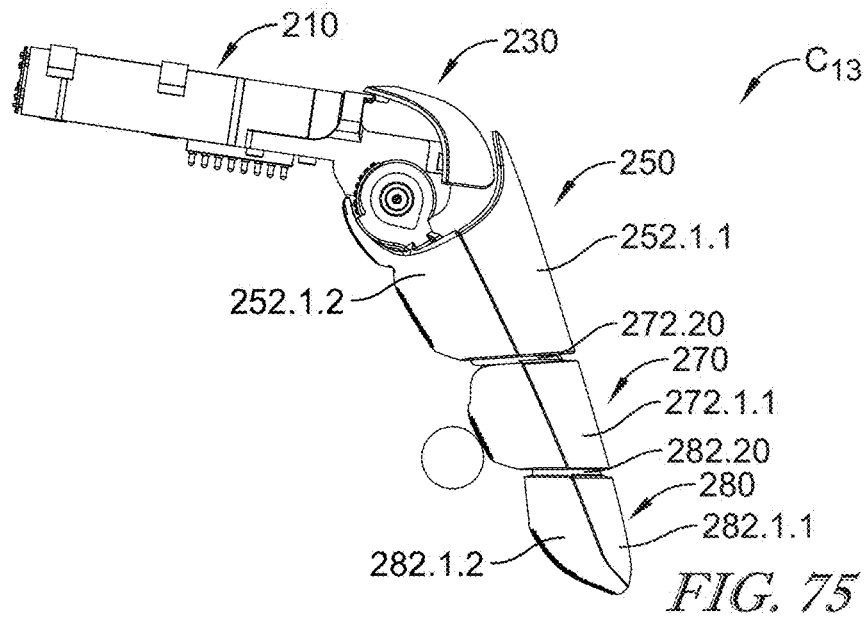
FIG. 75
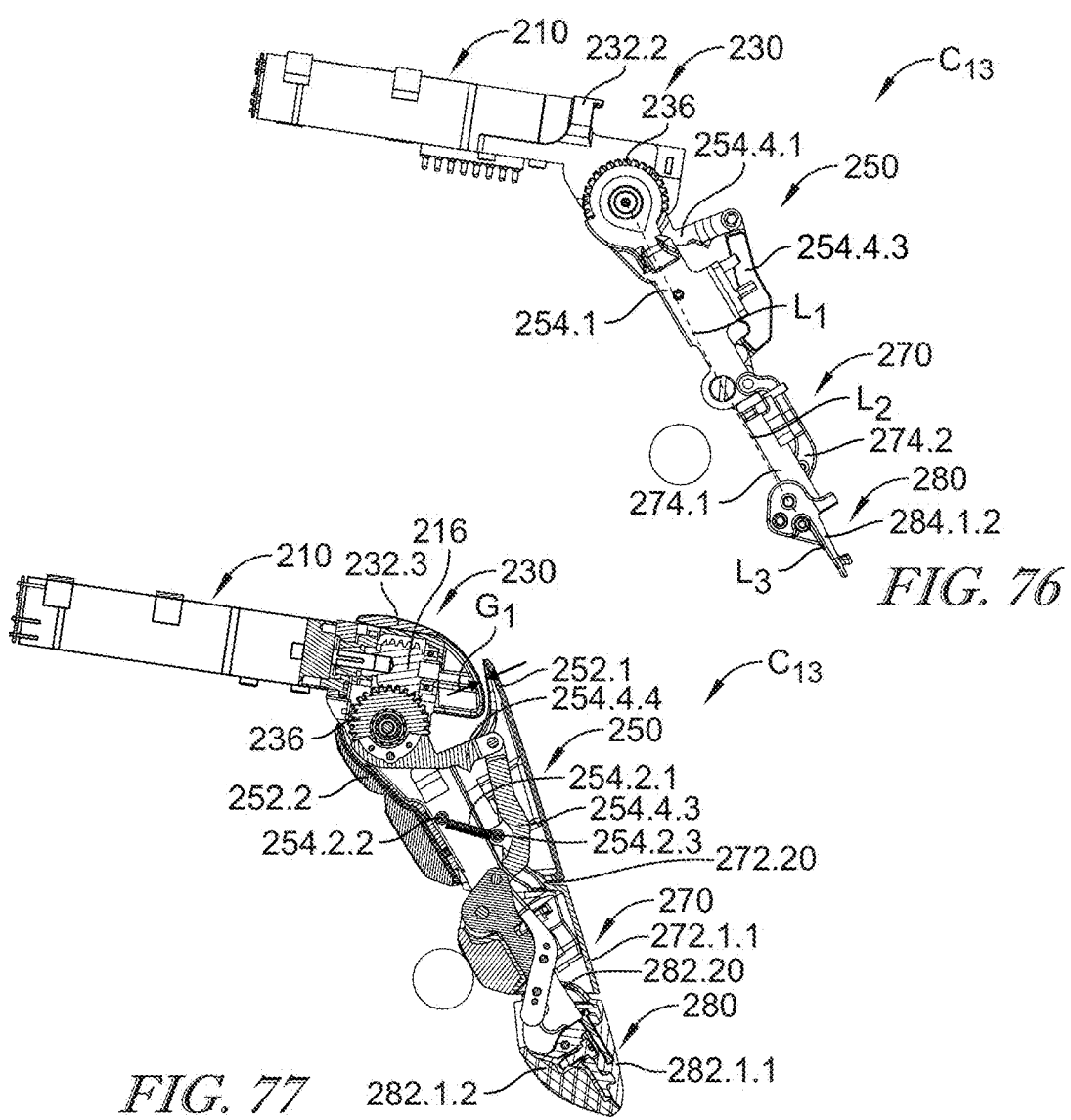
FIG. 76
FIG. 77

KINEMATICS OF A MECHANICAL END EFFECTOR

CROSS-REFERENCE TO RELATED APPLICATIONS

This application claims benefit under 35 U.S.C. § 119 of U.S. Provisional Patent Applications Nos. 63/617,762, 63/561,315, 63/573,226, 63/620,633 all of which are incorporated herein by reference for any purpose. U.S. patent application Ser. Nos. 19/006,191, 19/000,626, 18/919,263 and 18/919,274, and U.S. Provisional Patent Application Nos. 63/615,766, 63/557,874, 63/626,040, 63/626,105, 63/625,362, 63/625,370, 63/625,381, 63/625,384, 63/625,389, 63/625,405, 63/625,423, 63/625,431, 63/685,856, 63/696,507, 63/696,533, 63/706,768, 63/722/057, and 63/700,749 are all incorporated herein by reference for any purpose.

TECHNICAL FIELD

This disclosure relates to a mechanical end effector for a robot, specifically a general-purpose humanoid robot. The mechanical end effector includes various assemblies, components contained in the various assemblies, and connections between said components that provide the mechanical end effector with the ability to substantially mimic the movements, capabilities, and configuration of a human hand.

BACKGROUND

The current workplace landscape is marked by a significant labor shortage, evident in over 10 million unsafe or undesirable jobs within the United States. These positions often encompass tasks in high-risk sectors-such as manufacturing, construction, and materials handling—where human labor may face safety challenges or heightened physical strain. To address this widening labor gap, there is a need for high-performance robotic systems that can assume responsibility for a variety of demanding, repetitive, or potentially dangerous operations. Consequently, ongoing advancements in robotics research have concentrated on the development of sophisticated, general-purpose humanoid robots, which are specifically engineered to function within environments originally designed for human workers. These general-purpose humanoid robots may be equipped with hardware and software architectures optimized for performing diverse tasks with efficiency, accuracy, and reliability in human-centric environments.

In order to fulfill the functional and ergonomic requirements of human-centric environments, general-purpose humanoid robots may be outfitted with anthropomorphic features, including two legs, two arms, a torso, and a head or face-like interface that may provide user feedback or display information. Central to this anthropomorphic design philosophy is the mechanical end effector of the robot, which may be able to approximate most of the capability of the human hand in terms of dexterity, strength, and overall versatility. By being able to approximate most of the capability of the human hand, the end effector may more effectively interact with complex, real-world objects, thereby performing functions such as grasping, rotating, and manipulating items with minimal risk of slippage or damage. In addition to providing a high level of dexterity, the design may satisfy operational constraints related to energy consumption, cost efficiency, and mechanical durability. As such, there is a need for a mechanical end effector that can provide humanoid robots with the ability to execute tasks with human-equivalent precision, robustness, and adaptability in dynamic and unpredictable work environments.

SUMMARY

The present disclosure provides a finger assembly for an underactuated end effector for a humanoid robot, comprising: a motor including a motor shaft having a motor shaft axis, wherein the motor shaft is configured to rotate about the motor shaft axis; a worm drive gear coupled to the motor shaft, wherein the worm drive gear has a worm drive gear axis that is coaxial with the motor shaft axis, and wherein the worm drive gear is configured for rotation with the motor shaft; a worm wheel in geared engagement with the worm drive gear, wherein the worm wheel has a worm wheel axis that is perpendicular to the worm drive gear axis, and wherein the worm wheel is configured for rotation about the worm wheel axis in response to rotation of the worm drive gear about the worm drive gear axis; a worm drive link fixedly connected to the worm wheel and configured to rotate about the worm wheel axis in response to rotation of the worm wheel about the worm wheel axis; a proximal drive link pivotably connected to the worm drive link configured to move in response to rotation of the worm drive link; and a proximal link having a proximal link pivot axis that is coaxial with the worm wheel axis, wherein the proximal link is configured to rotate about the worm wheel axis independently from rotation of the worm wheel.

The present disclosure provides an underactuated finger assembly for an end effector for a humanoid robot, comprising: a proximal link assembly; a medial link assembly pivotally coupled to the proximal link assembly and including a medial housing assembly, wherein the medial housing assembly defines an internal cavity; a distal link assembly pivotally coupled to the medial link assembly and including a distal housing assembly, wherein the distal housing assembly includes: (i) a rear external surface with a first end positioned adjacent the medial housing assembly when the finger assembly is in an uncurled state, and (ii) a tongue that extends towards the proximal link assembly and includes an upper surface that is offset inwardly from the rear external surface; wherein, when the finger assembly is in the uncurled state, a substantial majority of the tongue is positioned within the internal cavity of the medial housing assembly; and wherein, when the finger assembly is in a curled state, either a minority or none of the tongue is positioned within the internal cavity of the medial housing assembly.

The present disclosure provides a humanoid robot having an underactuated end effector, the underactuated end effector comprising: a frame; a plurality of finger assemblies coupled to the frame, each finger assembly of the plurality of finger assemblies comprising: a knuckle, a proximal assembly, a medial assembly, and a distal assembly; a metacarpophalangeal joint formed between the knuckle and the proximal assembly and having a metacarpophalangeal joint axis, wherein an extent of the proximal assembly is configured to be directly driven about the metacarpophalangeal joint axis in: (i) a first curling direction by a motor, and (ii) a second uncurling direction by the motor; a proximal finger interphalangeal joint formed between the proximal assembly and the medial assembly and having a proximal finger interphalangeal joint axis, wherein an extent of the medial assembly is configured to be indirectly driven about the proximal finger interphalangeal joint axis in: (i) the first curling direction by the motor, and (ii) a second uncurling direction by a biasing assembly; a distal finger interphalangeal joint formed between the medial assembly and the distal assembly and having a distal finger interphalangeal joint axis, and wherein an extent of the distal assembly is indirectly driven about the distal finger interphalangeal joint axis in: (i) a first curling direction by the motor, and (ii) a second uncurling direction by the motor; and wherein the end effector lacks a mechanical cable configured to actuate the proximal assembly, the medial assembly, or the distal assembly.

The present disclosure provides an end effector for a humanoid robot, comprising: a frame; a finger assembly removably connected to the frame, the finger assembly comprising: a worm drive link; a proximal drive link pivotably coupled to the worm drive link; a proximal link having a proximal link recess configured to selectively receive at least a portion of the worm drive link and at least a portion of main main proximal drive link therein; a medial link pivotably connected to both the proximal link and the proximal drive link and including a medial link recess configured to receive an extent of a medial drive link; and the medial drive link pivotably connected to the medial link by at least one first pivotable coupling located on a first side of a sagittal plane extending through the finger assembly and at least one second pivotable coupling located on a second side of the sagittal plane.

The present disclosure provides a humanoid robot having an end effector, the end effector comprising: a frame; four finger assemblies, wherein each finger assembly of the four finger assemblies may be substantially identical to every other finger assembly of the four finger assemblies, and wherein each finger assembly of the four finger assemblies is removably connected to the frame at a respective point; wherein all of the finger assemblies of the four finger assemblies are located substantially in a single plane; wherein each finger assembly of the four finger assemblies is angularly offset within the single plane with respect to every other finger assembly of the four finger assemblies; wherein the respective points of connection of the four fingers assemblies to the frame are not co-linear; and wherein each finger assembly of the four finger assemblies lacks a mechanical cable configured to actuate any component of the finger assembly.

The present disclosure provides an underactuated end effector for a humanoid robot, comprising: a frame; a plurality of finger assemblies removably connected to the frame, each finger assembly of the plurality of finger assemblies comprising: a motor assembly including: (i) a motor having a motor housing, and (ii) a motor shaft having a motor shaft axis, and wherein the motor shaft is configured to rotate about said motor shaft axis; a worm drive gear coupled to the motor shaft and configured for rotation about: (i) the motor shaft axis, and (ii) a worm drive gear axis, and wherein the motor shaft axis and the worm drive gear axis are coaxial; a worm wheel in geared engagement with the worm drive gear and configured for rotation about a worm wheel axis in response to rotation of the worm drive gear, and wherein the worm wheel axis is perpendicular to the worm drive gear axis; a worm drive link having a first end and a second end, and wherein the first end of the worm drive link fixedly connected to the worm wheel so that the worm drive link is configured for rotation about the worm wheel axis in response to rotation of the worm wheel about the worm wheel axis; a proximal drive link having a first end and a second end, and wherein the first end of the proximal drive link pivotably connected to the second end of the worm drive link; and a biasing member configured to bias an extent of the proximal drive link toward a first location, and wherein the extent of the proximal drive link is in the first location when the finger assembly is in an uncurled state.

The underactuated finger assembly may also include a motor assembly with a motor shaft having a motor shaft axis, wherein the motor shaft is configured to rotate about the motor shaft axis. The assembly may have a worm drive gear coupled to the motor shaft, wherein the worm drive gear has a worm drive gear axis that is coaxial with the motor shaft axis. A worm wheel may be in geared engagement with the worm drive gear, wherein the worm wheel has a worm wheel axis that is perpendicular to the worm drive gear axis, and wherein the worm wheel is configured to rotate about the worm wheel axis in response to rotation of the worm drive gear about the worm drive gear axis. In some implementations, the proximal link assembly may include a proximal link recess configured to selectively receive at least a portion of a worm drive link and at least a portion of a proximal drive link.

The underactuated finger assembly may include a knuckle assembly positioned between a motor assembly and the proximal link assembly, wherein the knuckle assembly includes a worm wheel interface configured to allow the proximal link assembly to rotate about a worm wheel axis independently from rotation of a worm wheel. In other aspects, an extent of the proximal link assembly may be configured to be directly driven about a metacarpophalangeal joint axis in: (i) a first curling direction by a motor, and (ii) a second uncurling direction by the motor. An extent of a medial assembly may be configured to be indirectly driven about a proximal finger interphalangeal joint axis in: (i) the first curling direction by the motor, and (ii) the second uncurling direction by a biasing assembly. An extent of a distal assembly may be indirectly driven about a distal finger interphalangeal joint axis in: (i) the first curling direction by the motor, and (ii) the second uncurling direction by the motor. The proximal link assembly may include a primary proximal link with a proximal link body, proximal link frame, and proximal link extension. A biasing spring may be integrated into the proximal assembly, connecting to the proximal link assembly. The proximal drive link assembly may extend from this region and connect to the medial assembly. Multiple pivot points may facilitate articulation between the assemblies.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a perspective view of the wrist coupler and the mechanical end effector of FIG. 1, wherein said wrist coupler is removably secured to a lower extent of a robot arm;

FIG. 3 is a palm or front view of the mechanical end effector of FIGS. 1-2;

FIG. 4 is a top or back view of the mechanical end effector of FIGS. 1-2;

FIG. 7 is a rear view of the mechanical end effector of FIGS. 1-2;

FIG. 8 is a front view of the mechanical end effector of FIGS. 1-2;

FIG. 9 is a cross-sectional view of the mechanical end effector taken along line 9-9 of FIG. 10;

FIG. 10 is a top view of the mechanical end effector of FIGS. 1-2;

FIG. 17 is an upper right perspective view of a figure assembly of the plurality of figure assemblies contained in the mechanical end effector of FIGS. 1-2, wherein said finger assembly is in an open, uncurled, or neutral state;

FIG. 18 is a bottom left perspective view of the figure assembly of FIG. 17;

FIG. 25A is a cross-sectional view of the finger assembly taken along line 24A-24A of FIG. 20;

FIG. 25B is a cross-sectional view of the finger assembly taken along line 24B-24B of FIG. 20;

FIG. 27 is a diagram showing layers of materials contained in the housing of the finger assembly of FIGS. 1-2;

FIG. 32 is a front view of the internal link assembly of FIG. 29;

FIG. 33 is a cross-sectional view of the internal link assembly taken along line 33-33 of FIG. 32;

FIG. 53 is a top view of the finger assembly in the fourth configuration $C_4$, wherein the proximal, medial, and distal assemblies are substantially aligned in the first state and the proximal assembly is at maximum flexion position;

FIG. 54 is a cross-sectional view of the finger assembly in the fourth configuration $C_4$ and taken along line 54-54 of FIG. 53;

FIG. 55 is a top view of the finger assembly in the fifth configuration $C_5$, wherein the proximal assembly is at a maximum flexion position and the medial and distal assemblies are in a partially curled state;

FIG. 56 is a cross-sectional view of the finger assembly in the fifth configuration $C_5$ and taken along line 56-56 of FIG. 55;

FIG. 57 is a top view of the finger assembly in a seventh configuration $C_7$, wherein the proximal, medial and distal assemblies are at maximum flexion position or the finger assembly is in a fully curled state;

FIG. 58 is a cross-sectional view of the finger assembly in the fifth configuration $C_7$ and taken along line 58-58 of FIG. 57;

FIG. 75 shows the object in a sixth location and a right side view of the finger assembly in a thirteenth configuration $C_{13}$, and wherein: (i) the medial assembly is in contact with the object, and (ii) the proximal, medial, and distal assemblies are substantially aligned in the first state;

FIG. 76 shows the object in the sixth location and a right side view of the motor and movement assembly in the thirteenth configuration $C_{13}$; and FIG. 77 shows the object in the sixth location and a cross-sectional view of the finger assembly in the thirteenth configuration $C_{13}$.

DETAILED DESCRIPTION

Figure 1A:
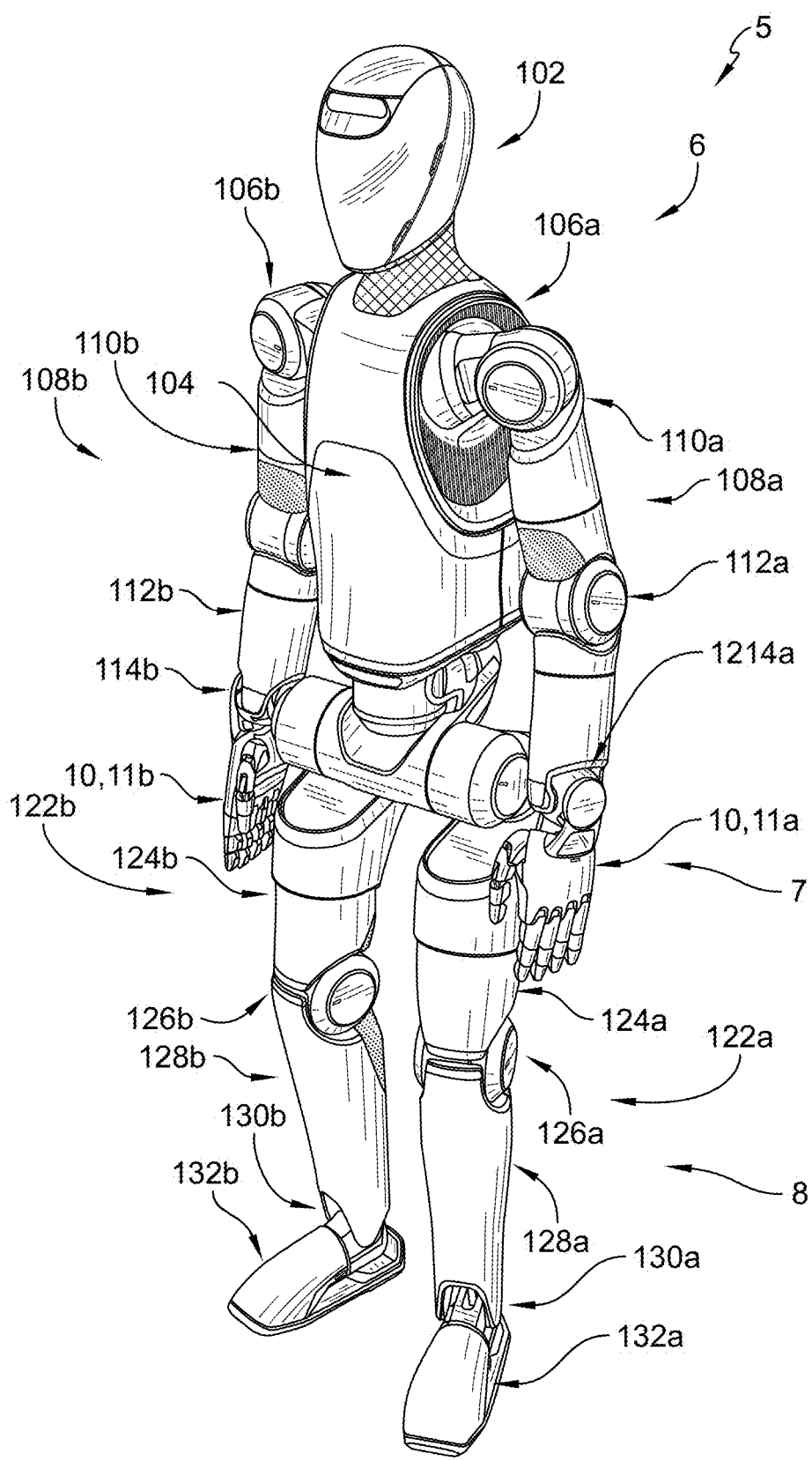
FIG. 1 is a perspective view of a wrist coupler and a mechanical end effector that is designed to emulate a human left hand, wherein the mechanical end effector includes a plurality of finger assemblies, a thumb assembly, a housing, and electronics for controlling the finger assemblies and the thumb assembly.
Figure 5:
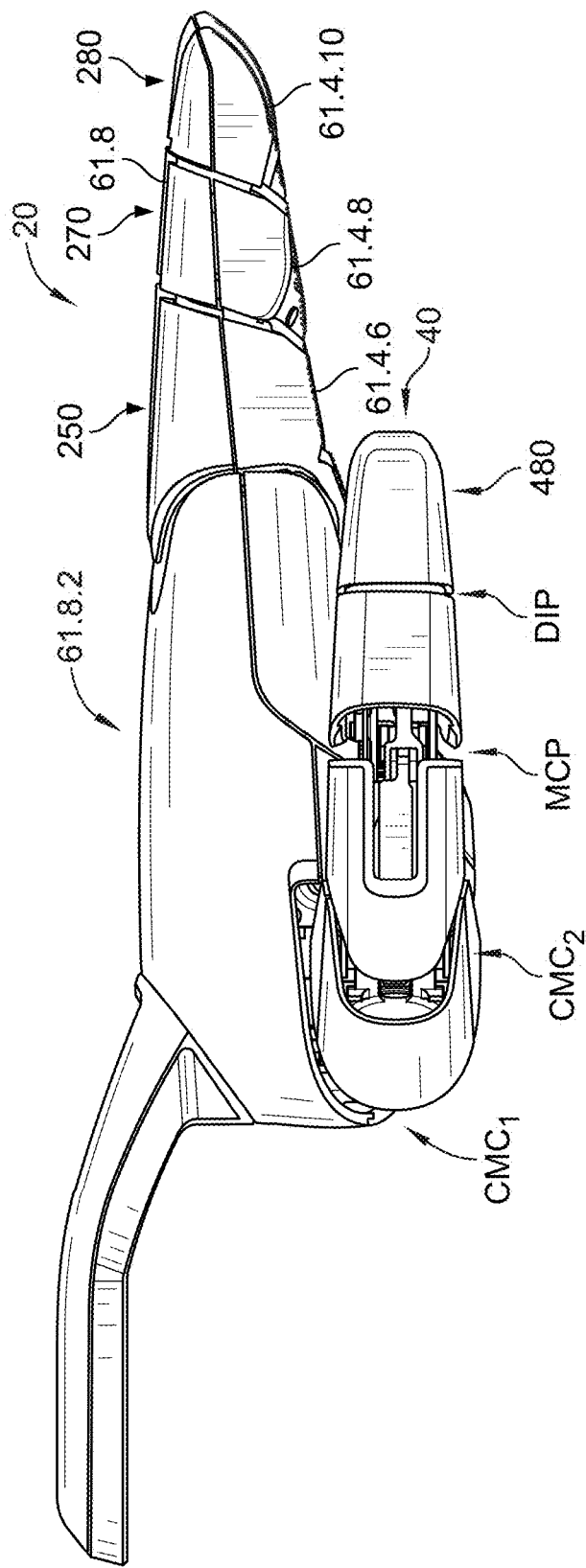
FIG. 5 is a right side or thumb view of the mechanical end effector of FIGS. 1-2.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, there is shown in the drawings and will herein be described in detail embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts may be performed in a different order. Accordingly, the drawings, flow charts and detailed description are to be regarded as illustrative in nature, not restrictive or limiting.

A. Introduction

The mechanical end effector 10 disclosed herein may be used as a component of a robot, for example, a versatile humanoid robot. Enabling such a robot to execute general human tasks poses a challenge due to the vast array of potential positions, locations, and states the robot could occupy at any given time in a challenging environment. The multitude of these permutations can be minimized by training the robot system through various methods such as: (i) imitation learning or teleoperation, (ii) supervised learning, (iii) unsupervised learning, (iv) reinforcement learning, (v) inverse reinforcement learning, (vi) regression techniques, or (vii) other established methodologies. To further streamline the vast array of possible positions, locations, and states, reduce manufacturing steps, complexities and costs, minimize components within the robot system, enhance component modularity, and achieve several other advantages that would be apparent to those skilled in the field, two or more components of the end effector can be either: (i) linked, or (ii) fixed to one another. When two or more components are linked or fixed to one another, movement of one of the components results in movement in another one of the components. In contrast to conventional end effectors that fix the medial and distal assemblies to one another, the disclosed finger assembly movably links the medial and distal assemblies to one another. Such linking may provide benefits over fixing because it allows for some independent movement of the medial assembly in relation to the distal assembly while still allowing for the movement of the medial assembly to result in movement of the distal assembly. Such linking allows the finger assembly to become underactuated, that is, to retain its ability to flex, curl, or rotate around an object while eliminating the necessity for multiple actuators, motors, or effectors for each finger assembly. Indeed, the disclosed finger assembly includes only one motor that drives linkages that provide three degrees of freedom DoF per finger assembly. Thus, the end effector has at least 12 DoF, and preferably a total of 16 DoF.

Unlike conventional end effectors, the end effector 10 disclosed herein may utilize four identical finger assemblies that are aligned in a single plane (Y-Z), while being offset in two other orthogonal planes (X-Y, and X-Z). The use of identical finger assemblies may be beneficial because it reduces the number of distinct components, increases modularity, and reduces the cost of the end effector and the overall robot system. In an alternative embodiment, the end effector 10 may utilize two sets of identical finger assemblies (i.e., two finger assemblies in a first set of assemblies and two finger assemblies in a second set of finger assemblies, wherein each finger contained in the first and second sets of finger assemblies are identical).

While the structural configuration of each finger assembly will be discussed in greater detail below, it should be understood that each finger assembly is configured to be a separate component of the end effector that is modular and removably coupled to a frame of the end effector. As such, said finger assembly may be swappable (and in certain embodiments hot-swappable) with another finger assembly. The separate, modular, and swappable nature of the finger assemblies means that: (i) pulleys, articulation cables, pneumatic or hydraulic mechanisms may be omitted from the end effector, and (ii) components of the end effector are not located in the wrist, lower arm, or generally outside of each finger assembly. In other words, the motor, PCBs, encoders, and other electronic components needed to actuate each finger assembly may be fully contained within each finger assembly and are not distributed throughout the arm and/or robot. This full containment aspect may be desirable because it increases serviceability and thus decreases the cost of ownership and operation of the robot.

While the disclosed finger assemblies in the end effector 10 utilize a single biasing member (e.g., spring), said finger assemblies utilize a direct drive linkage system in order to eliminate the need to use more than one (e.g., multiple) biasing members (e.g., springs) to force the finger assembly to remain in a predefined state (e.g., open, uncurled, or neutral). Eliminating the use of multiple biasing members for this purpose may provide a significant benefit over conventional end effectors because it: (i) removes the need for the motor assembly to overcome a significant biasing force applied by multiple biasing members to move the finger assembly, and (ii) increases durability, robustness, and life of the end effector due to the fact that multiple biasing members can rapidly degrade over time.

Additionally, the disclosed direct drive linkages include components that nest within one another. The use of nesting components may be beneficial over conventional finger assemblies of end effectors because each link is supported by at least one coupling point on either side of a plane (e.g., sagittal plane) extending through the finger assembly. In other words, each link in the disclosed finger assembly is coupled on multiple sides, not simply coupled on a single side, which may increase the durability of the assembly.

The disclosed finger assemblies in the end effector 10 have a proximal assembly that includes: (i) one component that is directly tied to the movement of the motor, and (ii) one component that is not directly tied to the movement of the motor. For example, the movement of the proximal drive link assembly is directly tied to the movement of the motor, while the proximal housing is not directly tied to the movement of the motor. In fact, the proximal assembly utilizes a bearing to allow slippage between the motor and at least the proximal housing when an extent of the proximal assembly has come into contact with a resistance point/surface. This configuration may be beneficial over conventional end effectors because it allows a single motor to fully actuate the finger assembly, by allowing specific components within the proximal assembly to stop moving while the motor continues to drive other components.

Finally, the end effector 10 disclosed herein may lack several components typically found in conventional end effectors. For example, the disclosed end effector 10 lacks pulleys, articulation cables, components configured to allow the fingers to abduct or spread from one another, more than one motor per finger assembly, pressure sensors, force sensors, and other components typically found in conventional end effectors. Eliminating these components may reduce cost and complexity, while increasing modularity, serviceability, and durability. Other benefits of the disclosed end effector 10 and its various assemblies and components should be apparent to one of skill in the art based on this disclosure and the accompanying figures.

In some aspects, the end effector 10 may provide improved energy efficiency compared to conventional designs. By utilizing a single motor per finger assembly and eliminating components like pulleys and cables, the power consumption may be reduced. This could lead to longer operating times between charges for battery-powered robots. The simplified mechanical design with fewer components may result in improved reliability and reduced maintenance requirements. With fewer moving parts and potential failure points, the end effector may have longer intervals between servicing and a lower likelihood of breakdowns. This could translate to increased uptime and productivity in industrial applications. The underactuated nature of the finger assemblies may provide enhanced adaptability when grasping objects of various shapes and sizes. By allowing some passive adaptation of the finger curvature, the end effector may conform more naturally to object contours without requiring complex control algorithms. This could improve grasping stability and versatility across a wide range of items. The compact design with integrated components may allow for a slimmer profile of the end effector. This could enable the robot to reach into tighter spaces or manipulate objects in more confined environments compared to bulkier conventional designs. The streamlined form factor may expand the potential applications and workspace of robots using this end effector.

B. End Effector

With reference, for example, to FIGS. 1-14, the end effector 10 includes: (i) a set of finger assemblies 20 with at least one finger assembly 22*n* (as shown, the set of finger assemblies 20 includes four finger assemblies 22*a*, 22*b*, 22*c*, 22*d*), (ii) a thumb assembly 40, (iii) a housing assembly 60, and (iv) electronics 80 that are configured to control each finger assembly 22*n* of the set of finger assemblies 20 and the thumb assembly 40. As shown in the figures, the housing assembly 60 is configured to: (i) encase and protect the electronics 80, and (ii) securely locate each of the finger assemblies 22*a*-22*d* and the thumb assembly 40 in a particular position relative to each other and the housing assembly 60. The housing assembly 60 may have: (i) a palm 62, (ii) a back 64, (iii) left and right sides 66, 68, and (iv) a front 70. It should be understood in alternative embodiments, the end effector 10 may include a single finger, two fingers, three fingers, or five fingers. In a further alternative, the end effector 10 may not include a single finger assembly, but instead may include a plurality of thumb assemblies.

As described above in an alternative embodiment, the interior bottom housing 61.10 may include a plurality of layers 61.20, wherein a first interior layer 61.20.2 that is made from a first material having a first rigidity and a second exterior layer 61.20.4 that is made from a second material having a second rigidity. In this example, the first material may be rigid plastic or metal, while the second material is deformable silicon, soft plastic, or deformable textile or fabric. It should be understood that the second material may be replaceable (i.e., removably coupled) or may not be permanently affixed to the end effector 10. This design may allow for a softer material to be used on the palm surface 61.2.2 of the end effector 10 that is designed to be less durable, and thus needs to be replaced when damaged or at pre-defined intervals (e.g., 1 week, 1 month, 6 months, 1 year, 5 years, or any interval between 1 day and 10 years). In other examples, the plurality of layers 61.20 may have three layers, wherein the first layer 61.20.2 is rigid to provide protection for the internal components, a second layer 61.20.4 is less rigid than the first layer 61.20.2 to enable the end effector 10 to pick up delicate items, and a third layer 61.20.6 that is designed to protect the second layer 61.20.4. In this example, the first layer 61.20.2 may be made from durable plastic or metal, the second layer 61.20.4 may be made from deformable thermoplastic, and the third layer 61.20.6 may be made from textile, cloth, or fabric (e.g., textile assembly—namely, a glove). Said third layer 61.20.6 may be replaceable at pre-determined intervals and may be coupled to the end effector using snaps, buttons, removable fasteners, push-pins, or any other type of mechanical coupling mechanism. In a final example, the plurality of layers 61.20 may have any number of layers, wherein layer 61.20.8 represents layer number four through the nth layer.

In some aspects, the interior bottom housing 61.10 may include additional layers or configurations. For example, the plurality of layers 61.20 may include a fourth layer 61.20.8 made of a shock-absorbing material to provide additional protection against impacts. This fourth layer 61.20.8 may be positioned between the first layer 61.20.2 and the second layer 61.20.4, or it may be the outermost layer. In some cases, one or more of the layers may incorporate sensors, such as pressure sensors or temperature sensors, to provide feedback about objects being manipulated. The layers may also vary in thickness across different regions of the end effector 10, with thicker portions in high-wear areas and thinner portions in areas requiring more flexibility. Additionally, the layers may be designed with different textures or patterns on their surfaces to enhance gripping capabilities for various types of objects. In some implementations, the layers may be interchangeable, allowing for customization of the end effector 10 for specific tasks or environments. The coupling mechanisms between layers may also include magnetic connections or interlocking geometries in addition to mechanical fasteners. Furthermore, certain layers may incorporate self-healing materials that can repair minor damage over time, potentially extending the intervals between replacements.

Examples of materials that may be used in the end effector 10 include, but are not limited to, metal (e.g., aluminum, stainless steel, titanium alloys, magnesium alloys, copper alloys, nickel-based alloys), carbon fiber composites, glass fiber composites, basalt fiber composites, Kevlar® composites, polycarbonate, acrylic (PMMA), acrylonitrile butadiene styrene (ABS), nylon, polyoxymethylene (POM), polyether ether ketone (PEEK), polyetherimide (PEI), polyphenylene sulfide (PPS), polytetrafluoroethylene (PTFE), polypropylene (PP), polyethylene (PE), high-density polyethylene (HDPE), thermoplastic polyurethane (TPU), polyamide-imide (PAI), other plastic (e.g., may include a polymer composition), rubber (e.g., nitrile rubber, EPDM), silicone, polyurethane elastomers, ceramic materials (e.g., alumina, zirconia), a combination of these materials, and/or any other suitable material. Additionally, the housing assembly 60 and other components of the end effector 10 may be injection molded, 3D printed, subtractive manufactured, or created using any other known method of manufacturing. In some aspects, the materials may be selected to optimize specific properties such as strength-to-weight ratio, durability, flexibility, or electrical conductivity depending on the intended application. The manufacturing method may be chosen based on factors such as production volume, geometric complexity, or cost considerations. In some cases, hybrid manufacturing techniques combining multiple processes may be employed to achieve desired material properties or structural features.

Figure 6:
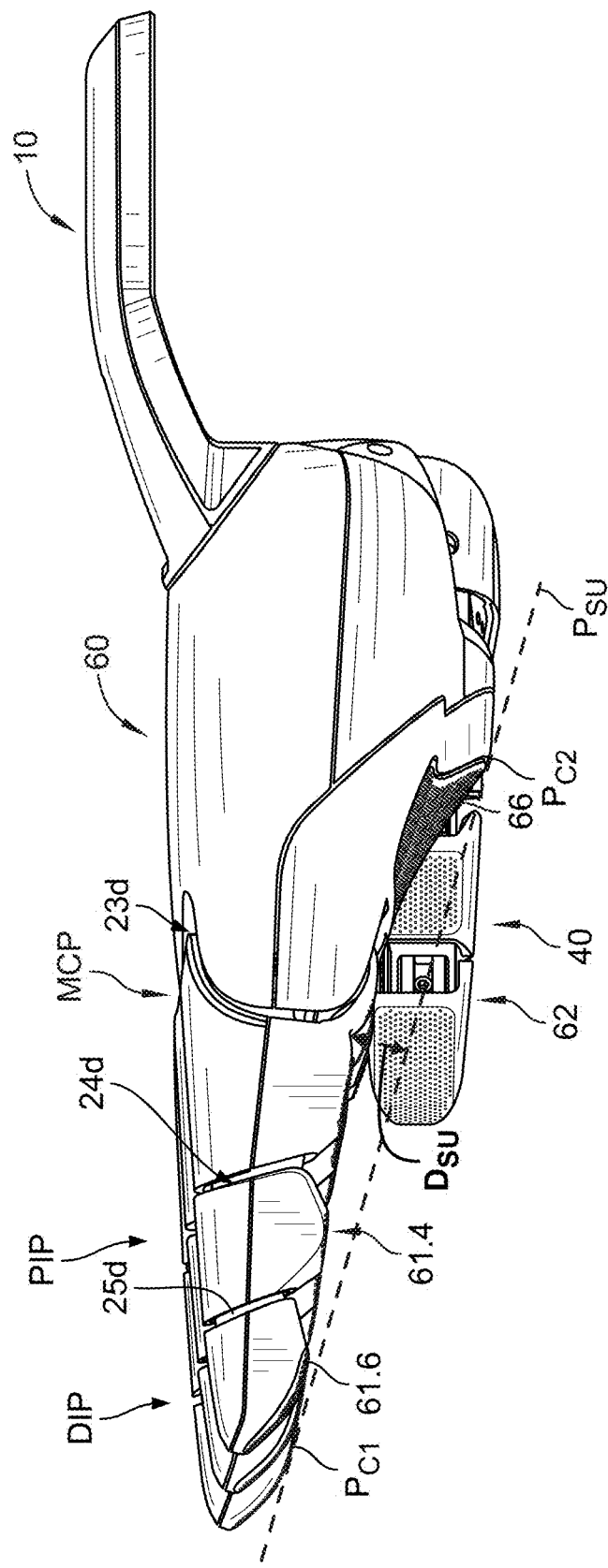
FIG. 6 is a left side or finger view of the mechanical end effector of FIGS. 1-2.
Figure 11:
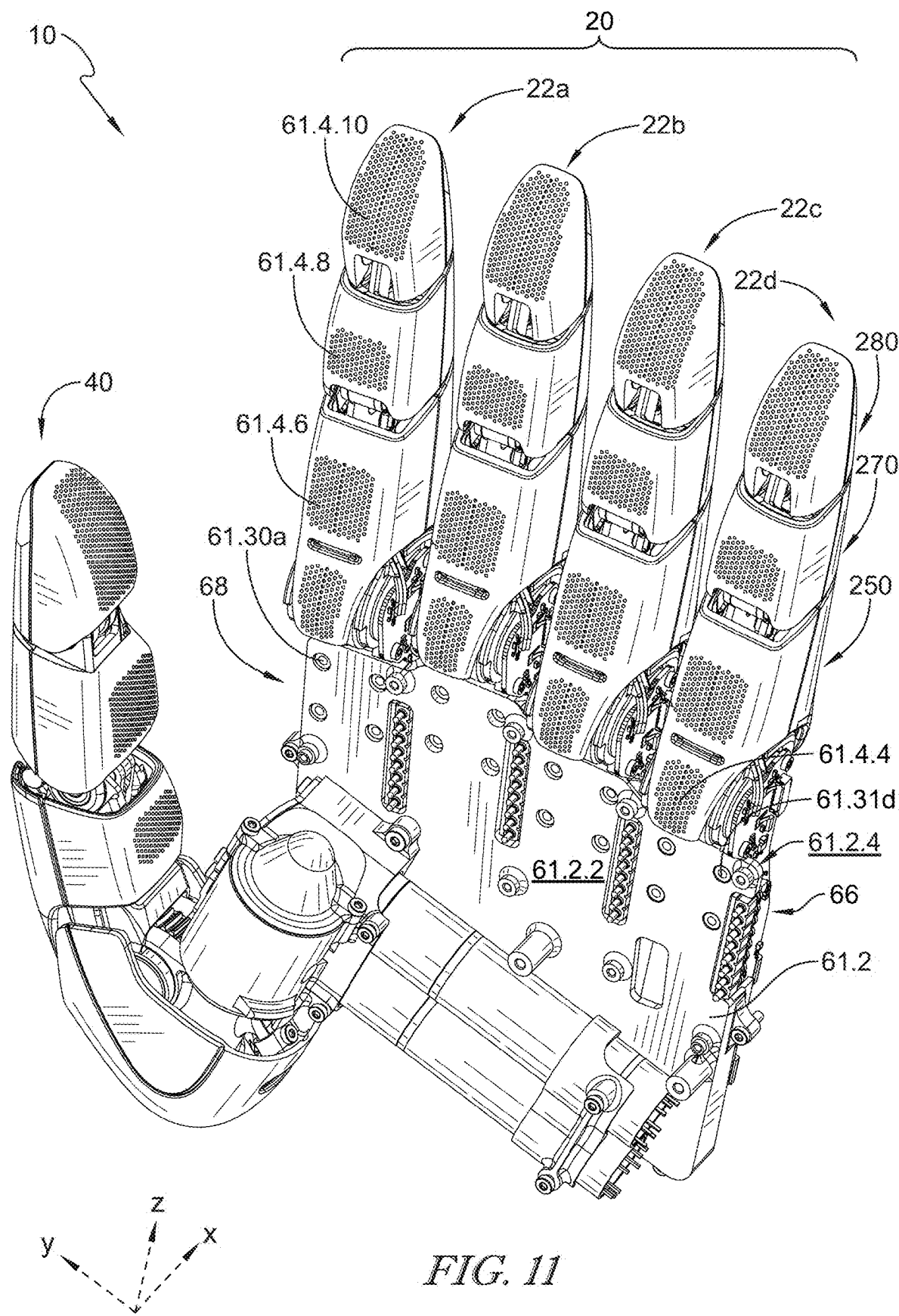
FIG. 11 is a perspective view of the mechanical end effector of FIGS. 1-2, wherein an extent of the housing has been removed to show a portion of the components contained within said housing.

FIG. 6 shows a finger side view of the end effector 10, wherein a surface plane $P_{SU}$ has been added to illustrate the contact points between the palm side of the housing assembly 60 and a flat or planar surface. For example, the surface plane $P_{SU}$ may represent the outermost surface formed by a tote designed to carry parts or components of a car. As shown in this Figure, two main contact points are formed between said surface and the end effector 10, wherein a first contact point $P_{C1}$ is formed near the tip of the middle finger 22*b* and a second contact point $P_{C1}$ is formed near the base of the palm. The greatest distance $D_{SU}$ between said surface plane $P_{SU}$ and the housing 60 formed near the knuckle assembly is less than 10 mm, preferably less than 5 mm, and most preferably less than 1 mm. As shown in this Figure, it is beneficial to have the palm or inner surface of the end effector 10 flat or nearly flat to help maximize the contact surface area between the end effector 10 and the surface plane $P_{SU}$, as this design simplifies approach angles, and reduces the need to perform complex grasping movers with the wrist.

As best shown in FIGS. 3-4, the housing 60 includes a substantially smooth top or back surface SB and a rough or non-smooth or textured surface bottom or palm surface $S_P$. The rough or non-smooth palm surface $S_P$ is created by adding a plurality of contact areas 61.4 to enhance gripping capability. In other words, the entire palm surface $S_P$ is not textured, rough or non-smooth. Said plurality of contact areas 61.4 is designed to increase the end effector's 10 to grasp and hold an object. Specifically, the plurality of contact areas 61.4 are comprised of distinct regions 61.4.2-61.4.10 that include multiple bumps or projections 61.6. Said regions 61.4.2-61.4.10 are formed on the palm, and each assembly (i.e., proximal, medial, and distal) contained within each finger assembly 22a-22d. For example, the palm 62 may have one large contact region 61.4.2, the proximal assemblies of the fingers 22a-22d may include two contact regions 61.4.4, 61.4.6, the medial assemblies of the fingers 22a-22d may include one contact region 61.4.8, and the distal assemblies of the fingers 22a-22d may also include one contact region 61.4.10. The height of the bumps or projections 61.6 may be 0.01 mm to 2 mm, and preferably between 0.25 mm and 0.75 mm. In some aspects, the plurality of contact areas 61.4 may be omitted, the number of regions contained in the plurality of contact areas 61.4 may be increased (e.g., between 18 and 100) or decreased (e.g., between 1 and 16), the number of bumps or projections 64 within each region may be increased or decreased, and/or the height of the bumps or projections 61.6 may be increased or decreased.

Figure 24:
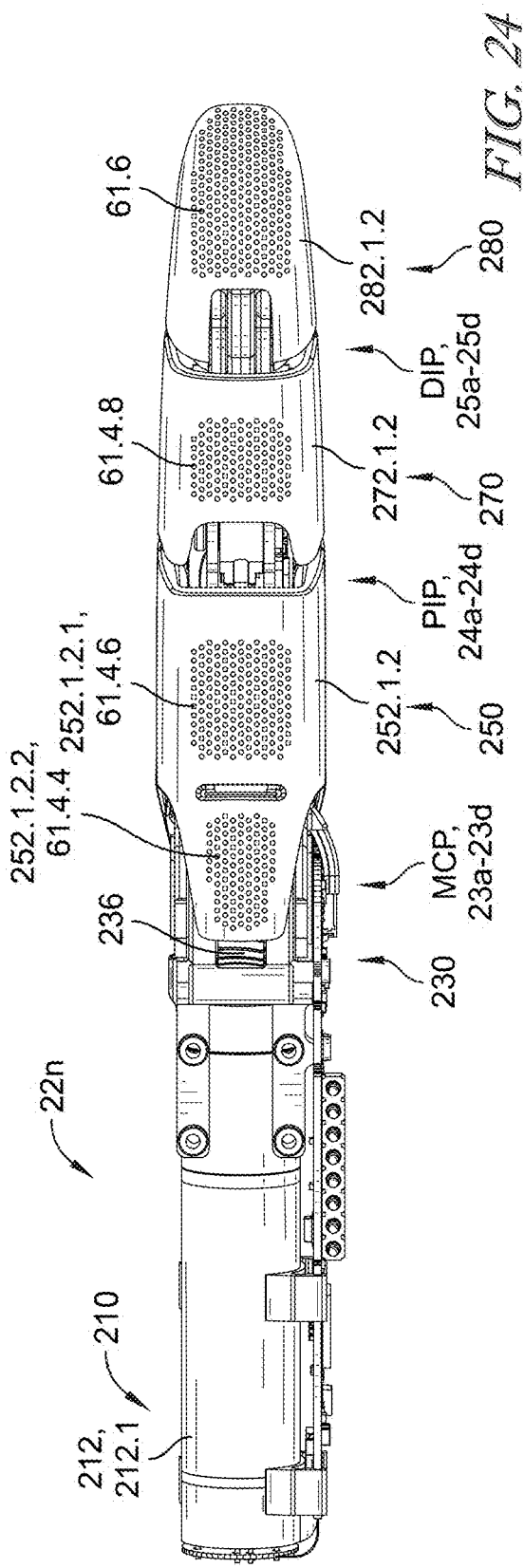
FIG. 24 is a bottom view of the finger assembly of FIG. 17.
Figure 25A:
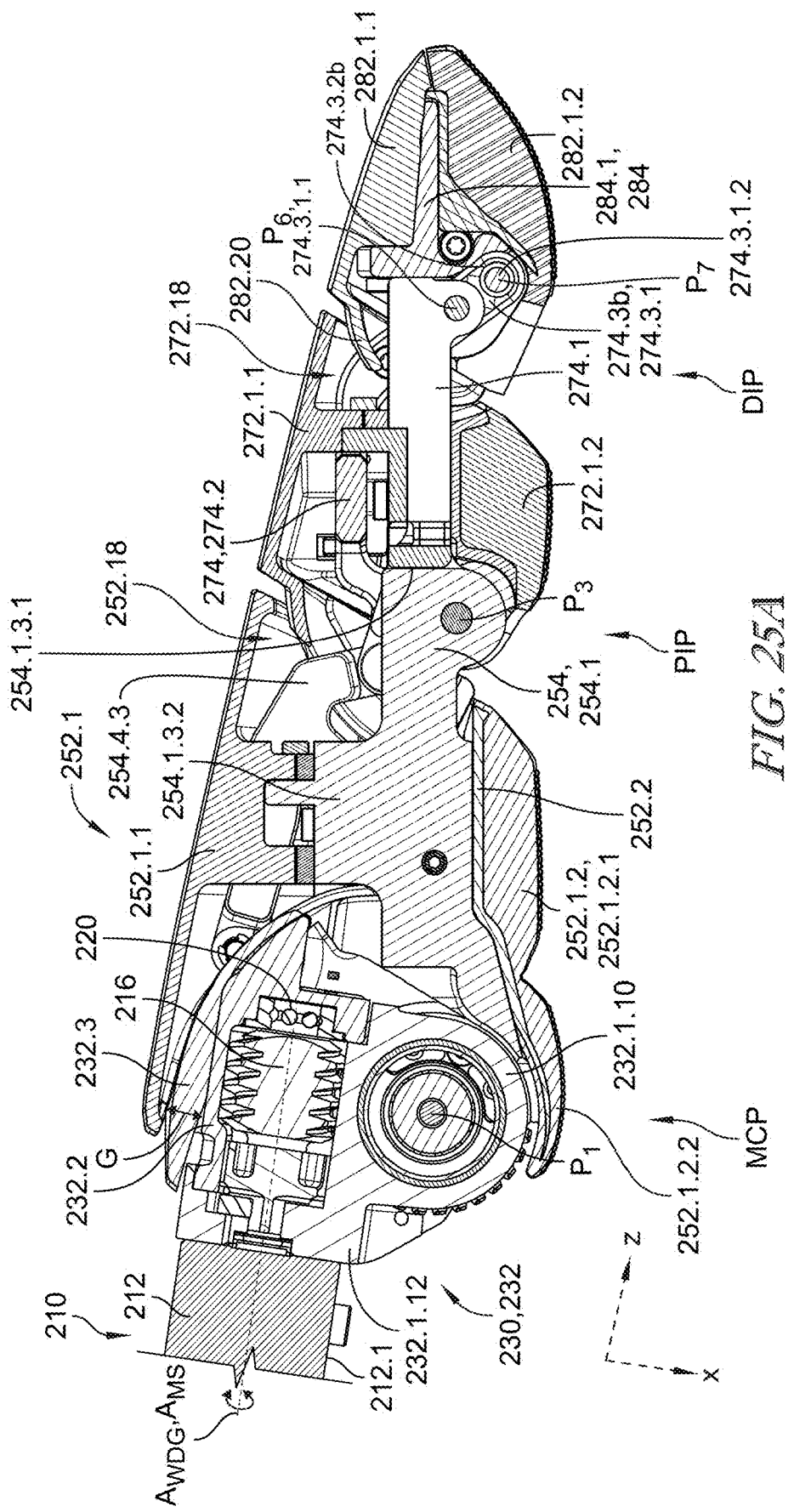
FIG. 25A is a cross-sectional view of the finger assembly taken along line 23A-23A of FIG. 21.
Figure 25B:
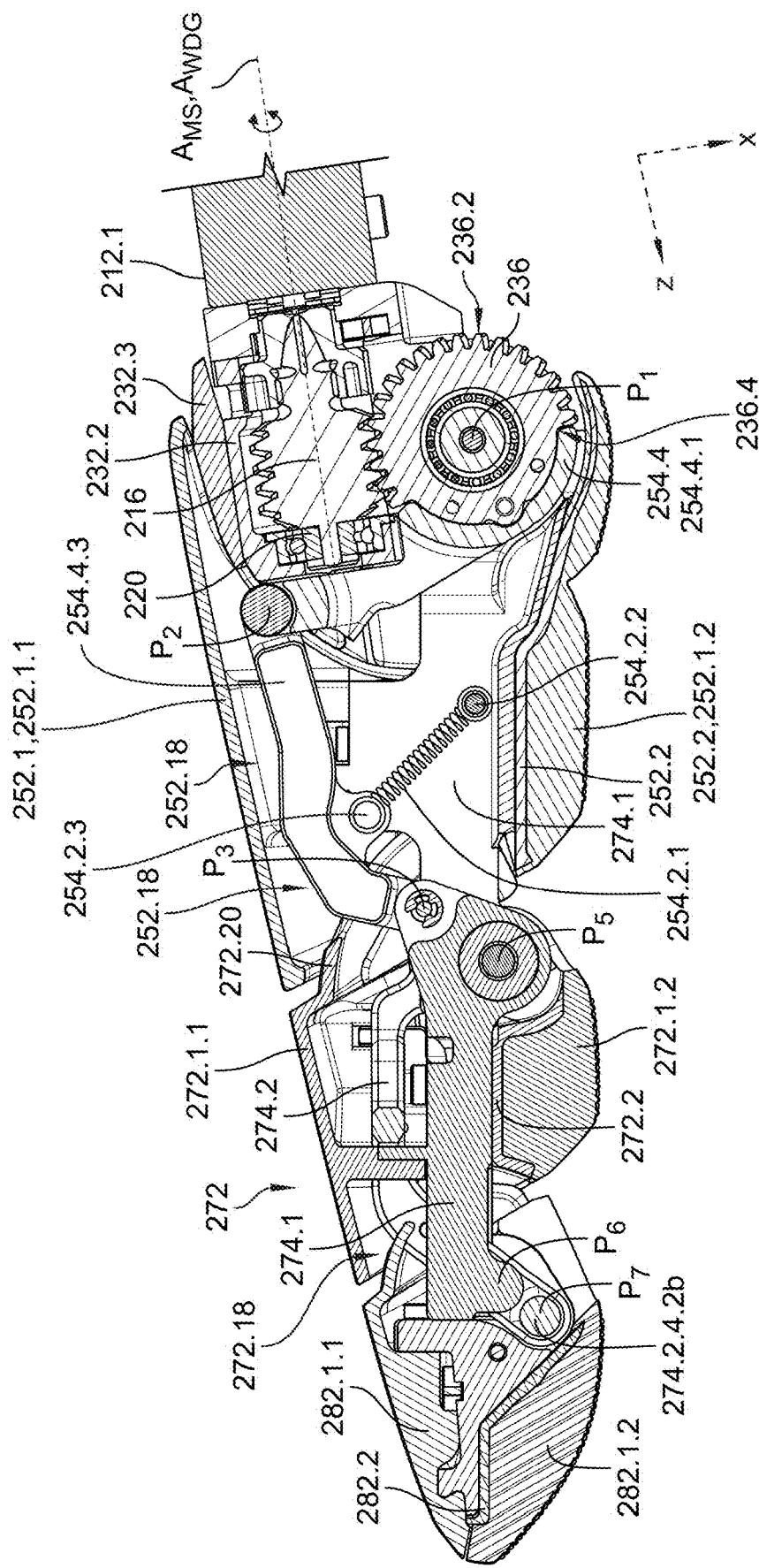
FIG. 25B is a cross-sectional view of the finger assembly taken along line 23B-23B of FIG. 21.
Figure 25C:
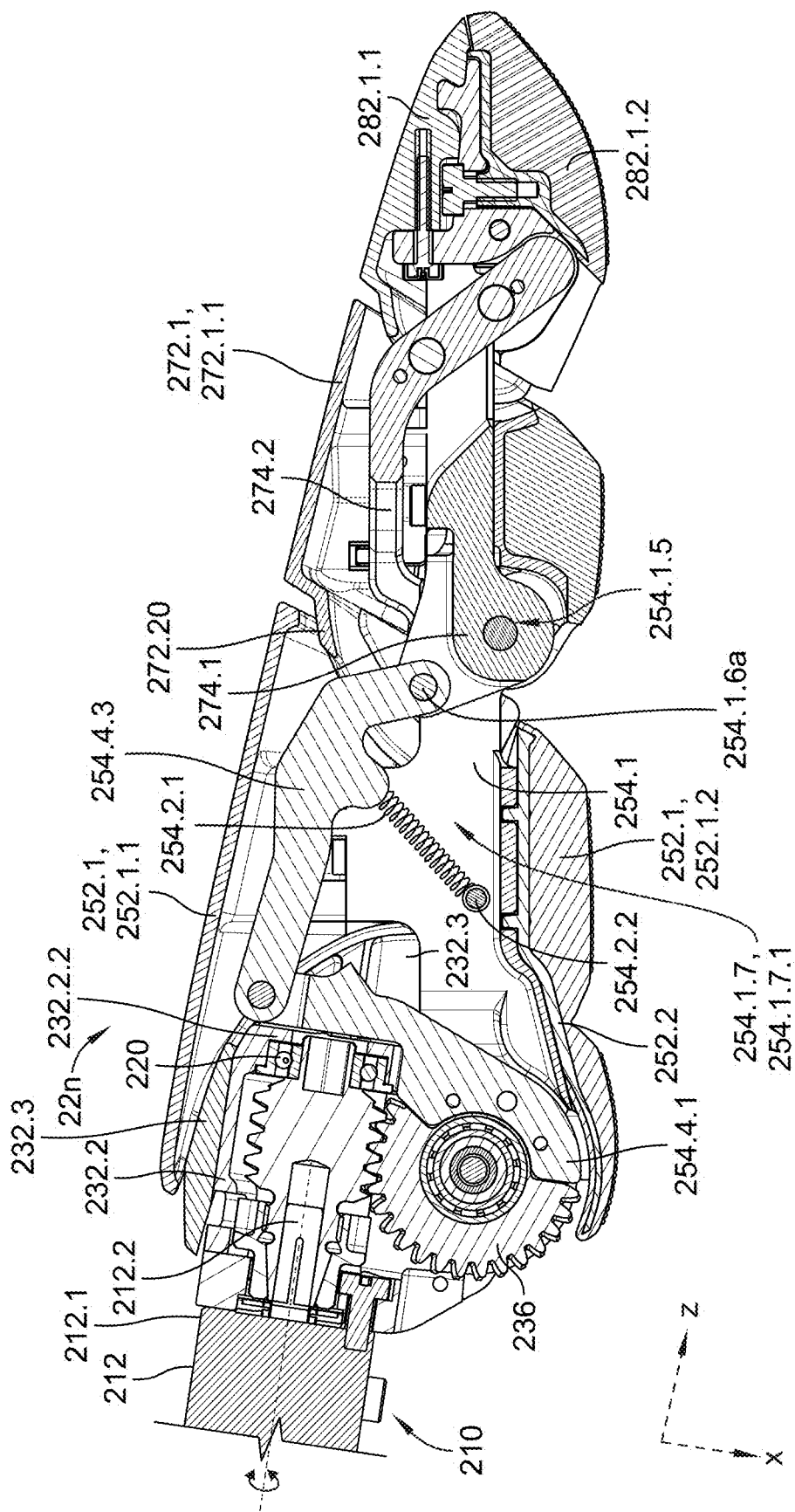
FIG. 25C-FIG. 25D is a cross-sectional view of the finger assembly taken along line 23C-23C of FIG. 21.
Figure 25D:
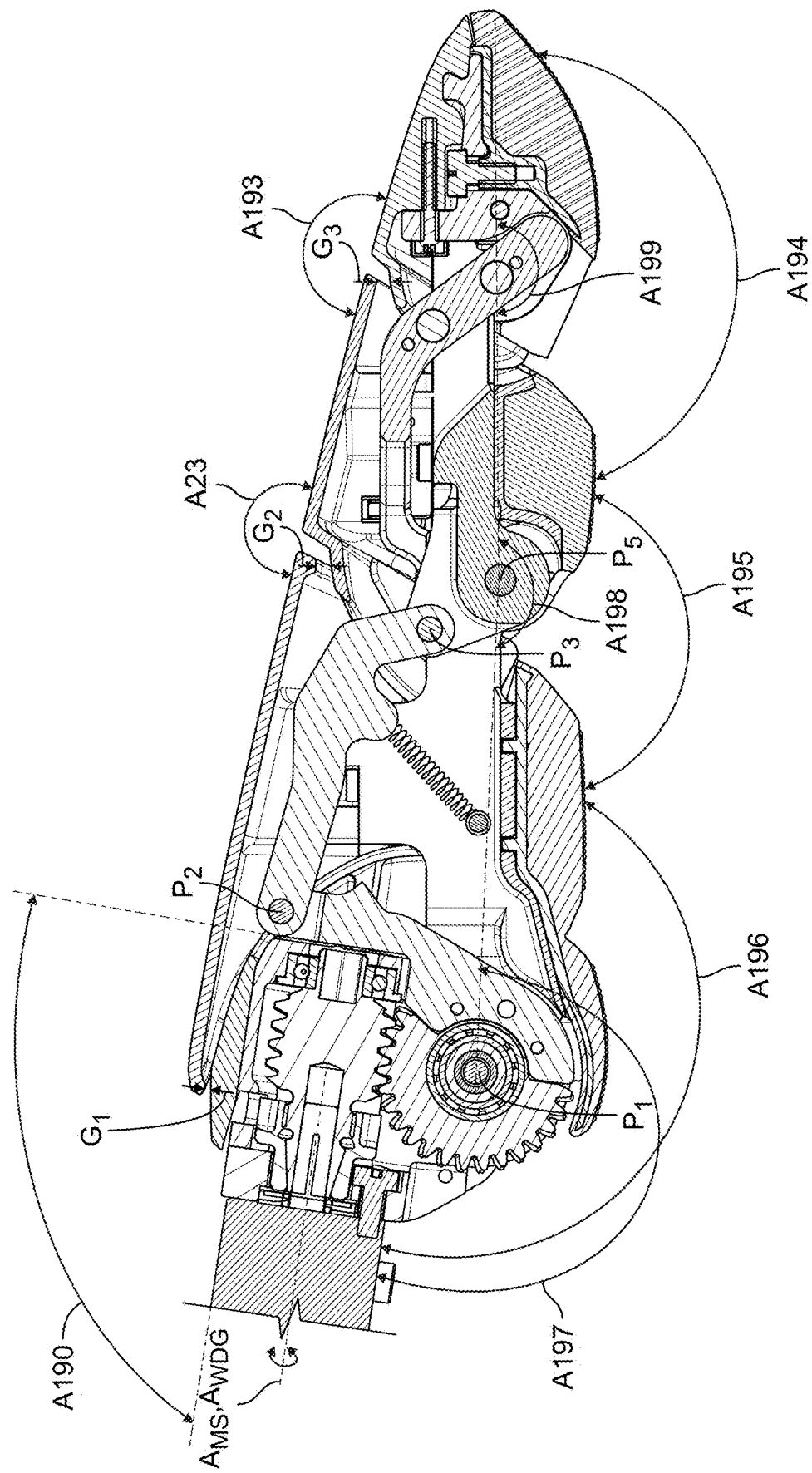
Figure 28:
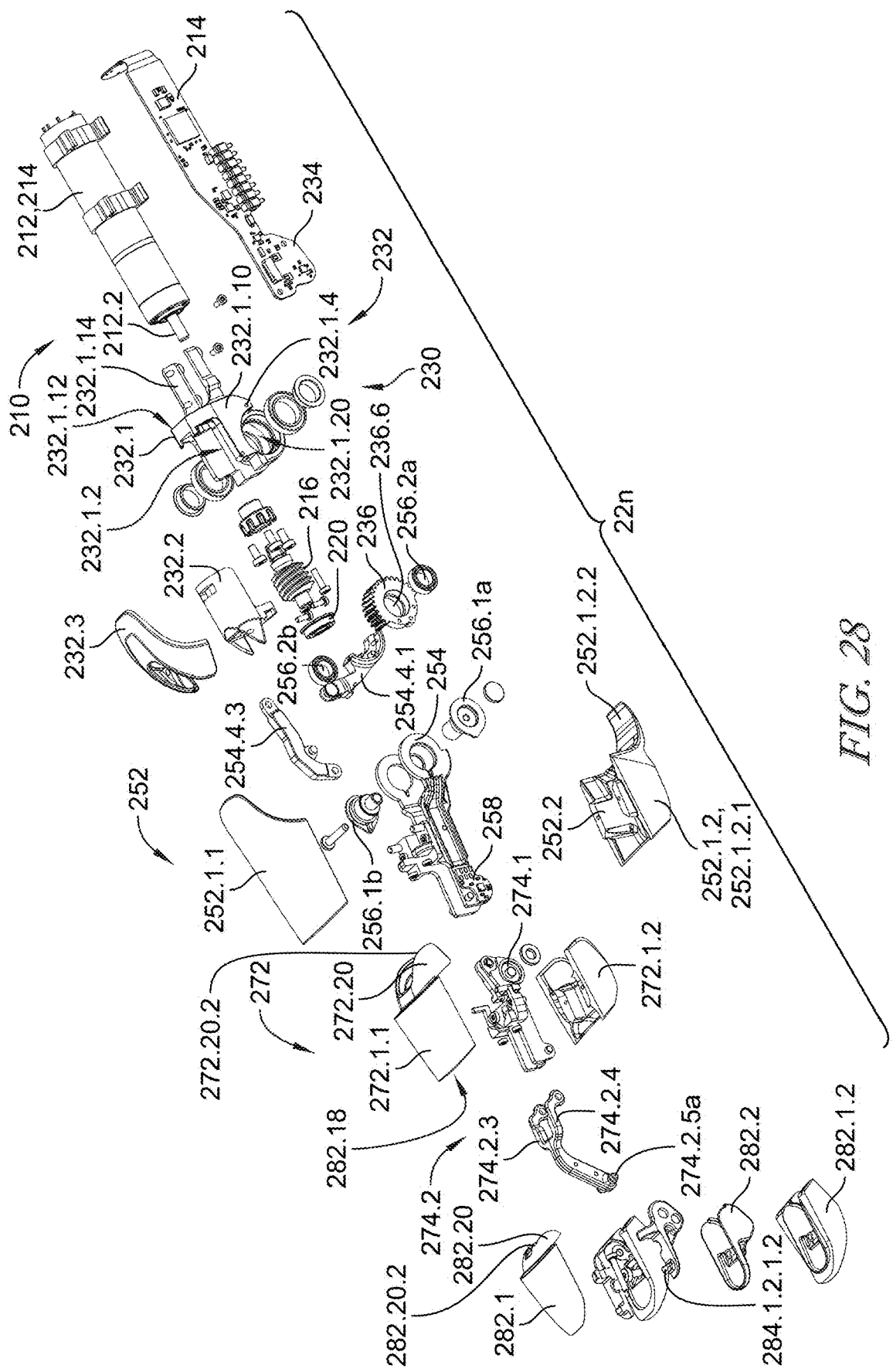
FIG. 28 is an exploded view of the finger assembly of FIG. 17.
Figure 29:
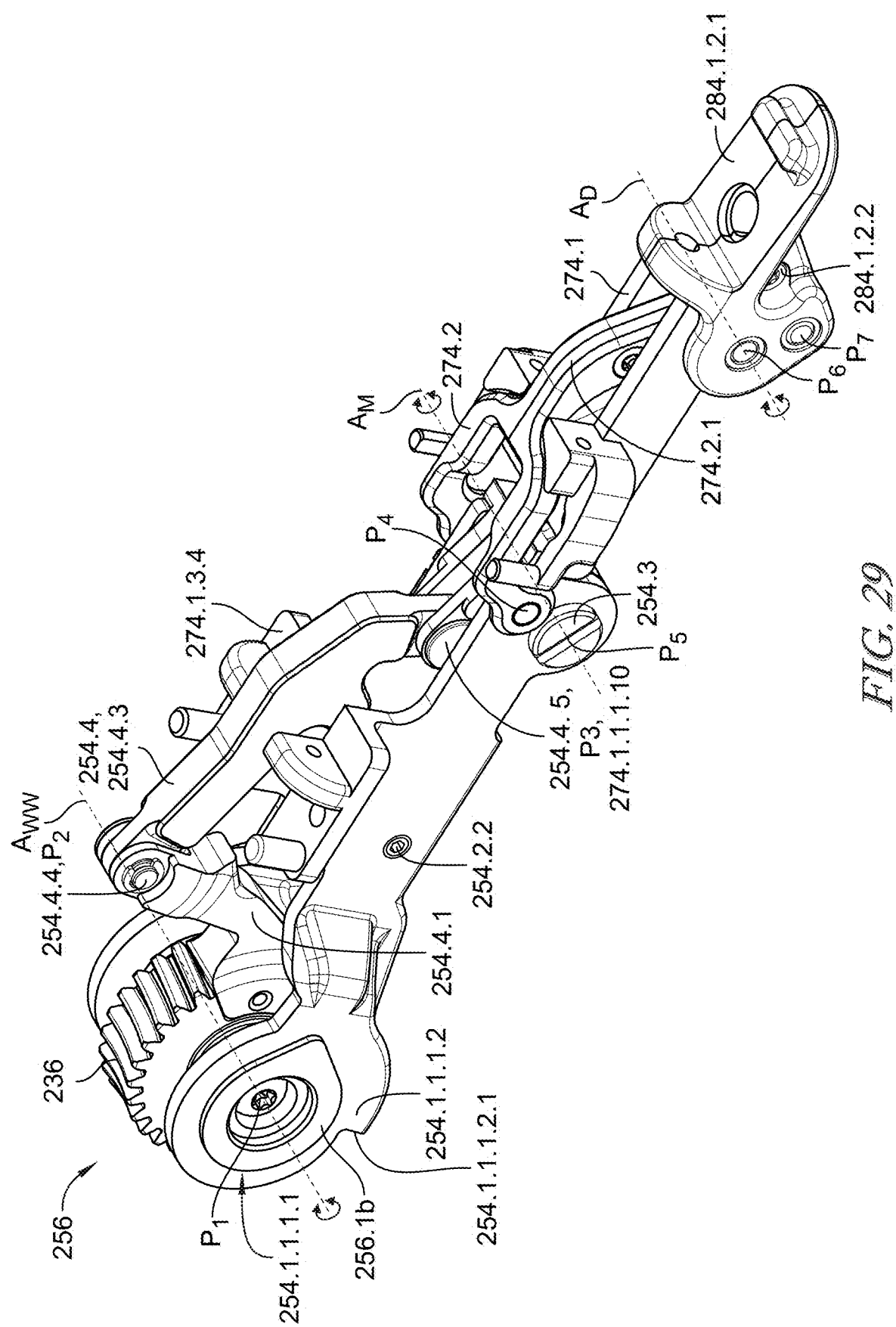
FIG. 29 is a perspective view of the finger assembly of FIG. 17, wherein the housing and motor assembly have been removed to show an internal link assembly.
Figure 30:
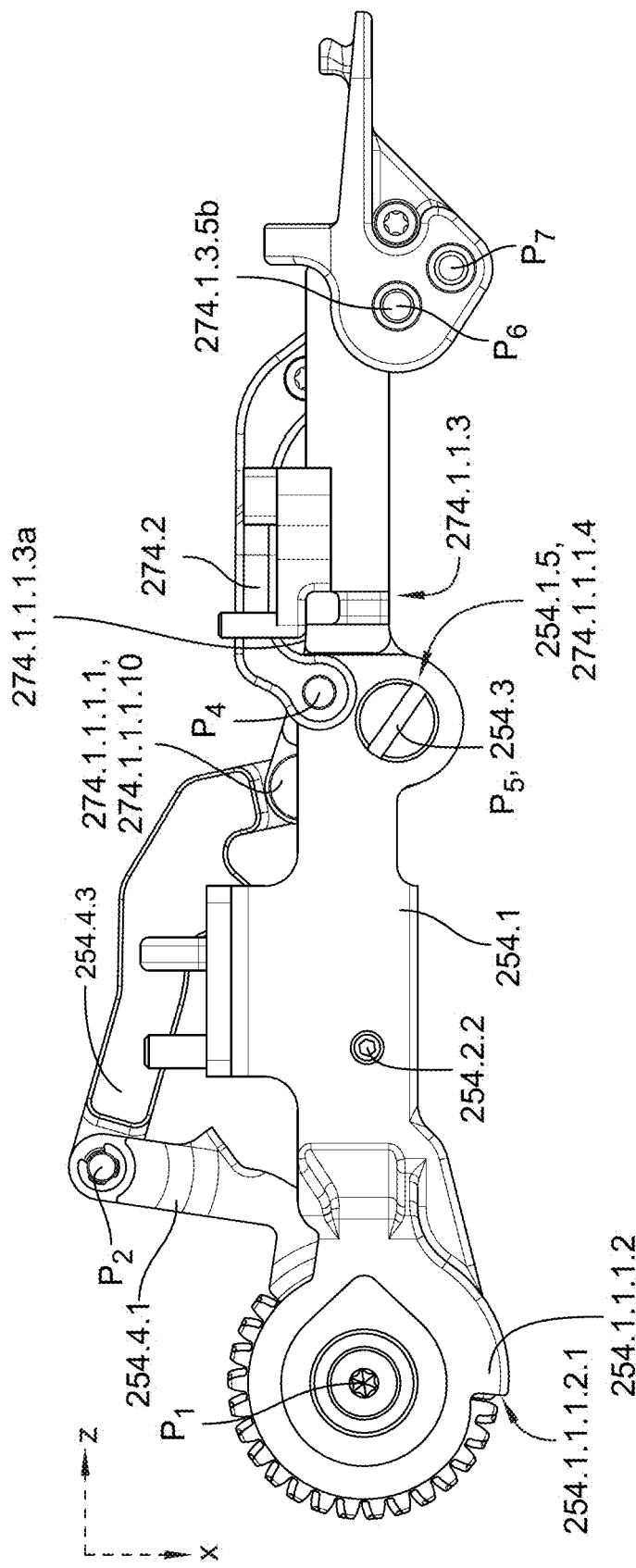
FIG. 30 is a side view of the internal link assembly of FIG. 29.

As best shown in FIGS. 24A-24B, the housing 60 of each finger assembly 22a-22d and specifically the outer surfaces 61.8.2, 61.10.2 of the exterior top housing 61.8 and the interior bottom housing 61.10 have a cross-sectional shape that is similar to an obround or a discorectangle. This cross-sectional shape may provide a narrow width, rounded edges that help the finger assemblies 22a-22d: (i) avoid contact with one another and minimize the risk of snagging or catching on objects during operation, and (ii) provides substantially flat surfaces that help the finger assemblies 22a-22d maximize contact with the object it is grasping. In some aspects, the width of the finger housing may be between 40% to 80%, and in some cases between 55% and 70% of the height of the finger housing. In other embodiments, the width-to-height ratio may be altered or changed in a manner that causes the height to be less than the width. However, this design or configuration may limit the space within the housing for components while potentially affecting the dexterously of the end effector 10. In some implementations, the cross-sectional shape may be customized for specific grasping tasks or object types (e.g., home vs factory). The housing may also incorporate flexible or deformable sections to enhance gripping capabilities. Additionally, the surface texture or material of the housing may be varied along its length to optimize friction and contact properties for different parts of the finger.

With reference, for example, to FIGS. 1-13, the end effector 10 comprises a thumb assembly 40. The thumb assembly 40 is coupled to the palm surface 61.2.2 of the frame 61.2 and is replaceable (and in some embodiments, it may be hot-swapping with a replacement thumb assembly 40). The replaceable aspect of the thumb assembly 40 may eliminate the need for various structural elements, such as synthetic tendons or articulation cables, pulleys, pneumatic or hydraulic cables, and other components that extend from the lower arm or wrist to the medial or distal sections of the thumb assembly 40. This configuration may ensure that components such as linkages, motors, PCBs, encoders, and other elements required to actuate each thumb assembly 40 are self-contained within the palm and/or the thumb assembly 40 and are not spread throughout the robot system. In some aspects, this setup may enhance serviceability, potentially reducing the overall cost of ownership and usage. The thumb assembly 40 may incorporate modular design principles, allowing for easy replacement or customization. In some cases, the thumb assembly 40 may include integrated sensors for improved tactile feedback.

Figure 13:
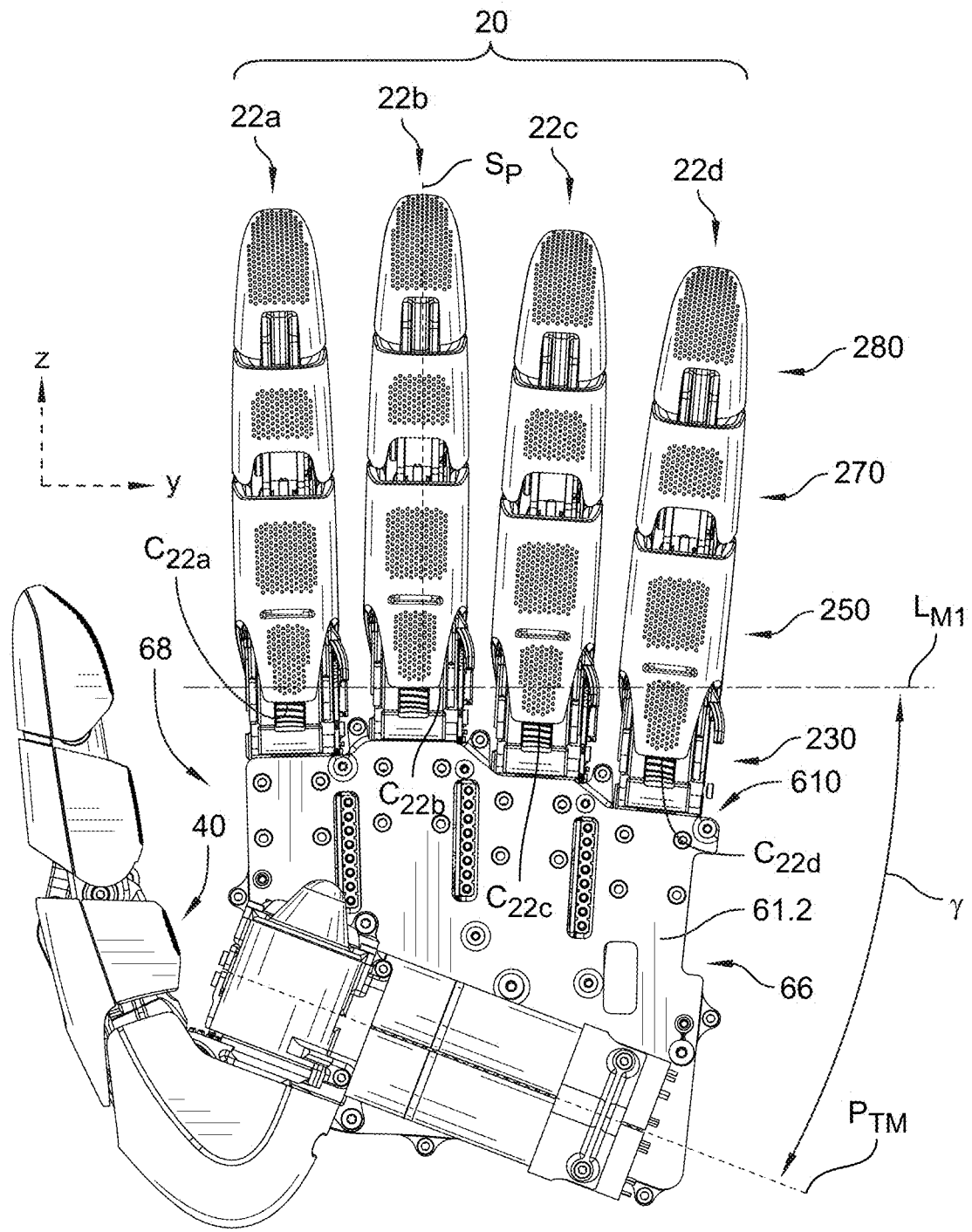
FIG. 13 is a bottom or palm view of the mechanical end effector of FIG. 11.
Figure 14:
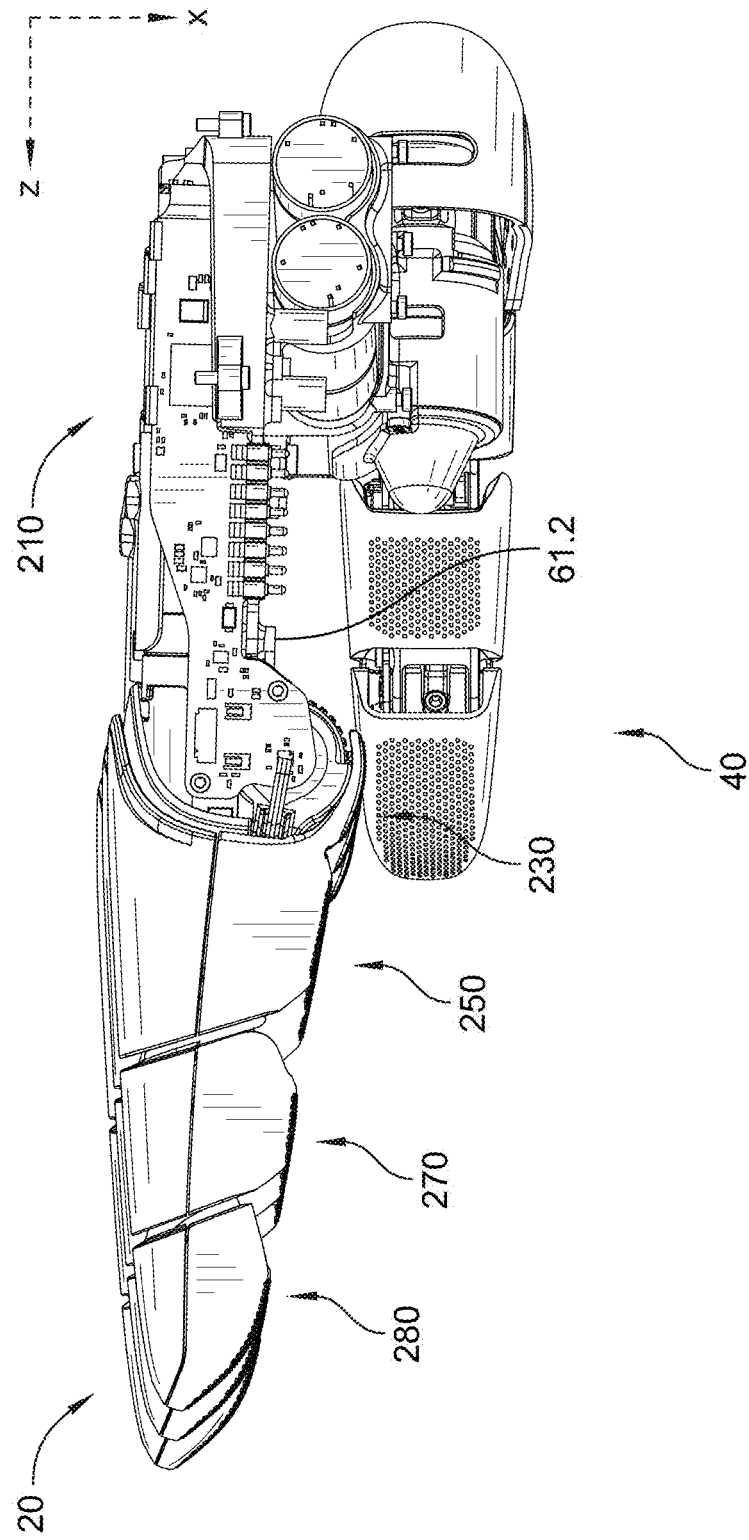
FIG. 14 is a left side view of the mechanical end effector of FIG. 11.

As shown in FIG. 13, the thumb motor plane $P_{TM}$ may be offset by an angle gamma γ from line $L_{M1}$, wherein: (i) line $L_{M1}$ is perpendicular to the sagittal plane PS or the middle finger plane P22b and intersects with the center point of the knuckle assembly 230 of the middle finger 22b, and (ii) the angle gamma γ may be at least 1 degree, in some cases between 2 degrees and 12 degrees, and most preferably in some aspects between 4 degrees and 6 degrees, and likely less than 16 degrees may be less than 16 degrees. In some implementations, the angle gamma γ may be adjustable to optimize thumb positioning for different grasping tasks. The offset angle may allow the thumb to oppose the fingers more effectively in certain configurations. In some cases, the thumb motor plane $P_{TM}$ may be dynamically adjustable during operation to adapt to different object shapes and sizes. The specific angle may be selected based on anthropometric data or empirical testing to achieve desired grasping capabilities for the end effector.

With reference, for example, to FIGS. 15-25, the end effector 10 comprises four identical finger assemblies 22a-22d that are coupled to the back surface 61.2.4 of the frame 61.2 and are configured to operate independent of one another. In embodiments, the end effector 10 may include more or fewer than four finger assemblies. Configuring the finger assemblies 22a-22d identically may allow for reducing the number of distinct components required to manufacture the finger assemblies 22a-22d, and may enhance modularity, potentially reducing expense. The modular nature of the finger assemblies 22a-22d may enable them to be easily replaceable and in some cases may enable hot-swapping of the finger assemblies. The modular and replaceable aspect of the finger assemblies 22a-22d may eliminate the need for various structural elements, such as synthetic tendons or articulation cables, pulleys, pneumatic or hydraulic cables, and other components that extend from the lower arm or wrist to the medial or distal sections of the finger assemblies 20. This configuration may ensure that components such as linkages, motors, PCBs, encoders, and other elements required to actuate each finger assembly 22a-22d are self-contained within the palm and/or within each finger assembly 22a-22d and are not spread throughout the robot system. In some aspects, this setup may enhance serviceability, potentially reducing the overall cost of ownership and usage.

In other embodiments, it should be understood that finger assemblies 22a-22d may not be identical. Instead, there may be two pairs of finger assemblies, wherein the finger assemblies contained in said pairs of finger assemblies are identical. In other words, there may be two unique types of finger assemblies contained in said end effector 10, wherein there are two finger assemblies of a first type and two finger assemblies of a second type. For example, the pointer finger 22a and the small finger 22d may be the first type, while the middle finger 22b and the ring finger 22c may be the second type (while the middle and ring 22b, 22c are different from the pointer and small 22a, 22d). In another example, the pointer finger 22a and the middle finger 22b may be the first type, while the ring finger 22c and the small finger 22d may be the second type (while the ring and small 22c, 22d are different from the pointer and middle 22a, 22b).

In an additional embodiment, there may be two unique types of finger assemblies contained in said end effector 10, wherein there are three finger assemblies of a first type and one finger assembly of a second type. For example, the pointer, middle, and ring fingers 22a-22c may be of the first type and the small finger 22d may be of the second type. In another embodiment, there may be three unique types of finger assemblies contained in said end effector 10, wherein there are two finger assemblies of a first type, one finger assembly of a second type, and one finger assembly of a third type. For example, the middle and ring fingers 22b, 22c may be the first type, the pointer finger 22a may be of the second type to allow for abduction, and the small finger may be of the third type 22d due to its size. In a further embodiment, all finger assemblies 22a-22d may be unique. Finally, it should be understood that other combinations of finger assembly types are contemplated by this application, and the above examples are not intended to be limiting.

With reference, for example, to FIGS. 11-14, each finger assembly 22a-22d may be connected to the back surface 61.2.4 of the frame 61.2. Thus, the overall location of the figure assembly 22a-22d cannot move in the Y-Z plane. Also, the finger assemblies 22a-22d may be connected to the frame 61.2 in a manner that ensures that the tips are not aligned with one another. In other words, each finger assembly 22a-22d is: (i) angularly offset and horizontally offset to at least one other finger assembly 22a-22d in the X-Y plane, and (ii) vertically offset to at least one other finger assembly in the X-Z plane. This configuration of finger assembly 22a-22d enables each finger assembly 22a-22d of the four finger assemblies 22a-22d to be angularly offset along the X-Y plane and within the Y-Z plane with respect to every other finger assembly 22a-22d of the four finger assemblies 22a-22d. The fixed position of the finger assemblies 22a-22d may reduce the complexities of building, using, maintaining, and repairing the end effector 10.

As shown, the middle or third finger assembly 22b is positioned such that its sagittal plane is orientated substantially vertically on the page. Based on the position of the middle or third finger assembly 22b, it can be seen that the center (i.e., $C_{22a}$, $C_{22c}$, $C_{22d}$) of a knuckle assembly 230 of each of the pointer, ring, and small fingers 22a, 22c, and 22d are positioned: (i) slightly rearward from the line $L_{M1}$ and the center $C_{22b}$ of the knuckle assembly of the middle finger 22b (see FIG. 12), and (ii) are angled relative to the center of the knuckle assembly 230 of the middle finger 22b (see FIG. 14). This configuration also causes the fasteners 61.30a-61.30b that removably connected the finger assemblies 22a-22d at a respective point 61.40a-61.40d to the frame 61.2 to be not co-linear. At best, two of the respective point 61.40a-61.40d may be co-linear, but all four points are not co-linear. However, all four respective point 61.40a-61.40d are aligned in the same Y-Z plane.

FIGS. 11-14 also show that the pointer finger plane $P_{22a}$ that bisects the pointer finger 22a along its length is offset from the sagittal plane $P_S$ or the middle finger plane $P_{22b}$ by an angle alpha α, wherein the angle alpha α is usually at least 0.25 degree, preferably between 0.5 degrees and 5 degrees, and most preferably between 2 degrees and 3 degrees, and likely less than 7 degrees. Likewise, the ring finger plane $P_{22c}$ that bisects the ring finger 22c along its length is offset from the sagittal plane $P_S$ or the middle finger plane $P_{22b}$ by an angle beta β, wherein the angle beta β is usually at least 0.25 degree, preferably between 0.5 degrees and 5 degrees, and most preferably between 2 degrees and 3 degrees, and likely less than 7 degrees. Finally, the small finger plane $P_{22d}$ that bisects the small finger 22c along its length is offset from the ring finger plane $P_{22c}$ by an angle theta θ, wherein the angle theta θ is usually at least 0.25 degree, preferably between 0.5 degrees and 5 degrees, and most preferably between 2 degrees and 3 degrees, and likely less than 7 degrees.

Figure 20:
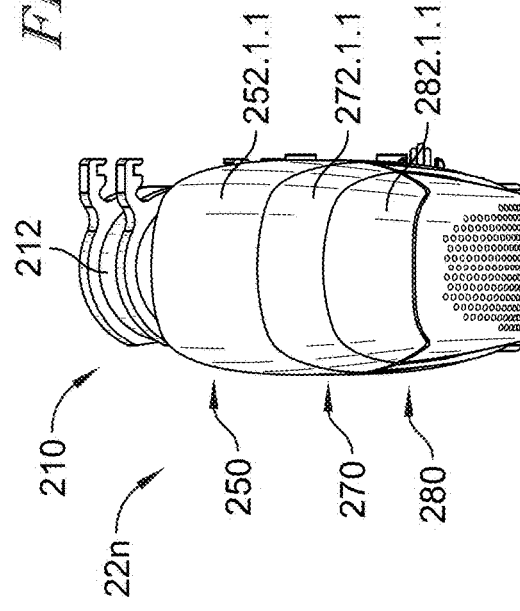
FIG. 20 is a front view of the figure assembly of FIG. 17.
Figure 22:
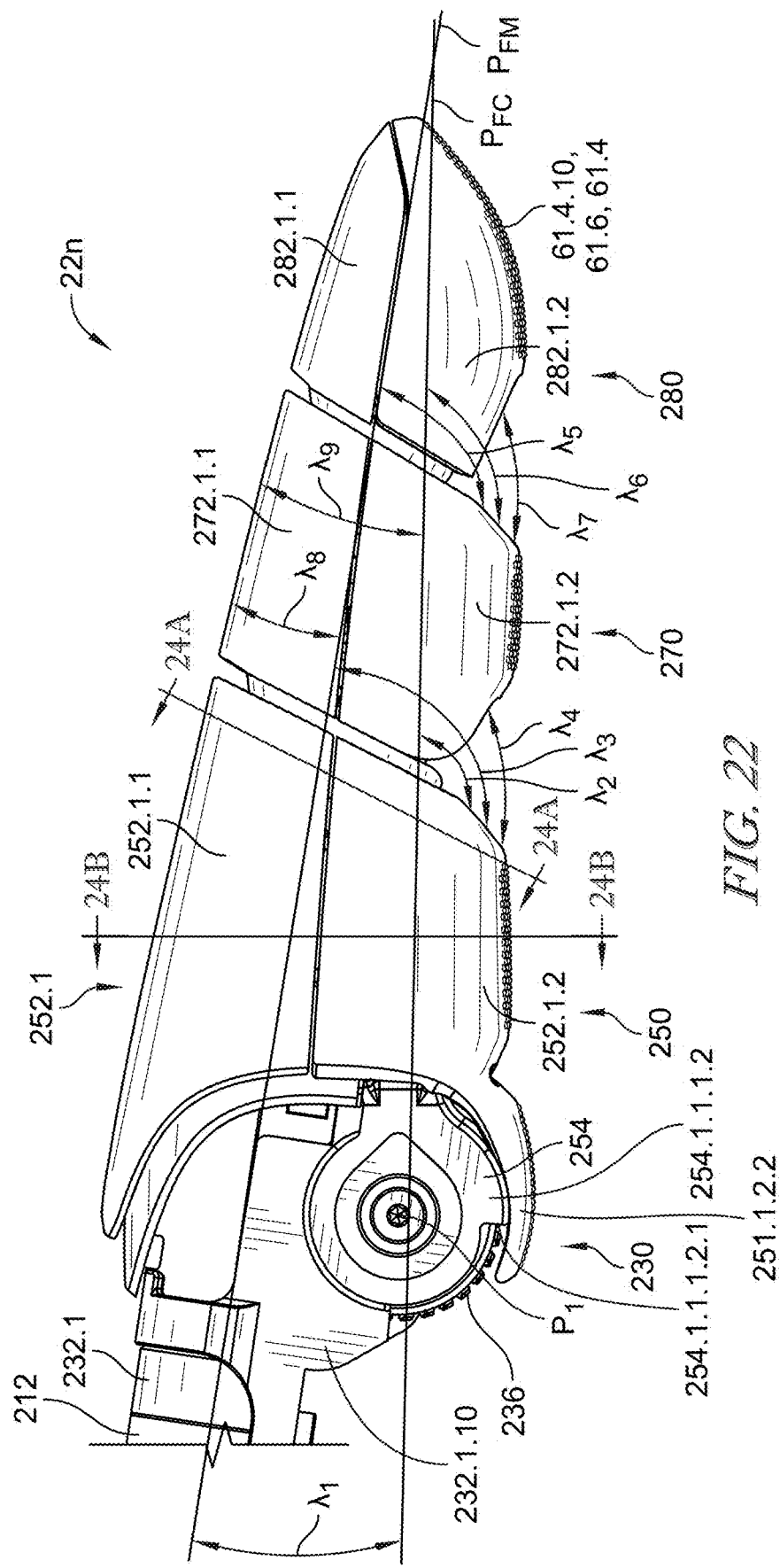
FIG. 22 is a left side view of a portion of the figure assembly of FIG. 17.
Figure 23:
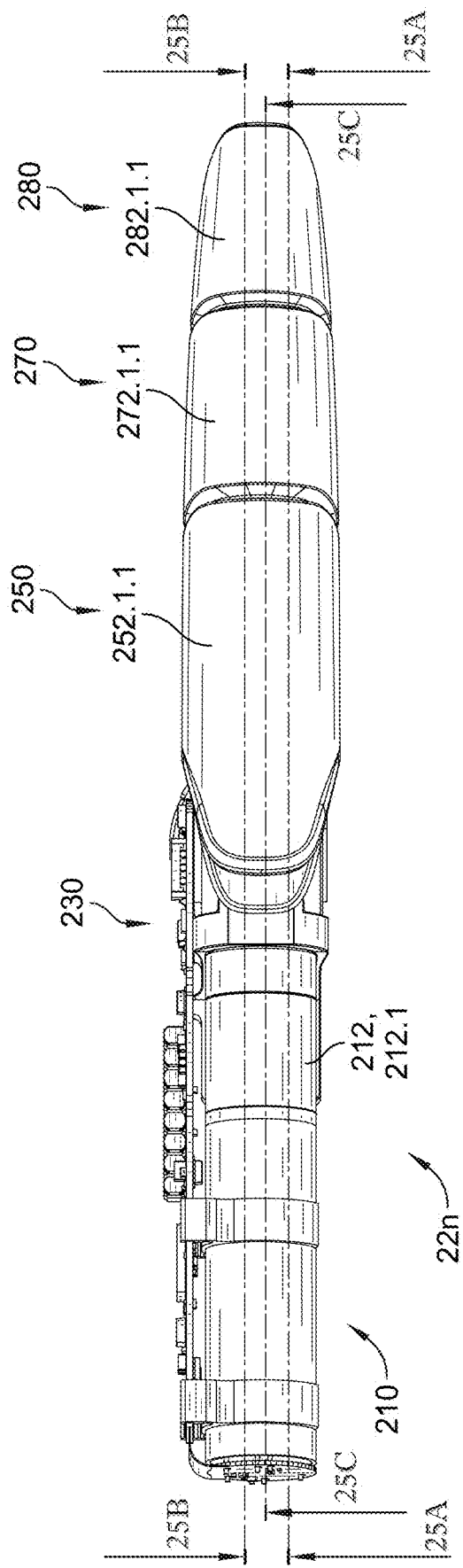
FIG. 23 is a top view of the finger assembly of FIG. 17.

Exemplary positional relationship between components of a finger assembly 22a-22d is shown in FIG. 20 are listed in Table 1. It should be understood that the dimensions, angles, ratios, and other values that can be derived therefrom that are disclosed in the figures and Tables 1-3 are important to ensure that the end effector 10 can move, grasp objects, and be used in the desired robot system. As such, the structures, features, dimensions, angles, ratios, and other values that can be derived therefrom of non-end effectors for robots and non-linkage based end effectors cannot be simply adopted or implemented into an end effector without careful analysis and verification of the complex realities of designing, testing, manufacturing, training, and using the robot system with an end effector. Theoretical designs that attempt to implement such modifications from non-end effectors for robots and non-linkage based end effectors are insufficient (and in some instances, woefully insufficient) because they amount to mere design exercises that are not tethered to the complex realities of successfully designing, testing, manufacturing, training, and using the robot system with an end effector.

TABLE 1

| Angle | Lower Bound | Upper Bound | Preferred Lower Bound | Preferred Upper Bound |
| --- | --- | --- | --- | --- |
| λ1 | 6.4° | 10.6° | 7.6° | 9.3° |
| λ2 | 104.5° | 174.2° | 125.4° | 153.3° |
| λ3 | 98.2° | 163.6° | 117.8° | 144° |
| λ4 | 81.1° | 135.2° | 97.4° | 119° |
| λ5 | 103.1° | 171.8° | 123.7° | 151.1° |
| λ6 | 96.7° | 161.2° | 116° | 141.8° |
| λ7 | 84.6° | 140.9° | 101.5° | 124° |
| λ8 | 4.1° | 6.9° | 5° | 6.1° |
| λ9 | 10.5° | 17.5° | 12.6° | 15.4° |

C. Finger Assembly

With reference, for example, to FIGS. 15-25, each finger assembly 22a-22d of the end effector 10 is comprised of a motor assembly 210, a knuckle assembly 230, a proximal assembly 250, a medial assembly 270, and a distal assembly 280. Each of the knuckle assembly 230, proximal assembly 250, medial assembly 270, and distal assembly 280 include internal linkages (in combination, internal linkage assembly) that can operate together to move the finger assembly 22a-22d. Each of these assemblies will be discussed in great detail below; however, additional information about said assemblies may be contained within U.S. Provisional Patent Applications Nos. 63/614,499, 63/617,762, 63/561,315, 63/573,226, 63/615,766, 63/620,633, all of which are incorporated herein by reference for any purpose.

a. Motor Assembly

The motor assembly 210 may be configured to be releasably coupled to the top surface 61.2.4 of the housing frame 61.2, and may include: (i) a motor 212, (ii) controller 214, (iii) a worm drive gear 216 that may be coupled to an extent of the motor 212, and (v) a worm drive gear bearing 220. Motor 212 may be a slotless BLDC motor, a brushed DC motor, a stepper motor, a switched reluctance motor, a permanent magnet synchronous motor, a servo motor, or any other suitable motor. As shown in the Figures, the motor assembly 210 for each finger assembly 22a-22d may include only a single motor 212; thus, said finger assembly 22a-22d may not include more than one motor 212. By limiting the number of motors 212 to the number of finger assemblies 22a-22d, the end effector 10 may become underactuated. In other words, each finger assembly 22a-22d may include three joints or 3 degrees of freedom (DoF), wherein each of the three joints or DoFs may be controlled by a single motor 212. This configuration may simplify manufacturing, increase durability, enable the finger assemblies 22a-22d to be modular, and may also reduce cost and complexity of control. In some aspects, the single motor configuration may allow for more compact designs and improved energy efficiency. Additionally, the underactuated nature of the system may provide adaptive grasping capabilities, potentially enhancing the end effector's ability to handle objects of various shapes and sizes.

As best shown in FIG. 23C, the motor 212 includes: (i) internal components (not shown), (ii) a motor housing 212.1, and (iii) a motor shaft 212.2. The internal components of the motor 212 are designed to rotate the motor shaft 212.2 about a motor shaft axis $A_{MS}$. To help ensure that the motor shaft 212.2 rotates about the motor shaft axis $A_{MS}$ at the desired speed, the internal components of the motor 212 may include a transmission, gear reduction, or other component. In addition to altering the speed of the motor shaft 212.2, it should be understood that the transmission, gear reduction, or other component may prevent the motor shaft 212.2 from making full revolutions (i.e., 365 degrees) around the motor shaft axis $A_{MS}$. In fact, it may be beneficial to physically limit the rotational movement of the motor shaft 212.2 (as opposed to electronically limiting said rotation using programming or control methodologies) because it helps ensure that the finger assembly 22a-22d cannot be over-rotated. However, in other embodiments, the transmission, gear reduction, or other component may not prevent the motor shaft 212.2 from making full revolutions (i.e., 365 degrees) around the motor shaft axis $A_{MS}$. In this embodiment, electronically limiting said rotation using programming or control methodologies may be used to help ensure that the finger assembly 22a-22d is not over-rotated. Alternatively, it may be desirable to allow the motor shaft 212.2 to full revolutions (i.e., 365 degrees) based on the gearing ratio.

As shown in the Figure, the worm drive gear 216 extends past a frontal portion of the motor housing 212.1 and: (i) includes an extent that is designed to receive the motor shaft 212.2 to enable said worm drive gear 216 to be coupled to the motor shaft 212.2, and (ii) has helical or screw-like threads. Coupling said worm drive gear 216 to the motor shaft 212.2 enables the internal components of the motor 212 to rotate the motor shaft 212.2 around the motor shaft axis $A_{MS}$, wherein said rotation of the motor shaft 212.2 around the motor shaft axis $A_{MS}$ causes the worm drive gear 216 to rotate about a worm drive gear axis $A_{WDG}$. Due to the configuration of the motor assembly 210 and the worm drive gear 216, the motor shaft axis $A_{MS}$ and the worm drive gear axis $A_{WDG}$ are parallel, aligned, and coaxial. Additionally, this configuration also causes the motor shaft axis $A_{MS}$ and the worm drive gear axis $A_{WDG}$ to be parallel with (and potentially, coaxial with) the finger motor plane $P_{FM}$. It should be understood that in other embodiments, the motor shaft axis $A_{MS}$, the worm drive gear axis $A_{WDG}$, and finger motor plane $P_{FM}$ may not be parallel, aligned, and coaxial. Instead, the motor shaft axis Ans and the worm drive gear axis $A_{WDG}$ may be perpendicular to one another, while the finger motor plane $P_{FM}$ may be parallel with the motor shaft axis $A_{MS}$.

As described above, the motor assembly 210 may also include a worm drive gear bearing 220 that is positioned within an extent of the knuckle assembly 230 and may be designed to support the distal, rotating end of the worm drive gear 216. In some aspects, the worm drive gear bearing 220 may be omitted or integrally formed with the worm drive gear 216. In some implementations, the motor shaft 212.2 and the worm drive gear 216 may be integrally formed and/or sealed. Additionally, the worm drive gear bearing 220 may incorporate different bearing types such as ball bearings, roller bearings, or bushings depending on load requirements and desired performance characteristics. The positioning of the worm drive gear bearing 220 within the knuckle assembly 230 may allow for a more compact design while providing support for the rotating components. In some cases, multiple bearings may be used to support the worm drive gear 216 at different points along its length. The integration of the worm drive gear bearing 220 with other components may reduce the overall part count and simplify assembly procedures. The material selection for the worm drive gear bearing 220 may be optimized for factors such as wear resistance, load capacity, and operating temperature range to enhance the longevity and reliability of the mechanism.

As best shown in FIGS. 23A-23C and discussed below, the worm drive gear 216 may be designed to be in geared engagement with an extent of the knuckle assembly 230, wherein said geared engagement may enable the rotation of the worm drive gear 216, via the motor shaft 212.2, to cause the finger assembly 22a-22d to move. As shown in the Figures, the motor assembly 210 may be a part of the finger assembly 22a-22d and may not be located in a remote portion of the robot system. While this may limit the dimensions of the end effector (i.e., how small), it may reduce linkages, increase modularity, reduce parts, increase accessibility into the working environment and increase the reliability of the finger assembly 22a-22d. In some aspects, the motor assembly 210 may be positioned in different locations within the finger assembly 22a-22d to optimize space utilization or weight distribution. The geared engagement between the worm drive gear 216 and the knuckle assembly 230 may be designed with various gear ratios to achieve different torque and speed characteristics. In some implementations, additional gearing mechanisms may be incorporated to further refine the movement control of the finger assembly. The integration of the motor assembly 210 within the finger assembly 22a-22d may allow for more compact designs and potentially improved responsiveness in certain applications.

b. Knuckle Assembly

The knuckle assembly 230 is positioned forward of a majority of the motor assembly 210 and is configured to allow the finger assembly 22a-22d to move from the open, uncurled, or neutral state to the closed, curled, or inwardly rotated state. In said closed, curled, or inwardly rotated state, an acute interior angle is formed between the palm 62 and an interior surface of the finger assembly 22a-22d. With reference, for example, to FIGS. 15 and 23A-23C, the knuckle assembly 230 includes: (i) a housing assembly 232, (ii) a knuckle PCB 234, and (iii) a worm wheel 236 that is in contact with and configured to interact with the worm drive gear 216.

The housing assembly 232 includes a frame 232.1, a knuckle cover 232.2, and an external skin 232.3. The frame 232.1 includes: (i) sidewalls 232.1.10, (ii) a headwall 232.1.12, and (iii) a rearward extending mounting projection 232.1.14. The mounting projection 232.1.14 is designed to be coupled with the motor housing 212.1, while the headwall 232.1.12 is designed to be positioned adjacent to a frontal extent of the motor housing 212.1. Thus, the frame 232.1 is positioned adjacent to both the lateral surface and the frontal surface of the motor housing 212.1. This helps provide sufficient support for the knuckle and the portion of the finger assembly 22a-22d that extends therefrom. In other words, the frame 232.1 is made from a material that is sufficiently rigid to withstand the torque/other forces that are associated with the movement of the various assemblies.

The sidewalls 232.1.10 of the frame 232.1 extend forward from the headwall 232.1.12. Said sidewalls 232.1.10 also form a proximal link aperture 232.1.2 that is configured to receive an extent of a worm wheel interface 256 (discussed further below) and is configured to: (i) be secured to an extent of the housing frame 61.2, and (ii) at least partially surround the worm wheel 236, worm drive gear 216, and an extent of the motor 212. This design helps protect the motor shaft 212.2 and the worm drive gear 216 from damage that may be caused by an external force. The sidewalls 232.1.10 also include: (i) coupling points 232.1.4 for the knuckle PCB 234, which is configured to control an extent of the finger assembly 22a-22d and provide positional information back to the robot system, and (ii) bearing apertures 232.1.20 that are designed to receive the bearings that allow the motor assembly 210 to continue driving the worm drive gear 216 after an extent of the proximal assembly 250 has reached a resistance point (e.g., contact with an object).

The knuckle cover 232.2 is positioned adjacent to the sidewalls 232.1.10, includes a frontal wall 232.2.2 that has a recess that is designed to receive the worm drive gear bearing 220, and is designed to overlay an upper extent of the worm drive gear 216. As such, the knuckle cover 232.2 supports and protects the worm drive gear 216 and an extent of the motor 212. The support and protection provided by the knuckle cover 232.2 allows the external skin 232.3 to be: (i) less rigid than the knuckle cover 232.2, (ii) easily replaceable in case of damage, and (iii) focused on minimizing the gap G that is formed between knuckle assembly 230 and the proximal assembly 250. To minimize the gap G, the external skin 232.3 has: (i) a left to right, arched configuration, (ii) a front to back, curvilinear design, and (iii) varying thicknesses (see FIGS. 23A-23C, 26). The complex design of the external skin 232.3 enables: (i) a substantial extent of the external skin 232.3 to be positioned within an extent of the proximal assembly 250, when the finger assembly 22a-22d is in the open, uncurled, or neutral state, and (ii) a minor extent of, or none of, the external skin 232.3 to be positioned within an extent of the proximal assembly 250, when the finger assembly 22a-22d is in the closed, curled, or inwardly rotated state. By enabling at least a minimal extent of the external skin 232.3 to be positioned within, or adjacent to, the proximal assembly 250, the gap $G_1$ formed between the assemblies 230 and 250 is minimized, and wherein said minimization of said gap $G_1$ is beneficial because it minimizes the chance or probability that a textile assembly—namely, a glove—or external covering can be caught or pinched between these assemblies. In light of the above disclosure, the knuckle cover 232.2 may be made from metal or a sufficiently rigid material, while the external skin 232.3 may be made from deformable silicon, thermoset plastic, or any other suitable materials disclosed herein or known in the art.

The worm wheel 236 is a semi-circular toothed gear that is designed to be in geared engagement with the worm drive gear 216. In particular, the worm wheel 236 includes: (i) a toothed section 236.2 that includes 18 teeth that encircle 220 degrees of the worm wheel 236, (ii) a recessed portion 236.4 that is designed to receive an extent of the worm drive link 254.4.1, and (iii) a central bearing opening 236.6 that are designed to receive a first and second worm bearings 256.2a, 256.2b (as discussed below). Said worm wheel 236 is designed to rotate about a worm wheel axis $A_{WW}$, wherein said worm wheel axis $A_{WW}$ is located at the center of the central bearing opening 236.6 and the first pivot point $P_1$. It should be understood that in other embodiments, the worm wheel 236 may include additional teeth (e.g., between 19 and 50) or fewer teeth (e.g., between 5 and 17). Additionally, the toothed section 236.2 may span more than 220 degrees (e.g., between 221 and 300 degrees) or span less than 220 degrees (e.g., between 100 and 119 degrees).

As discussed above, the rotation of the motor shaft 212.2 around the motor shaft axis $A_{MS}$ causes the worm drive gear 216 to rotate about a worm drive gear axis $A_{WDG}$. The rotation of the worm drive gear 216 about a worm drive gear axis $A_{WDG}$ causes the worm wheel 236 to rotate above the worm wheel axis $A_{WW}$ or the first pivot point $P_1$. Because the toothed section 236.2 of the worm wheel 236 only encircles 220 degrees of the worm wheel 236, said worm wheel 236 can only rotate approximately 220 degrees above the worm wheel axis $A_{WW}$ or the first pivot point $P_1$. In other words, the worm wheel 236 cannot fully rotate (i.e., at least 365 degrees or more) around the worm wheel axis $A_{WW}$ or the first pivot point $P_1$. Due to the configuration of the motor assembly 210, the worm drive gear 216, and worm wheel 236, the worm wheel axis $A_{WW}$ is perpendicular to the motor shaft axis $A_{MS}$, the worm drive gear axis $A_{WDG}$, and the finger motor plane $P_{FM}$. However, as shown in the Figures, both the motor shaft axis Ans and the worm drive gear axis $A_{WDG}$ are positioned above or away from the palm in comparison to the worm wheel axis $A_{WW}$ or the first pivot point $P_1$. In other words, the worm wheel axis $A_{WW}$ or the first pivot point $P_1$ underlies an extent of the motor shaft axis $A_{MS}$ and the worm drive gear axis $A_{WDG}$.

The knuckle PCB 234 includes a first finger encoder (e.g., magnetic, optical, capacitive, resistive, etc.) that is positioned proximate to the metacarpophalangeal joint MJ and configured to collect proximal data, wherein said proximal data includes information related to the rotation of the metacarpophalangeal joint MJ. Said proximal data may use the robot system to generate a vector representation (e.g., a space embedding) indicating the state of the proximal assembly 250 or the environment around the proximal assembly 250. The encoder of the knuckle PCB 234 may collect data upon a specific command from the robot system or periodically (e.g., between 500 times per second to every minute). Also, as shown in the Figures, the controller 214 and said knuckle PCB can be co-located on a single PCB. In other embodiments, the controller 214 and the knuckle PCB 234 may be split on different PCBs.

c. Proximal Assembly

The proximal assembly 250 is positioned between the knuckle assembly 230 and the medial assembly 270 and is the first portion of the finger assembly 22a-22d configured to move relative to the housing frame 61.2 and the palm 62 in response to actuation of the motor 210 and worm drive gear 216. The proximal assembly 250 includes: (i) a proximal housing assembly 252, (ii) a proximal link assembly 254, (iii) the worm wheel interface 256, and (iv) a proximal PCB 258.

i. Proximal Housing Assembly

As shown in FIGS. 23A-24B and 32-34, the proximal housing assembly 252 is designed to substantially surround a majority of the other components of the proximal assembly 250. To achieve this, the proximal housing assembly 252 forms an internal proximal recess 252.18. The internal proximal recess 252.18 is designed to not only surround components of the proximal assembly 250, but is also designed to receive: (i) an extent of the medial assembly 270 (namely, the medial tongue 272.20), when the finger assembly 22a-22d is in the open, uncurled, or neutral state, and (ii) a lesser extent of, or none of, the medial assembly 270 (namely, the medial tongue 272.20), when the finger assembly 22a-22d is in the closed, curled, or inwardly rotated state. In other words, the proximal housing assembly 252 overlies: (i) a substantial extent of the medial tongue 272.20 when the finger assembly 22a-22d is in the open, uncurled, or neutral state, and (ii) a minor extent of, or none of, the medial tongue 272.20 when the finger assembly 22a-22d is in the closed, curled, or inwardly rotated state. Stated another way, the percentage of the medial assembly 270 (namely, the medial tongue 272.20) that is positioned within the proximal housing assembly 252 is reduced when the finger assembly 22a-22d moves from the open, uncurled, or neutral state to the closed, curled, or inwardly rotated state. By enabling at least a minimal extent of the medial assembly 270 (namely, the medial tongue 272.20) to be positioned within or adjacent to the proximal assembly 250, the gap $G_2$ formed between the assemblies 250 and 270 is minimized, and wherein said minimization of said gap $G_2$ is beneficial because it minimizes the chance or probability that a textile assembly—namely, a glove—or external covering can be caught or pinched between these assemblies.

As shown in FIGS. 17-26 and 32-33, the proximal housing assembly 252 specifically includes: (i) a proximal jacket assembly 252.1 with a top member 252.1.1 and a bottom member 252.1.2, and (ii) a proximal bottom casing assembly 252.2. While the bottom member 252.1.2 is in direct contact with and underlies the proximal bottom casing assembly 252.2, the finger assembly 22a-22d lacks a proximal top casing assembly that is in direct contact with the top member 252.1.1. This design is advantageous because the proximal bottom casing assembly 252.2 provides the bottom member 252.1.2 with additional rigidity, which enables said bottom member 252.1.2 to be made from a softer, easier-to-form, and potentially less durable material, thereby increasing the gripping capability of the end effector 10. In contrast, the top member 252.1.1 does not need to include a softer, easier-to-form, and potentially less durable material because said top member 252.1.1 is not designed to come into regular contact with objects. Additionally, even if the materials of the proximal bottom casing assembly 252.2 and the bottom member 252.1.2 are the same, it may be desirable to form these components as two separate components to facilitate replicability without exposing an inner extent of the finger assembly 22a-22d. Another way of describing this beneficial configuration includes the fact that the proximal jacket assembly 252.1 is configured to provide the primary external shape of the finger assembly 22a-22d, while the proximal casing assembly 252.2 is configured to protect the proximal PCB 258 and provide a spacer between the proximal link assembly 254 and the proximal jacket assembly 252.1. Nevertheless, it should be understood that in an alternative embodiment, the bottom member 252.1.2 and the proximal bottom casing assembly 252.2 may be integrally formed as a single structure.

As best shown in FIGS. 23A-24B, the top member 252.1.1 of the proximal jacket assembly 252.1 includes an exterior surface back with a curvilinear extent in a first direction (namely, across the width of the finger assembly 22a-22d), and the bottom member 252.1.2 of the proximal jacket assembly 252.1 includes an exterior palm surface with a curvilinear extent in the first direction (namely, across the width of the finger assembly 22a-22d) and a second direction (namely, across the length of the finger assembly 22a-22d). The curvilinear extent in the first direction helps ensure that the finger assembly 22a-22d has rounded edges to help with grasping objects, while the curvilinear extent in the second direction helps ensure that the finger can curl inward. Additionally, the bottom member 252.1.2 of the proximal jacket assembly 252.1 may include a main body portion 252.1.2.1 and a rearward projection 252.1.2.2, wherein said main body portion is designed to be positioned forward of the first joint or metacarpophalangeal joint MJ, while the rearward projection 252.1.2.2 is designed to underlie and protect the metacarpophalangeal joint MJ. Due to the fact that the bottom member 252.1.2 includes two distinct portions 252.1.2.1, 252.1.2.2, said bottom member 252.1.2 also includes two contact regions 61.4.4, 61.4.6. It should be understood that in an alternative embodiment, the portions 252.1.2.1, 252.1.2.2 of the bottom member 252.1.2 may be omitted.

As discussed above, the proximal housing assembly 252 may be: (i) made from the same materials as the housing assembly 60, (ii) made from material that differs from the materials used in the housing assembly 60, and/or (iii) may include silicon, plastic (e.g., may include a polymer composition), carbon composite, or metal, a combination of these materials, any other material disclosed herein, and/or any other suitable material. In some aspects, the proximal housing assembly 252 may include additional components or layers (e.g., between three and an nth). The proximal housing assembly 252 may incorporate specialized materials or coatings to enhance grip, durability, or sensor capabilities. For example, a layer of electroactive polymer may be included to enable shape-changing properties, or a layer of piezoelectric material may be added for tactile sensing. In some implementations, the layers may be interchangeable to allow customization for different tasks or environments. The assembly may also feature self-healing materials in certain layers to extend the lifespan of high-wear areas.

ii. Proximal Link Assembly

As shown in FIGS. 27-42, the proximal link assembly 254 includes: (i) a primary or main proximal link or first bar 254.1, (ii) a biasing assembly 254.2, (iii) a medial assembly coupler 254.3, and (iv) a proximal drive link assembly 254.4. The proximal link assembly 254 is involved with all movements of the finger assembly 22a-22d. In other words, at least one aspect of the proximal link assembly 254 must move in order to cause any portion of the finger assembly 22a-22d to move. This feature is beneficial because it reduces complexities, reduces components, cost, weight, increases reliability, and may have other benefits.

Figure 38:
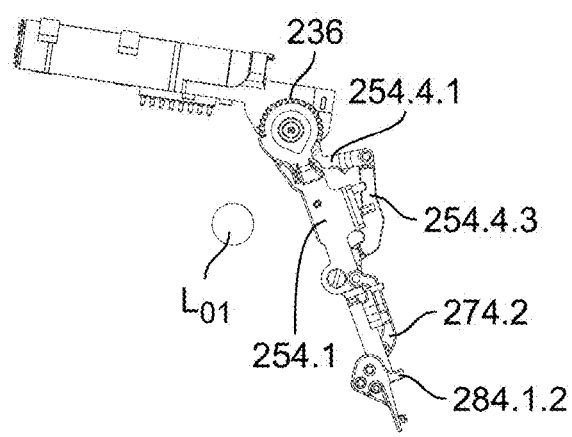
FIG. 38 shows the object in the first location and a right side view of the finger assembly in a third configuration $C_3$, wherein the proximal, medial, and distal assemblies are substantially aligned in the first state.
Figure 39:
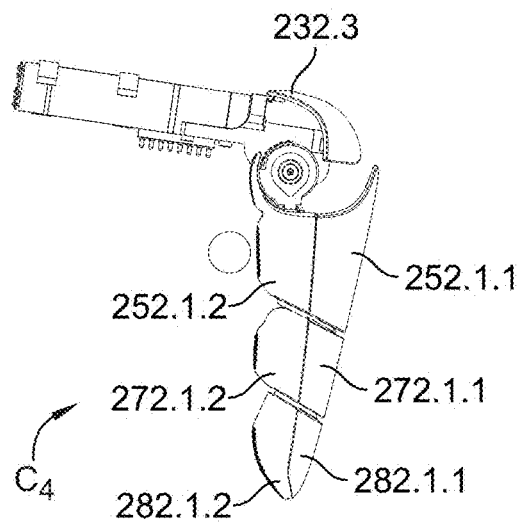
FIG. 39 shows the object in the first location and a right side view of the motor and movement assembly in the third configuration $C_3$.

The primary or main proximal link or first bar 254.1 is best shown in FIGS. 27 and 38-40. The main proximal link 254.1 includes: (i) partially-circular frame members or first proximal link segment 254.1.1, (ii) second proximal link segment 254.1.2, (iii) third proximal link segment 254.1.3, (iv) proximal link bridge 254.1.4, (v) medial assembly opening 254.1.5, and (vi) first and second medial link projections 254.1.6a, 254.1.6b. The partially-circular frame members segment 254.1.1 include left and right extents 254.1.1.1, 254.1.1.2 that extend from the rearmost extent of the main proximal link 254.1 to line $S_1$ shown in FIG. 39. Like partially-circular frame members segment 254.1.1, the second proximal link segment 254.1.2 also includes left and right extents 254.1.2.1, 254.1.2.2 that extend between lines $S_1$ and $S_2$ shown in FIG. 39. As shown in FIG. 39, the left and right extents 254.1.2.1, 254.1.2.2 taper inward as they extend from line $S_1$ to line $S_2$, which reduces the overall width of the link 254.1. The reduction in width is beneficial because it allows for a reduction in the width of the finger assembly 22a-22d to allow for conformal materials to aid in gripping objects. It should be understood that in other embodiments, the taper may be greater or lesser, or it may be eliminated.

Also, as shown in FIG. 39, like the second proximal link segment 254.1.2, the third proximal link segment 254.1.3 also includes left and right extents 254.1.3.1, 254.1.3.2 that extend forward from line $S_2$ toward the forward most extent of main proximal link or first bar 254.1. These left and right extents 254.1.3.1, 254.1.3.2 may be substantially parallel to the left and right extents 254.1.1.1, 254.1.1.2, but may not be aligned therewith due to the taper of the left and right extents 254.1.2.1, 254.1.2.2. In some aspects, said left and right extents 254.1.3.1, 254.1.3.2 may not be substantially parallel and/or may be substantially aligned with other components of the main proximal link 254.1. The configuration of these extents may allow for customization of the finger assembly's shape and movement characteristics. In some implementations, the taper and alignment of the various extents may be adjustable to optimize grasping capabilities for different object types or sizes. The parallel arrangement in some cases may provide structural stability, while non-parallel configurations may offer increased flexibility in certain grasping scenarios. The specific geometry of these components may be tailored to meet particular functional requirements or to enhance overall dexterity of the robotic finger.

As shown in FIG. 38, the partially-circular frame members segment 254.1.1 includes a metacarpophalangeal joint coupler 254.1.1.1 that helps form a first joint or metacarpophalangeal joint MJ and includes an axle aperture 254.1.1.1.1 and stopping projection 254.1.1.1.2. As such, the first joint or metacarpophalangeal joint MJ is formed between the knuckle assembly 230 and the proximal assembly 250. The axle aperture 254.1.1.1.1 of the metacarpophalangeal joint coupler 254.1.1.1 is non-circular and is configured to receive an extent of the worm wheel interface 256 (which will be discussed later). The non-circular configuration allows helps ensure that the worm wheel interface 256 does not slip within the aperture 254.1.1.1.1, when the motor assembly 210 drives the worm drive gear 216, which turns the worm wheel 236, and whereby causing the worm drive link 254.4.1 and the proximal drive link 254.4.3 to move the primary or main proximal link or first bar 254.1. Slipping within said aperture 254.1.1.1.1 would not only cause the finger assembly 22a-22d to fail to properly move, but it would also cause the encoders and other sensors to error in knowing the finger assemblies 22a-22d location and position in space. It should be understood that other non-circular configurations of the axle aperture 254.1.1.1.1 are contemplated by this disclosure (e.g., tear-drop).

Referring to FIGS. 27, 28, 34, and 40, the stopping projection 254.1.1.1.2 may be positioned in a lower extent of the partially-circular frame members segment 254.1.1. When the proximal assembly 250 is closed, curled, or in the inwardly rotated state, the stopping projection 254.1.1.1.2 may include a first limiting interface region 254.1.1.1.2.1 that may be configured to interact with or contact an extent of the knuckle frame member 232.1. It should be understood that the above described interface region 254.1.1.1.2.1 need not make contact with the described adjacent structures, and instead, a gap may be present between these structures regardless of the state of the finger assembly 22a-22d. In some aspects, the stopping projection 254.1.1.1.2 may be adjustable to allow for fine-tuning of the finger assembly's range of motion. The first limiting interface region 254.1.1.1.2.1 may be coated with a low-friction material to reduce wear during repeated interactions. In some implementations, multiple stopping projections may be incorporated at different positions to provide staged limiting of movement. The interaction between the stopping projection and the knuckle frame member may be monitored by sensors to provide feedback on the finger assembly's position. In some cases, the stopping projection may be designed with a cushioning mechanism to soften the impact when reaching the limit of movement.

Figure 40:
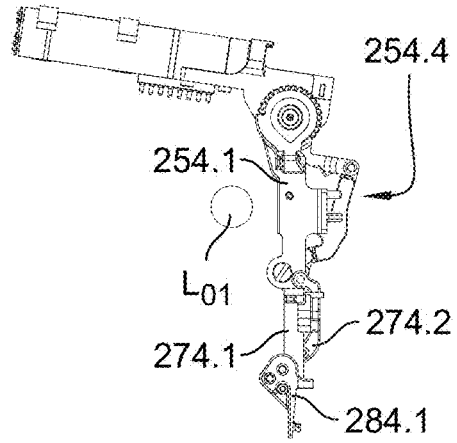
FIG. 40 shows the object in the first location and a right side cross-sectional view of the finger assembly in the third configuration $C_3$.

As shown in FIGS. 38-40, the third segment 254.1.3 of the main proximal link 254.1 includes the second limiting interface region 254.1.3.1 and housing mounting projections 254.1.3.2. The second limiting interface region 254.1.3.1 is best shown in FIGS. 23A and 38-40 and is configured to prevent the proximal assembly 250 from over-rotating or curling backward. While the second limiting interface region 254.1.3.1 is positioned on the forwardmost extent of the third segment 254.1.3, the housing mounting projections 254.1.3.2 are positioned on the uppermost point of the third segment 254.1.3 and are configured to couple to both the proximal jacket and proximal casing assemblies 252.1, 252.2 within the finger assembly 22a-22d. Other methods of preventing over-rotation and coupling the housing assembly 252 within the finger assembly 22a-22d are contemplated by this disclosure. For example, the housing assembly 252 may be configured to prevent over-rotation, while said housing assembly 252 may be formed from a single piece of material.

As shown in FIG. 39, the proximal bridge 254.1.4 extends between the left and right extents 254.1.3.1 and 254.1.3.2 of the third proximal link segment 254.1.3. Thus, the combination of the proximal bridge 254.1.4 and the left and right extents 254.1.3.1, 254.1.3.2 forms a U-shaped member with a proximal link recess 254.1.7. Said proximal link recess 254.1.7 includes a first portion 254.1.7.1 and a second portion 254.1.7.2. When the finger assembly 22a-22d is closed, curled, or inwardly rotated position: (i) the first portion 254.1.7.1 that extends rearward from line $S_3$ is configured to receive the worm drive link 254.4.1, and (ii) the second portion 254.1.7.2 that extends forward from line $S_3$ is configured to receive the proximal drive link 254.4.3. Finally, the medial assembly opening 254.1.5 and first and second medial link projections 254.1.6 are positioned in a forward extent of the proximal link 254.1 (i.e., forward of line $S_3$) and are configured to interact with the medial assembly 270.

Figure 52:
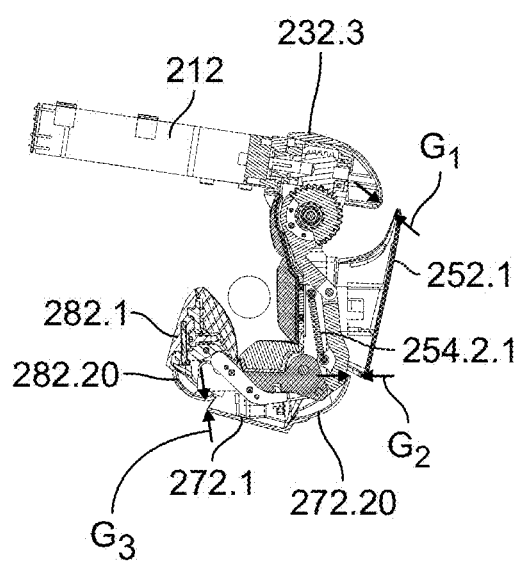
FIG. 52 shows the object in the first location and a right side cross-sectional view of the finger assembly in the seventh configuration $C_7$ taken through line 49-49 as shown in FIG. 57.
Figure 59:
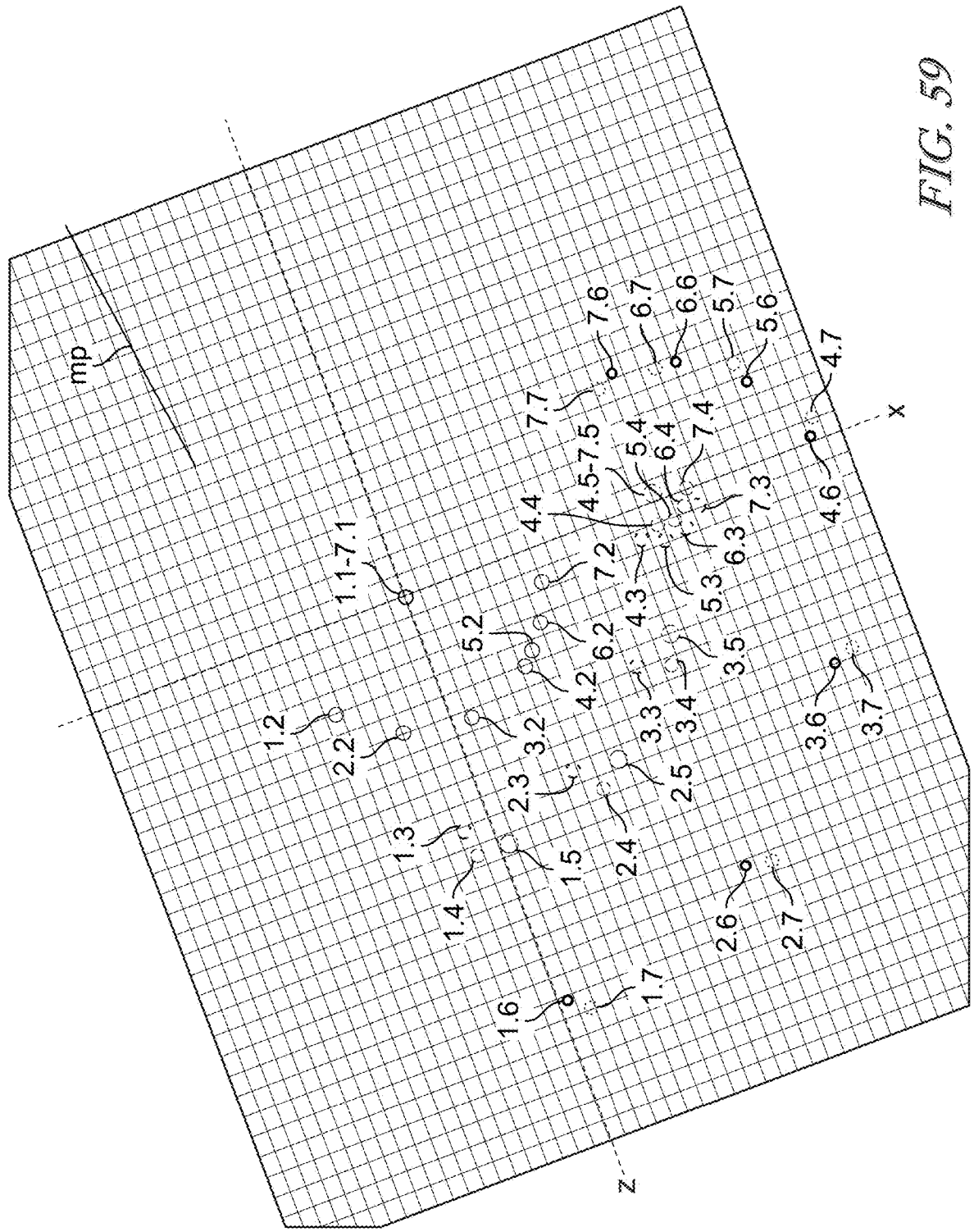
FIG. 59 is a schematic diagram showing the movement of the pivot points as the movement assembly moves from the first configuration to the seventh configuration.
Figure 60:
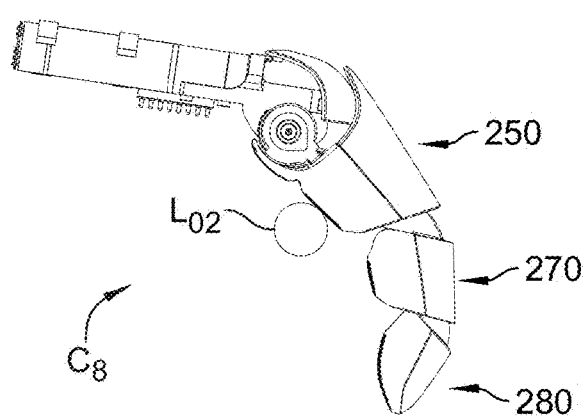
FIG. 60 shows the object in a second location and a left side view of the finger assembly in an eighth configuration $C_8$, and wherein: (i) the proximal assembly is in contact with the object and (ii) the medial and distal assemblies are in a partially curled state.

As shown in FIG. 52, the biasing assembly 254.2 includes a biasing member 254.2.1, a first biasing coupler 254.2.2, and a second biasing coupler 254.2.3. The first biasing coupler 254.2.2 is positioned within the first portion 254.1.7.1 of the proximal link recess 254.1.7 of the main proximal link 254.1 and extends between the left and right extents 254.1.3.1, 254.1.3.2 of the third proximal link segment 254.1.3. Meanwhile, the second biasing coupler 254.2.3 is coupled to a projection that depends from the proximal drive link 254.4.3 (discussed further below). As such, one end of the biasing member 254.2.1 is coupled to the first biasing coupler 254.2.2, while a second opposed end of the biasing member 254.2.1 is coupled to the second biasing coupler 254.2.3. The biasing member 254.2.1 may be a spring (e.g., coil spring) or any other member (e.g., magnet) that can provide a biasing force on an extent of the finger assembly 22a-22d in order to control the order of closure/collapse of the components contained in said finger assembly 22a-22d.

Figure 31:
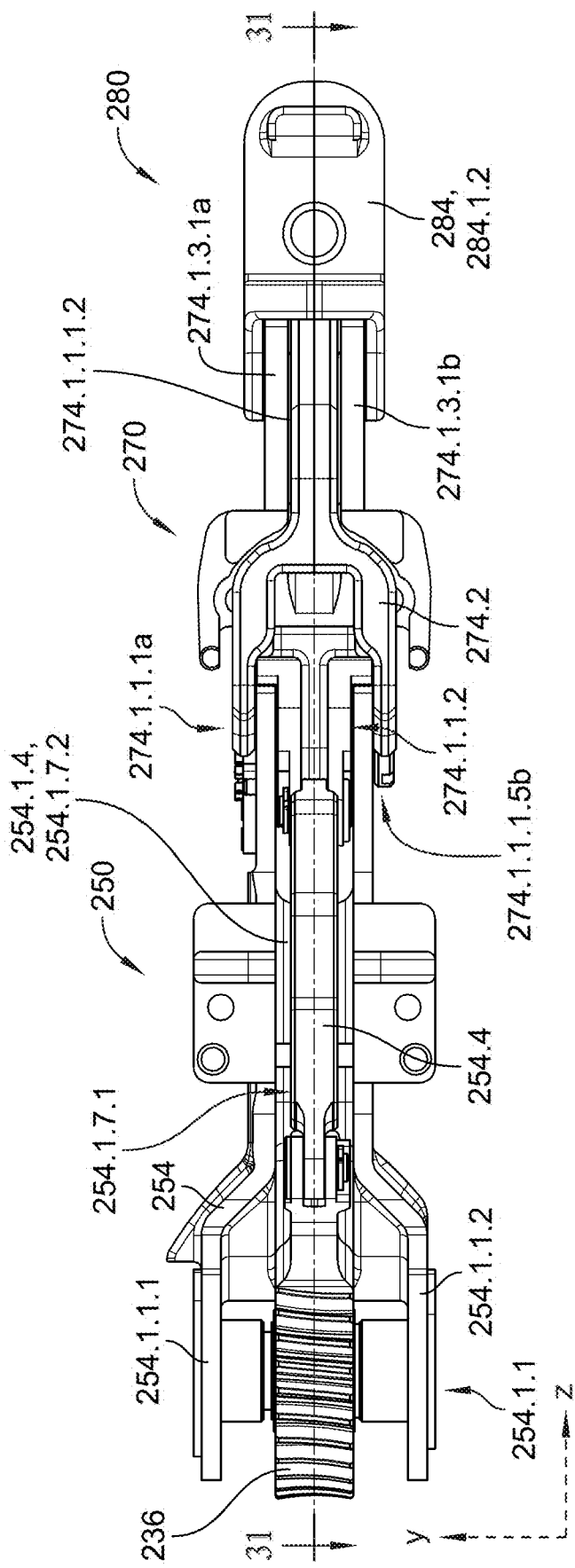
FIG. 31 is a top view of the internal link assembly of FIG. 29.

As shown in FIGS. 31 and 57, when the finger assembly 22a-22d moves from the open, uncurled, or neutral state to the closed, curled, or inwardly rotated state, the biasing member 254.2.1 moves from a first or collapsed position with a length of $LT_1$ to a second or extended position with a length $LT_2$. In the first or collapsed position, the biasing member 254.2.1 exerts a first biasing force $F_1$ that is less than a second biasing force $F_2$ that is exerted in the second or extended position. The biasing member 254.2.1 is designed to prevent the medial or distal assemblies 270, 280 before the proximal housing 252 has come into contact with a resistance point (e.g., an object). Once said proximal housing 252 has come into contact with a resistance point (e.g., an object), the main proximal link 254.1 and the proximal housing 252 stops moving. However, the motor assembly 210 can continue driving the worm drive gear 216 in a first direction, which turns the worm wheel 236, whereby causing the worm drive link 254.4.1 and the proximal drive link 254.4.3 to move into the proximal link recess 254.1.7 and rotation about the worm wheel axis $A_{WW}$, thus forcing the biasing member 254.2.1 to expand for its original state, and therefore forces the medial and distal assemblies 270, 280 to curl inwards. The finger assembly 22a-22d can uncurl or return to its original state, if the motor assembly 210 drove driving the worm drive gear 216 in a second direction, which turns the worm wheel 236, whereby causing the worm drive link 254.4.1 and the proximal drive link 254.4.3 to move out of the proximal link recess 254.1.7, thus forcing the medial and distal assemblies 270, 280 to uncurl, therefore allowing the biasing member 254.2.1 to return to its original state, and consequently allowing the main proximal link 254.1 and the proximal housing assembly 252 to return to their original state. In should be understood that other biasing members, structures, assemblies, or components may be used instead of the coil spring shown in the figures and in certain embodiments, that biasing assembly 254.2 may be eliminated.

Figure 37:
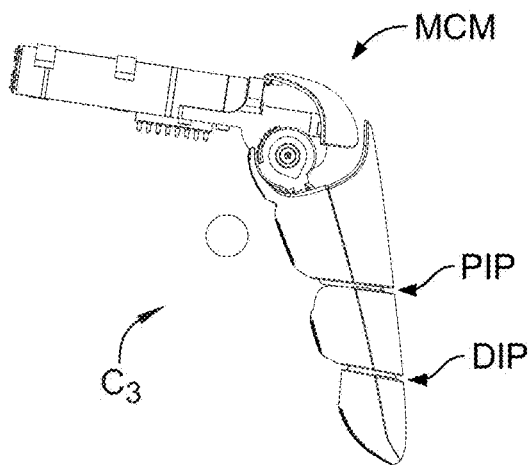
FIG. 37 shows the object in the first location and a right side cross-sectional view of the finger assembly in the second configuration $C_2$.
Figure 41:
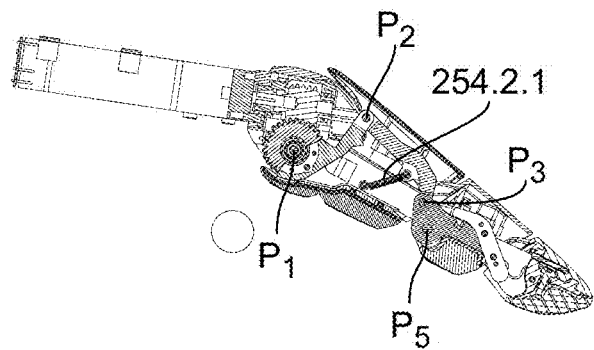
FIG. 41 shows the object in the first location and a right side view of the finger assembly in a fourth configuration $C_4$, wherein the proximal, medial, and distal assemblies are substantially aligned in the first state and the proximal assembly is at maximum flexion position.
Figure 42:
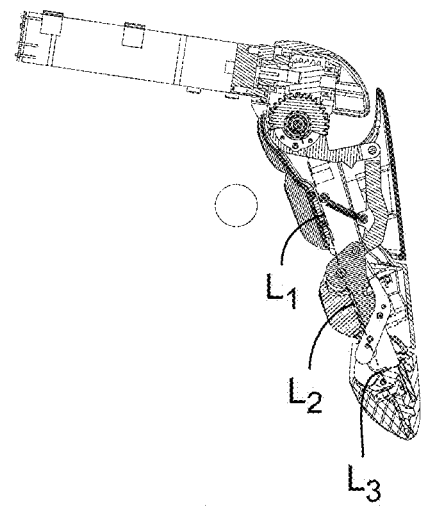
FIG. 42 shows the object in the first location and a right side view of the motor and movement assembly in the fourth configuration $C_4$.
Figure 43:
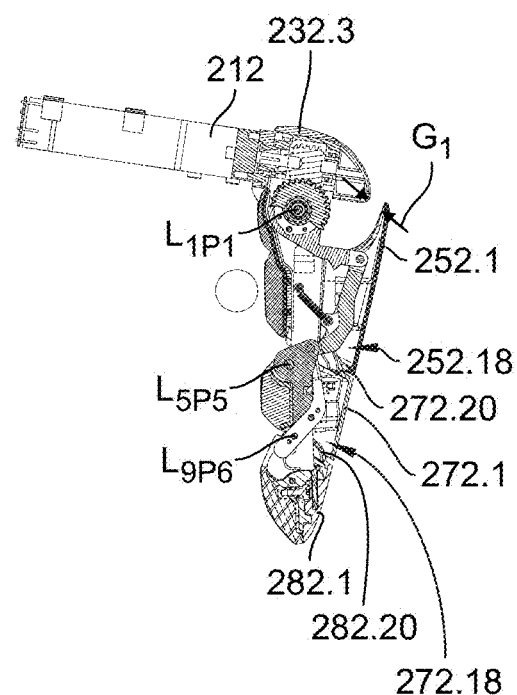
FIG. 43 shows the object in the first location and a cross-sectional view of the finger assembly in the fourth configuration $C_4$ taken through line 43-43 as shown in FIG. 53.
Figure 44:
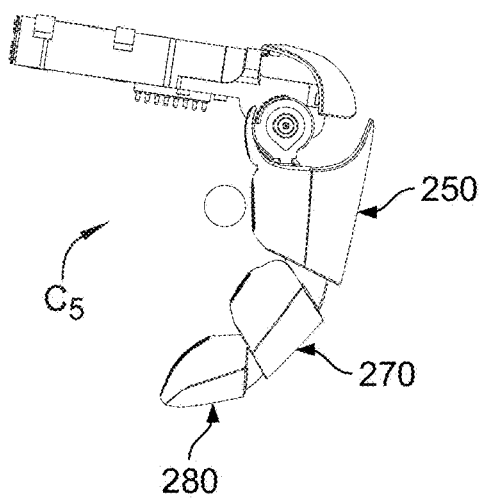
FIG. 44 shows the object in the first location and a right side view of the finger assembly in a fifth configuration $C_5$, wherein the proximal assembly is at a maximum flexion position and the medial and distal assemblies are in a partially curled state.
Figure 45:
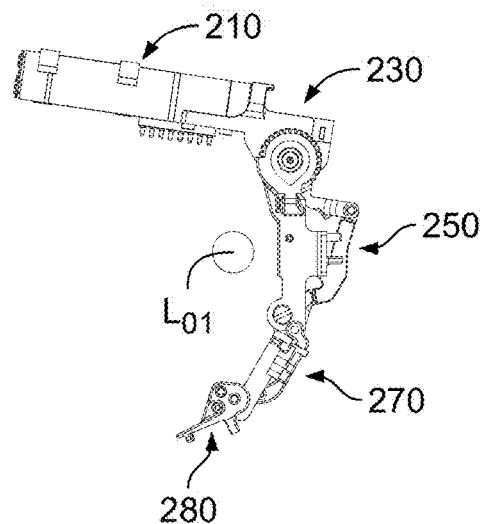
FIG. 45 shows the object in the first location and a right side view of the motor and movement assembly in the fifth configuration $C_5$.
Figure 46:
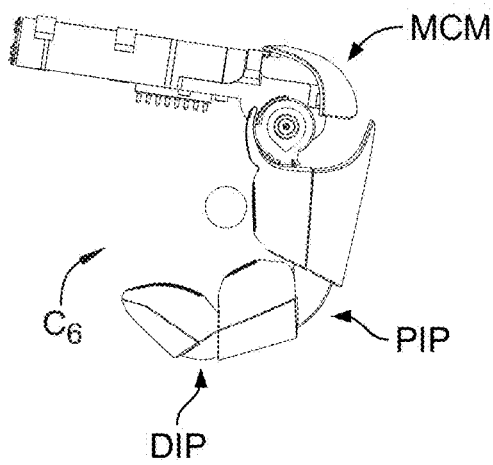
FIG. 46 shows the object in the first location and a right side cross-sectional view of the finger assembly in the fifth configuration $C_5$ taken through line 46-46 as shown in FIG. 55.

As shown in in FIGS. 37 and 41-42, the drive link assembly 254.4 includes: (i) worm drive link or second bar 254.4.1, (ii) worm wheel coupler 254.4.2, (iii) proximal drive link, angled link, third bar 254.4.3, (iv) drive link coupler 254.4.4. The worm drive link 254.4.1 includes: (i) a worm wheel interface region 254.4.1.3 at a first end of the worm drive link 254.4.1, and wherein said worm wheel interface region 254.4.1.3 is configured to be positioned adjacent to and fixedly connected with the worm wheel 236, and (ii) a worm wheel coupler recess 254.4.1.4 that is positioned adjacent to the worm wheel interface region 254.4.1.3 and configured to: (a) increase the interactive surface area between the worm drive link 254.4.1 and worm wheel 236, (b) align the worm drive link 254.4.1 with the worm wheel 236, and (c) is designed to ensure that the worm wheel coupler 254.4.2 does not interfere with the movement of the worm wheel 236. It should be understood that the worm wheel coupler recess 254.4.1.4 may be omitted in other embodiments and an alternative version of the worm wheel coupler 254.4.2 may be used that lacks the clearance requirements necessitating the worm wheel coupler recess 254.4.1.4.

The worm drive link 254.4.1 includes two interface regions, namely a third limiting interface region 254.4.1.1, and a fourth limiting interface region 254.4.1.2. The third limiting interface region 254.4.1.1 extends along a rear extent of the worm drive link 254.4.1 and is configured to be positioned adjacent to an extent of the knuckle cover 232.2 of the knuckle housing assembly 232 when the finger assembly 22a-22d is in the open, uncurled, or neutral position. Meanwhile, the fourth limiting interface region 254.4.1.2 is positioned along a forward extent of the worm drive link 254.4.1 and is configured to be positioned adjacent to an extent of the main proximal link 254.1 when the finger assembly 22a-22d is in the closed, curled, or inwardly rotated state. It should be understood that the above described interface regions 254.4.1.1, 254.4.1.2 need not make contact with the described adjacent structure. Instead, a gap may be present between these structures regardless of the state of the finger assembly 22a-22d.

The proximal drive link, angled link, third bar 254.4.3 includes a worm drive link opening 254.4.3.1 at a first end and a medial link opening 254.4.3.2 at a second end. Said proximal drive link 254.4.3 is configured to be coupled between: (i) the worm drive link 254.4.1 using a drive link coupler 254.4.4 that is inserted through the worm drive link opening 254.4.3.1 and an extent of the worm drive link 254.4.1, and (ii) a main medial link 274.1 (discussed further below) using a main medial link coupler 254.4.5 that is inserted through the medial link opening 254.4.3.2 and an extent of the main medial link 274.1. The drive link coupler 254.4.4 enables the worm drive link 254.4.1 to be pivotably connected to the proximal drive link 254.4.3 in order to form a second pivot point $P_2$, and wherein the second pivot point $P_2$ is designed to move from a first location when the finger assembly 22a-22d is in open, uncurled, or neutral state (FIG. 23C) to a second location the finger assembly 22a-22d is in the closed, curled, or inwardly rotated state (FIG. 57). In comparing FIG. 23C with FIG. 57, it can be seen that the first location in further away from the palm 62 and is positioned closer to the motor assembly 210 in comparison to the second location. Said movement of the second pivot point $P_2$ enables the finger assembly 22a-22d to transfer the movement of the worm drive link 254.4.1 to the main medial link 274.1. As shown in FIGS. 23C and 57, this transfer of movement or energy, the angle between the worm drive link 254.4.1 and the proximal drive link 254.4.3 changes depending on the position of the finger assembly 22a-22d.

iii. Worm Wheel Interface and Proximal PCB

The worm wheel interface 256 includes first and second worm locking members 256.1a, 256.1b, along with first and second worm bearings 256.2a, 256.2b. The worm wheel assembly 256 utilizes the configuration of the locking members and bearings 256.1a, 256.1b, 256.2a, 256.2b to allow the main proximal link 254.1 to remain in a fixed position once it has come into contact with a resistance point, while the motor assembly 210 continues to drive the proximal drive link assembly 254.4 (causing movement of the medial and distal assemblies 270, 280). In other words, the bearings 256.1a, 256.1b allow the main proximal link 254.1 to stop rotating even when the worm wheel 236 continues to rotate. It should be understood that without this slippage between the main proximal link 254.1 and the worm wheel 236, the finger assembly 22a-22d could not rotate the medial and distal assemblies 270, 280 once the proximal assembly 250 came into contact with a resistance point.

The proximal PCB 258 includes a second finger encoder (e.g., magnetic, optical, capacitive, resistive, etc.) that is positioned proximate to the proximal interphalangeal joint PIJ and configured to collect medial data, wherein said medial data includes information related to the rotation of the proximal interphalangeal joint PIJ. Said medial data may use the robot system to generate a vector representation (e.g., a space embedding) indicating the state of the medial assembly 270 or the environment around the medial assembly 270. The encoder of the proximal PCB 258 may collect data upon a specific command from the robot system or periodically (e.g., between 500 times per second to every minute).

d. Medial Assembly

The medial assembly 270 is positioned between the proximal assembly 250 and the distal assembly 280 and is the second portion of the finger assembly 22a-22d configured to move relative to the palm 610. The medial assembly 270 includes: (i) a medial housing assembly 272, and (ii) a medial link assembly 274.

i. Medial Housing Assembly

As shown in FIGS. 23A-24B, 43-45, and 57, the medial housing assembly 272 is designed to substantially surround a majority of the other components of the medial assembly 270. To achieve this, the medial housing assembly 272 forms an internal medial recess 272.18. The internal medial recess 272.18 is designed to not only surround components of the medial assembly 270, but is also designed to receive: (i) an extent of the distal assembly 280 (namely, the distal tongue 282.20), when the finger assembly 22a-22d is in the open, uncurled, or neutral state, and (ii) a lesser extent of, or none of, the distal assembly 280 (namely, the distal tongue 282.20), when the finger assembly 22a-22d is in the closed, curled, or inwardly rotated state. In other words, the medial housing assembly 272 overlies: (i) a substantial extent of the distal tongue 282.20 when the finger assembly 22a-22d is in the open, uncurled, or neutral state, and (ii) a minor extent of, or none of, the distal tongue 282.20 when the finger assembly 22a-22d is in the closed, curled, or inwardly rotated state. Stated another way, the percentage of the distal assembly 280 (namely, the distal tongue 282.20) that is positioned within the medial housing assembly 272 is reduced when the finger assembly 22a-22d moves from the open, uncurled, or neutral state to the closed, curled, or inwardly rotated state. By enabling at least a minimal extent of the distal assembly 280 (namely, the distal tongue 282.20) to be positioned within or adjacent to the medial assembly 270, the gap $G_3$ formed between the assemblies 270 and 280 is minimized, and wherein said minimization of said gap $G_3$ is beneficial because it minimizes the chance or probability that a textile assembly—namely, a glove—or external covering can be caught or pinched between these assemblies.

As shown in FIGS. 17-26 and 43-45, the medial housing assembly 272 specifically includes: (i) a medial jacket assembly 272.1 with a top member 272.1.1 and a bottom member 272.1.2, and (ii) a medial bottom casing assembly 272.2. While the bottom member 272.1.2 is in direct contact with and underlies the medial bottom casing assembly 272.2, the finger assembly 22a-22d lacks a medial top casing assembly that is in direct contact with the top member 272.1.1. This design is advantageous because the medial bottom casing assembly 272.2 provides the bottom member 272.1.2 with additional rigidity, which enables said bottom member 272.1.2 to be made from a softer, easier-to-form, and potentially less durable material, thereby increasing the gripping capability of the end effector 10. In contrast, the top member 272.1.1 does not need to include a softer, easier-to-form, and potentially less durable material because said top member 272.1.1 is not designed to come into regular contact with objects. Additionally, even if the materials of the medial bottom casing assembly 272.2 and the bottom member 272.1.2 are the same, it may be desirable to form these components as two separate components to facilitate replicability without exposing an inner extent of the finger assembly 22a-22d. Another way of describing this beneficial configuration includes the fact that the medial jacket assembly 272.1 is configured to provide the primary external shape of the finger assembly 22a-22d, while the medial casing assembly 272.2 is configured to protect the proximal PCB 258 and provide a spacer between the medial link assembly 274 and the medial jacket assembly 272.1. Nevertheless, it should be understood that in an alternative embodiment, the bottom member 272.1.2 and the medial bottom casing assembly 272.2 may be integrally formed as a single structure.

As best shown in FIGS. 23A-24B, the top member 272.1.1 of the medial jacket assembly 272.1 includes an exterior surface back with a curvilinear extent in a first direction (namely, across the width of the finger assembly 22a-22d), and the bottom member 272.1.2 of the medial jacket assembly 272.1 includes an exterior palm surface that is curvilinear extent in the first direction (namely, across the width of the finger assembly 22a-22d) and a second direction (namely, across the length of the finger assembly 22a-22d). The curvilinear extent in the first direction helps ensure that the finger assembly 22a-22d has rounded edges to help with grasping objects, while the curvilinear extent in the second direction helps ensure that the finger can curl inward. Additionally and as discussed above, the top member 272.1.1 of the medial jacket assembly 272.1 includes a rearwardly extending medial tongue 272.20. The medial tongue 272.20 has an arched shape with a curvilinear rear surface 272.20.2, wherein the width of said medial tongue 272.20 is reduced from a first or front width $W_1$ to a second or rear width $W_2$. As such, the medial tongue 272.20 includes curvilinear extents in at least two directions. As discussed above, the medial tongue 272.20 is designed to be positioned within or adjacent to proximal housing assembly 252 and configured to minimize the gap $G_2$ that is formed between assemblies 250 and 270. It should be understood that in an alternative embodiment, the medial tongue 272.20 may be omitted.

As discussed above, the medial housing assembly 272 may be: (i) made from the same materials as the housing assembly 60, (ii) made from materials that differ from the materials used in the housing assembly 60, and/or (iii) may include silicon, plastic (e.g., may include a polymer composition), carbon composite, or metal, a combination of these materials, and/or any other know material used in robot systems. In some aspects, the medial housing assembly 272 may include additional components or layers (e.g., between three and an nth). The medial housing assembly 272 may incorporate specialized materials or coatings to enhance grip, durability, or sensor capabilities. For example, a layer of electroactive polymer may be included to enable shape-changing properties, or a layer of piezoelectric material may be added for tactile sensing. In some implementations, the layers may be interchangeable to allow customization for different tasks or environments. The assembly may also feature self-healing materials in certain layers to extend the lifespan of high-wear areas. It should be also be understood in alternative embodiments that the medial jacket assembly 272.1 and the medial casing assembly 272.2 may be combined into a single component and/or additional exterior members may be added to the end effector 10/finger assembly 22a-22d.

ii. Medial Link Assembly 274

As shown in FIG. 40, the medial link assembly 274 includes: (i) a primary or main medial link or fourth bar 274.1, (ii) a medial drive link or fifth bar 274.2, and (iii) a main/drive link couplers or sixth bar 274.3a, 274.3b. The medial link assembly 274 is involved with a majority of the movements of the finger assembly 22a-22d. While the proximal assembly 250 could move without causing a positional change between said proximal assembly 250 and the medial assembly 270, the distal assembly 280 cannot move without causing a positional change between said distal assembly 280 and the medial assembly 270. Because most movements of the end effector 10 involve movement of the medial assembly 270 relative to the proximal assembly 250 and/or distal assembly 280, said medial assembly 270 is involved with a majority of the movements of the finger assembly 22a-22d. As discussed above, this is contrast to conventional end effectors and/or conventional fingers and is beneficial because it reduces complexities, reduces components, increases reliability, and may afford other benefits.

The primary or main medial link or fourth bar 274.1 is best shown in FIGS. 46-53. The main medial link 274.1 helps form a second or proximal interphalangeal joint PIJ that is positioned between the proximal assembly 250 and the medial assembly 270. The main medial link 274.1 is designed to be pivotably connected to both the proximal link 254.1 and the proximal drive link 254.4.3 and includes three integrally formed components, wherein said components include: (i) proximal interphalangeal joint coupler 274.1.1 that extends rearward from line $M_1$, (ii) medial link neck or biasing neck 274.1.2 that extends between lines $M_1$ and $M_2$, and (iii) medial link extension 274.1.3 that extends forward from $M_2$. The first component of the main medial link 274.1 is the proximal interphalangeal joint coupler 274.1.1 and is comprised of: (i) a first and second partially-triangular frame members 274.1.1.1a, 274.1.1.1b, (ii) a first medial link or interphalangeal joint recesses 274.1.1.2, and (iii) medial link bridge 274.1.1.3 that couples the first and second partially-triangular frame members 274.1.1.1a, 274.1.1.1b to one another. The first and second partially-triangular frame members 274.1.1.1a, 274.1.1.1b are the rearmost extent of the main medial link 274.1 and have: (i) a proximal drive link aperture 274.1.1.1.1, (ii) a drive link assembly recesses 274.1.1.2, (iii) first and second limiting projections 274.1.1.1.3a, 274.1.1.1.3b, and (vi) a proximal main link aperture 274.1.1.1.4.

As discussed above, the first and second partially-triangular frame members 274.1.1.1a, 274.1.1.1b of the proximal interphalangeal joint coupler 274.1.1 of the main medial link 274.1 include the proximal drive link aperture 274.1.1.1.1. In particular, the proximal drive link aperture 274.1.1.1.1 is formed in the drive link assembly recesses 274.1.1.1.5a, 274.1.1.1.5b and is configured to receive an extent of a securement member 274.1.1.1.10 that pivotally connects the proximal drive link assembly 254.4 to the main medial link 274.1. Pivotally connecting the proximal drive link assembly 254.4 to the main medial link 274.1 forms a third pivot point $P_3$, which further enables the transfer of energy from the motor assembly 210 to the distal assembly 280. Like a majority of the pivot points, the third pivot point $P_3$ is configured to move from a first location to a second location when the finger assembly 22a-22d moves from the open, uncurled, or neutral state to the closed, curled, or inwardly rotated state. When comparing FIG. 31 to FIG. 57, the first location is positioned rearward and above or towards the back of the end effector 10 in comparison to the second location.

The proximal link opening 274.1.1.1.4 that is formed in the first and second partially-triangular frame members 274.1.1.1a, 274.1.1.1b and is positioned forward and below the proximal drive link aperture 274.1.1.1.1. In particular, the proximal link opening 274.1.1.1.4 pivotally couples the main proximal link 254.1 to the main medial link 274.1 using the medial assembly coupler 254.3, and whereby creating a fifth pivot point $P_5$. Unlike a majority of the other pivot points, the fifth pivot point $P_5$ is semi-fixed because: (i) unlike the first pivot point $P_1$, it moves when the proximal assembly 250 moves, and (ii) unlike the second pivot point $P_2$ or the third pivot point $P_3$, it cannot move relative to the proximal assembly 250. Thus, the movement of the fifth pivot point $P_5$ is between the movement capabilities of the fixed and non-fixed pivot points and therefore is semi-fixed. Said fifth pivot point $P_5$ needs to be fixed relative to the proximal assembly 250 to enable the proximal drive link assembly 254.4 to force the medial assembly 270 around a pivot point $P_5$ or medial axis $A_M$. Said medial axis $A_M$ is parallel with the worm wheel axis $A_{WW}$, but is perpendicular (in one direction) to both the motor shaft axis $A_{MS}$ and the worm drive gear axis $A_{WDG}$.

The first and second limiting projections 274.1.1.1.3a, 274.1.1.3b of the proximal interphalangeal joint coupler 274.1.1 have a wedge configuration that forms the sixth limiting interface regions 274.1.1.1.1.1a, 274.1.1.1.1.1b. Said sixth limiting interface regions 274.1.1.1.1.1a and 274.1.1.1.1.1b are positioned adjacent to the medial drive link 274.2 and help ensure that the medial assembly 274 does not over-rotate or curl backward. Finally, the combination of the first and second partially-triangular frame members 274.1.1.1a, 274.1.1.1b and the medial link bridge 274.1.1.3 form a U-shaped extent, which said first medial link or interphalangeal joint recess 274.1.1.2 is formed therebetween. Said interphalangeal joint recess 274.1.1.2 is designed to receive an extent of the proximal link assembly 254, and specifically an second end of the proximal drive link 254.4.3. The interlocking, stacking, and/or overlying nature of these connections will be discussed in greater detail below.

The medial link neck or biasing neck 274.1.2 extends forward from the first and second partially-triangular frame members 274.1.1.1a, 274.1.1.1b and couples the first and second partially-triangular frame members 274.1.1.1a, 274.1.1.1b to a medial link extension 274.1.3. The medial link extension 274.1.3 is configured to be coupled to the medial housing assembly 272 and provides a majority of the structural body of said main medial link 274.1. The medial link extension 274.1.3 includes: (i) a medial link frame member 274.1.3.1, (ii) a medial link sloped member 274.1.3.2, (iii) a housing mounting projections 274.1.3.4, and (iv) medial drive link projections 274.1.3.5a, 274.1.3.5b. The combination of the frame members 274.1.3.1, sloped member 274.1.3.2, and frontal member 274.1.3.3 form a medial link recess or truncated rectangular-shaped recess 274.1.3.6 in the middle of the medial link extension 274.1.3. This medial link recess or truncated rectangular-shaped recess 274.1.3.6 is configured to receive an extent of the medial drive link 274.2 and allow sufficient clearance for the movement of the medial drive link 274.2 relative to the medial link extension 274.1.3. Meanwhile, the housing mounting projections 274.1.3.4 are positioned on the uppermost point of the medial link frame member 274.1.3.1 and are configured to couple both the medial jacket and medial casing assemblies 272.1, 272.2 to the main medial link 274.1.

The medial drive link projections 274.1.3.5a, 274.1.3.5b extend from the sides of the medial link extension 274.1.3 and are configured to be positioned within the distal housing assembly 282. Like the fifth pivot point $P_5$, the sixth pivot point $P_6$ is semi-fixed because: (i) unlike the first pivot point $P_1$, it moves when the medial assembly 270 moves, and (ii) unlike the second pivot point $P_2$ or the third pivot point $P_3$, it cannot move relative to the medial assembly 270. Thus, the movement of the sixth pivot point $P_6$ is between the movement capabilities of the fixed and non-fixed pivot points and therefore is semi-fixed. Said sixth pivot point $P_6$ needs to be fixed relative to the medial assembly 270 to enable the movement of the medial drive link 274.2 to force the distal assembly 280 around a pivot point $P_6$ or distal axis $A_D$. Said distal axis $A_D$ is parallel with the medical axis $A_M$ and the worm wheel axis $A_{WW}$, but is perpendicular (in one direction) to both the motor shaft axis Aus and the worm drive gear axis $A_{WDG}$.

The medial drive link, or fifth bar 274.2 is best shown in FIGS. 26-31 and 46-53. The medial drive link 274.2 includes: (i) an angled segment 274.2.2 forward from a rearmost point of the medial drive link 274.2 to line $M_3$, (iii) lateral segment 274.2.3 extending from line $M_3$ to $M_4$, and (iv) the elongated segment 274.2.4 extending forward from line $M_4$. This complex geometry can be best seen in FIG. 53. The angled segment 274.2.2 of the medial drive link 274.2 includes main proximal link opening 274.2.2.1 that are configured to receive first and second medial link projections 254.1.6a, 254.1.6b to form the fourth pivot point $P_4$. In other words, the medial drive link 274.2 is pivotably connected to the medial link 274.1: (i) on a first side of a sagittal plane extending through the finger assembly via opening 274.2.2.1 and a projection 254.1.6a, and (ii) on a second side of a sagittal plane extending through the finger assembly via opening 274.2.2.1 and a projection 254.1.6b. Like the fifth pivot point $P_5$ and the sixth pivot point $P_6$, the fourth pivot point $P_4$ is semi-fixed because: (i) unlike the first pivot point $P_1$, it moves when the proximal assembly 250 moves, and (ii) unlike the second pivot point $P_2$ or the third pivot point $P_3$, it cannot move relative to the proximal assembly 250. Thus, the movement of the fourth pivot point $P_4$ is between the movement capabilities of the fixed and non-fixed pivot points and therefore is semi-fixed. Said fourth pivot point $P_4$ needs to be fixed relative to the proximal assembly 250 to enable the medial drive link 274.2 to rotate around the fourth pivot point $P_4$.

The main/drive link couplers or sixth bar 274.3a, 274.3b is secured within an extent of the distal housing assembly 282 and is configured to couple the main medial link 274.1 and the medial drive link 274.2 to one another, while being positioned within an extent of the distal assembly 280. The main/drive link couplers 274.3a, 274.3b.3 includes: (i) a main body 274.3.1 with a first aperture or upper coupler aperture 274.3.1.1, and a second aperture or lower coupler aperture 274.3.1.2, and (ii) first and second flanges 274.3.2a, 274.3.2b. While the flanges 274.3.2a, 274.3.2b surround the apertures 274.3.1.1, 274.3.1.2: (i) the apertures 274.3.1.1 are configured to receive the medial drive link projections 274.1.3.5a, 274.1.3.5b, and (ii) the apertures 274.3.1.2 are configured to receive the left and right portion couplers 274.2.5a, 274.2.5b. It should be understood that the main/drive link couplers 274.3a, 274.3b may be eliminated in certain embodiments, and instead, the main medial link 274.1 and the medial drive link 274.2 may be coupled to one another differently.

As shown in the Figures, the link assemblies 254, 274, and 284 have interlocking, overlapping, underlying, and/or stacking configuration. This complex configuration helps increase the durability of the finger assembly 22a-22d. In particular, the worm drive link 254.4.1 includes a forked second end that is designed to receive an extent of the first end of the proximal drive link 254.4.3. Likewise, the main medial link 274.1 also includes a forked rear end that is formed by the first and second partially-triangular frame members 274.1.1.1a, 274.1.1.1b that is designed to receive a second end of the proximal drive link 254.4.3. As such, both ends of the proximal drive link 254.4.3 is centered within a fork-like recess formed in the adjacent links. The links also are designed to position the primary proximal link 254.1 outside of the worm wheel 236 and an extent of the medial primary 274.1. This not only provides the finger assembly 22a-22d with rigidity, but it also allows the finger assembly 22a-22d to narrow as it extends from the base of the finger assembly 22a-22d to the tip of the said finger assembly 22a-22d. This configuration also allows for the second end of the proximal drive link 254.4.3 to be positioned within the main medial link 274.1, which is also positioned within the primary proximal link 254.1. The medial drive link 274.2 not only includes an extent that is positioned outside of the main medial link 274.1, but it also includes an extent that is positioned within the main medial link 274.1. And finally, an extent of the distal assembly 280 is positioned outside of the main medial link 274.1. In sum, each of the links is supported on two sides, and therefore, said links are not solely supported on a single side. Nevertheless, in an alternative embodiment, the links could be supported on a single side.

Based on the above disclosure, as best shown in FIG. 57, and when the finger assembly 22a-22d is in the closed, curled, or in the inwardly rotated state, the proximal link recess 254.1.7 may be designed to receive a substantial extent of the proximal link assembly 254. Additionally, the medial link recess or truncated rectangular-shaped recess 274.1.3.6 may be designed to receive differing extents of the medial drive link 274.2 based on the position of the finger assembly 22a-22d. Further, the interphalangeal joint recesses 274.1.1.2 may be designed to receive the second end of the proximal link assembly 254. In some aspects, the configuration of these recesses may allow for more compact folding of the finger assembly when in a closed state. The design may enable smoother transitions between open and closed states, potentially enhancing the overall dexterity and range of motion of the finger assembly. In some cases, the specific dimensions and shapes of these recesses may be optimized for particular grasping tasks or object sizes.

e. Distal Assembly 280

The distal assembly 280 is positioned forward of the medial assembly 270 and is the third portion of the finger assembly 22a-22d configured to move relative to the palm 610. The distal assembly 280 includes: (i) a distal housing assembly 282, and (ii) a distal link assembly 284.

i. Distal Housing Assembly 282

As shown in FIGS. 23A-24B, 43-45, and 57, the distal housing assembly 282 is designed to substantially surround a majority of the other components of the distal assembly 280. To achieve this, the distal housing assembly 282 forms an internal distal recess 282.18 and specifically includes: (i) a distal jacket assembly 282.1 with a top member 282.1.1 and a bottom member 282.1.2, and (ii) a distal bottom casing assembly 282.2. While the bottom member 282.1.2 is in direct contact with and underlies the distal bottom casing assembly 282.2, the finger assembly 22a-22d lacks a distal top casing assembly that is in direct contact with the top member 282.1.1. This design is advantageous because the distal bottom casing assembly 282.2 provides the bottom member 282.1.2 with additional rigidity, which enables said bottom member 282.1.2 to be made from a softer, easier-to-form, and potentially less durable material, thereby increasing the gripping capability of the end effector 10. In contrast, the top member 282.1.1 does not need to include a softer, easier-to-form, and potentially less durable material because said top member 282.1.1 is not designed to come into regular contact with objects. Additionally, even if the materials of the distal bottom casing assembly 282.2 and the bottom member 282.1.2 are the same, it may be desirable to form these components as two separate components to facilitate replicability without exposing an inner extent of the finger assembly 22a-22d. Another way of describing this beneficial configuration includes the fact that the distal jacket assembly 282.1 is configured to provide the primary external shape of the finger assembly 22a-22d, while the distal casing assembly 282.2 is configured to protect the distal link assembly 284. Nevertheless, it should be understood that in an alternative embodiment, the bottom member 282.1.2 and the distal bottom casing assembly 282.2 may be integrally formed as a single structure.

As best shown in FIGS. 23A-24B, the top member 282.1.1 of the distal jacket assembly 282.1 includes an exterior surface back with a curvilinear extent in a first direction (namely, across the width of the finger assembly 22a-22d), and the bottom member 282.1.2 of the distal jacket assembly 282.1 includes an exterior palm surface that is curvilinear extent in the first direction (namely, across the width of the finger assembly 22a-22d) and a second direction (namely, across the length of the finger assembly 22a-22d). The curvilinear extent in the first direction helps ensure that the finger assembly 22a-22d has rounded edges to help with grasping objects, while the curvilinear extent in the second direction helps ensure that the finger can curl inward. Additionally and as discussed above, the top member 282.1.1 of the distal jacket assembly 282.1 includes a rearwardly extending distal tongue 282.20. The distal tongue 282.20 has an arched shape with a curvilinear rear surface 282.20.2, wherein the width of said distal tongue 282.20 is reduced from a first or front width to a second or rear width. As such, the distal tongue 282.20 includes curvilinear extents in at least two directions. As discussed above, the distal tongue 282.20 is designed to be positioned within or adjacent to medial housing assembly 272 and configured to minimize the gap $G_3$ that is formed between assemblies 270 and 280. It should be understood that in an alternative embodiment, the distal tongue 282.20 may be omitted.

As discussed above, the distal housing assembly 282 may be: (i) made from the same materials as the housing assembly 60, (ii) made from materials that differ from the materials used in the housing assembly 60, and/or (iii) may include silicon, plastic (e.g., may include a polymer composition), carbon composite, or metal, a combination of these materials, and/or any other know material used in robot systems. In some aspects, the distal housing assembly 282 may include additional components or layers (e.g., between three and an nth). The distal housing assembly 282 may incorporate specialized materials or coatings to enhance grip, durability, or sensor capabilities. For example, a layer of electroactive polymer may be included to enable shape-changing properties, or a layer of piezoelectric material may be added for tactile sensing. In some implementations, the layers may be interchangeable to allow customization for different tasks or environments. The assembly may also feature self-healing materials in certain layers to extend the lifespan of high-wear areas. It should be also be understood in alternative embodiments that the distal jacket assembly 282.1 and the distal casing assembly 282.2 may be combined into a single component and/or additional exterior members may be added to the end effector 10/finger assembly 22a-22d.

ii. Distal Link Assembly 284

As shown in FIGS. 54-55, the distal link assembly 284 may include a primary or main distal link or seventh bar 284.1 that helps form a third joint or distal interphalangeal joint 284.1.1, and may include a tip assembly 284.1.2. The third joint or distal interphalangeal joint 284.1.1 may be formed between the medial assembly 270 and the distal assembly 280. The distal link assembly 284 may be involved in fewer movements of the finger assembly 22a-22d compared to the number of movements involving the proximal and medial assemblies 250, 270. As best shown in FIGS. 54-55, the third joint 284.1.1 may include first and second coupler recesses 284.1.1.1a, 284.1.1.1b, while the tip assembly 284.1.2 may have: (i) a tip body 284.1.2.1 with first and second portions 284.1.2.1.1a, 284.1.2.1.1b, and internal projections 284.1.2.1.2, and (ii) tip coupler 284.1.2.2 for coupling the first and second portions 284.1.2.1.1a, 284.1.2.1.1b of the tip body 284.1.2.1 to one another. In some aspects, the tip assembly 284.1.2 may incorporate sensors to provide tactile feedback. The internal projections 284.1.2.1.2 may be designed to enhance grip strength or manipulate small objects. The tip coupler 284.1.2.2 may allow for interchangeable tip designs to adapt to different tasks.

D. Kinematics of the End Effector

Figure 12:
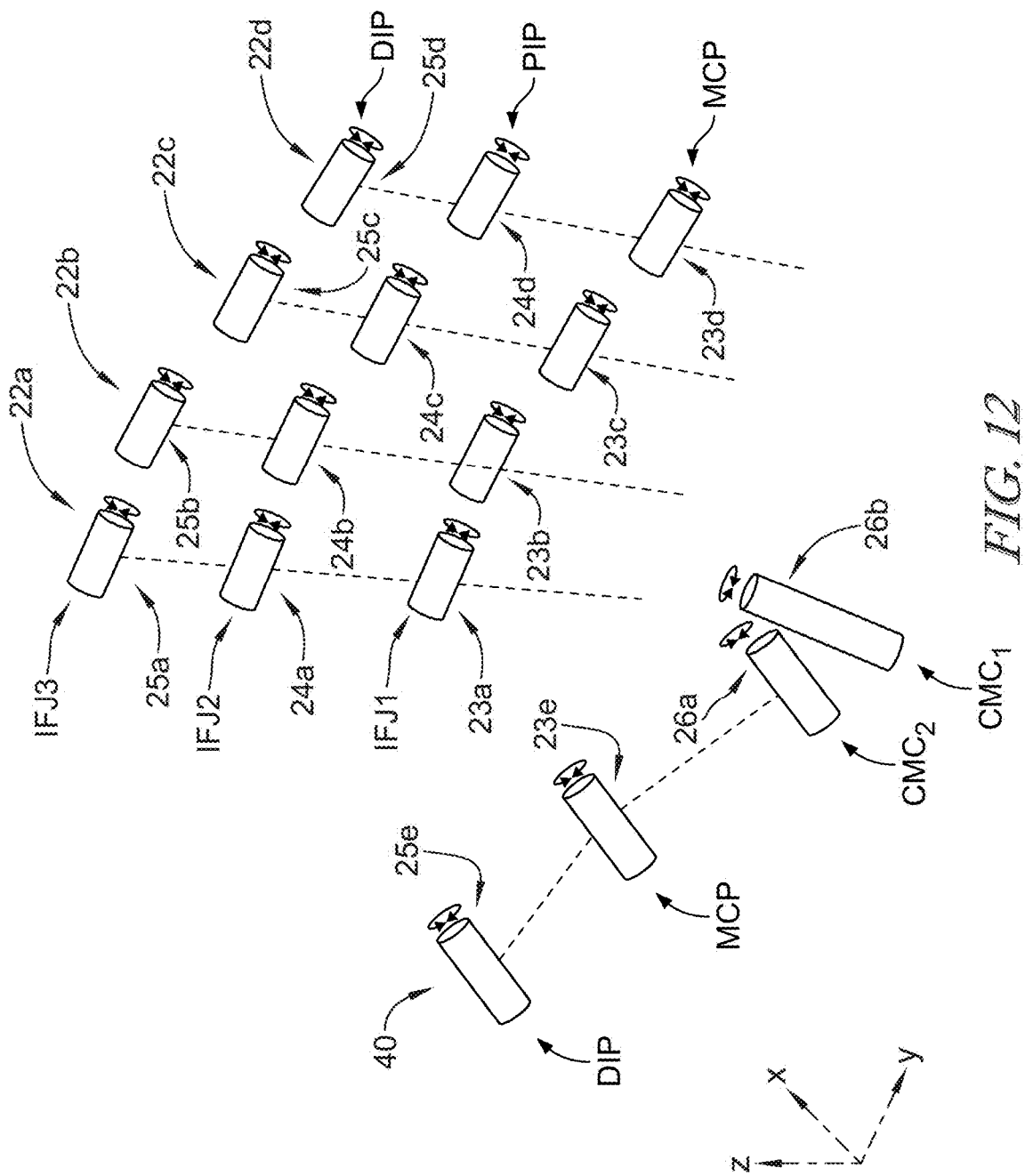
FIG. 12 is a perspective schematic view that shows the 16 degrees of freedom contained in the mechanical end effector of FIG. 1-2.
Figure 15:
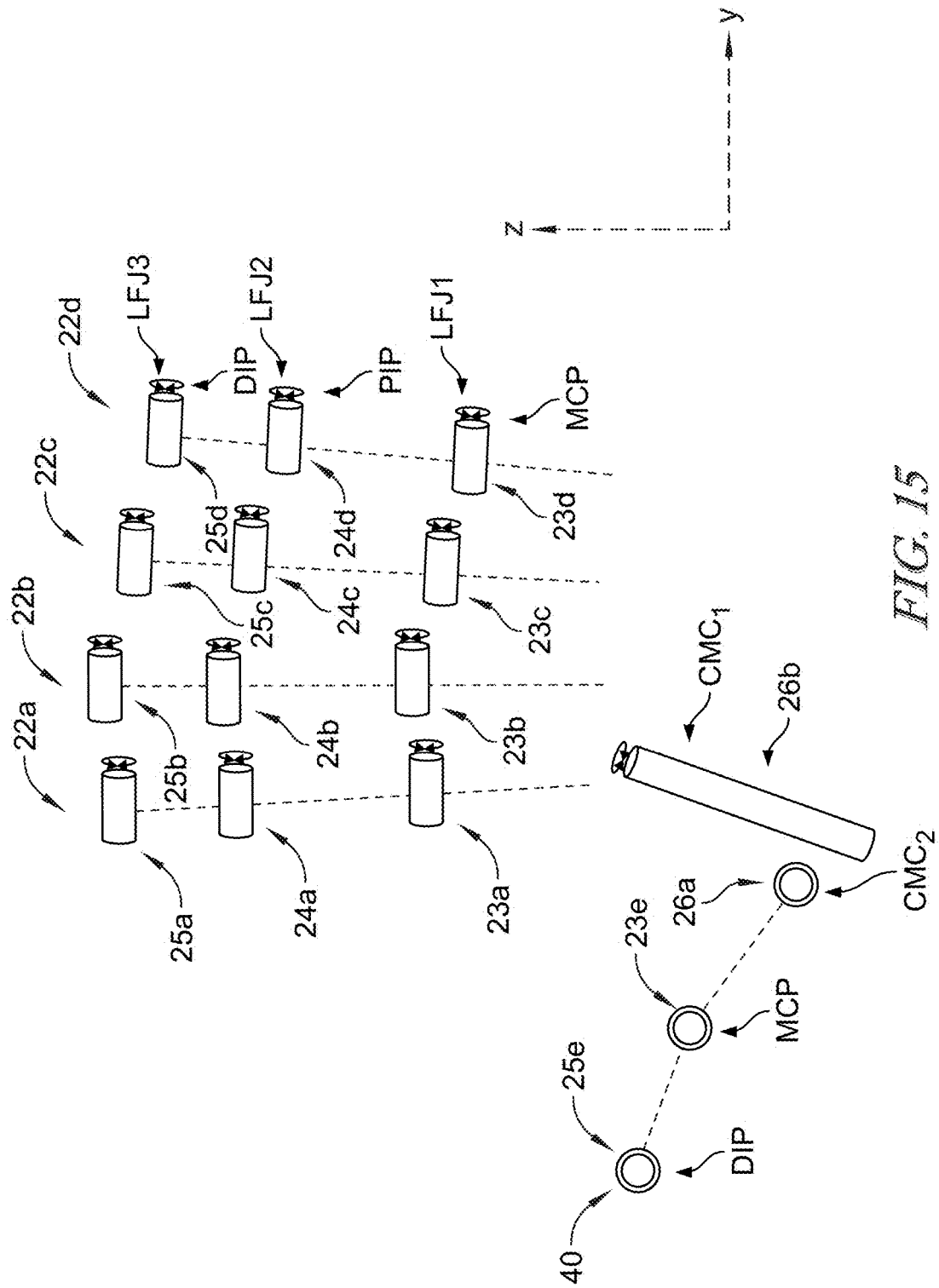
FIG. 15 is a palm schematic view that shows the 16 degrees of freedom contained in the mechanical end effector of FIG. 1-2.
Figure 16:
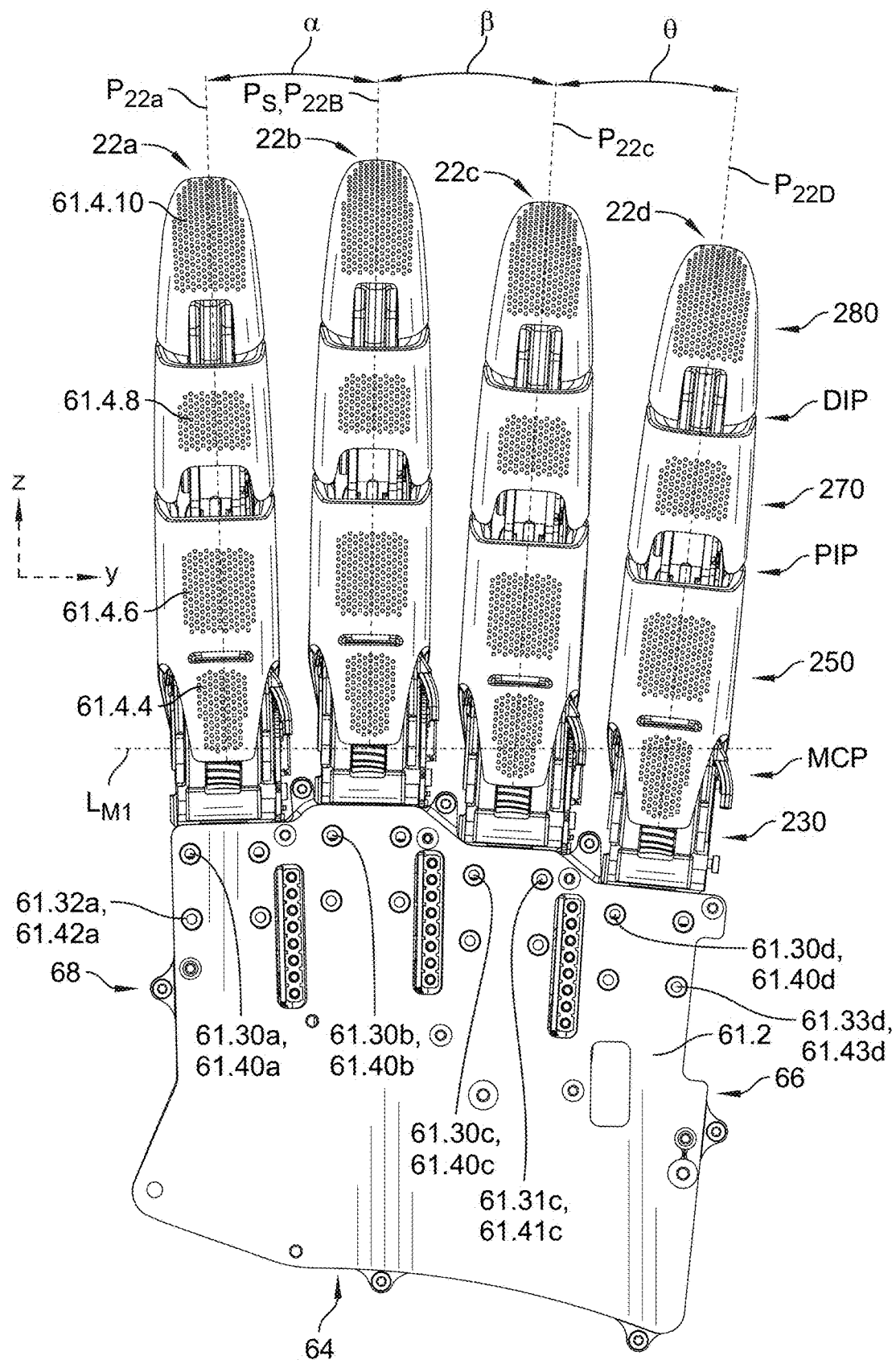
FIG. 16 is a bottom or palm view of the mechanical end effector of FIG. 11, wherein the thumb has been removed to better isolate the finger assemblies and a frame of the mechanical end effector.
Figure 19:
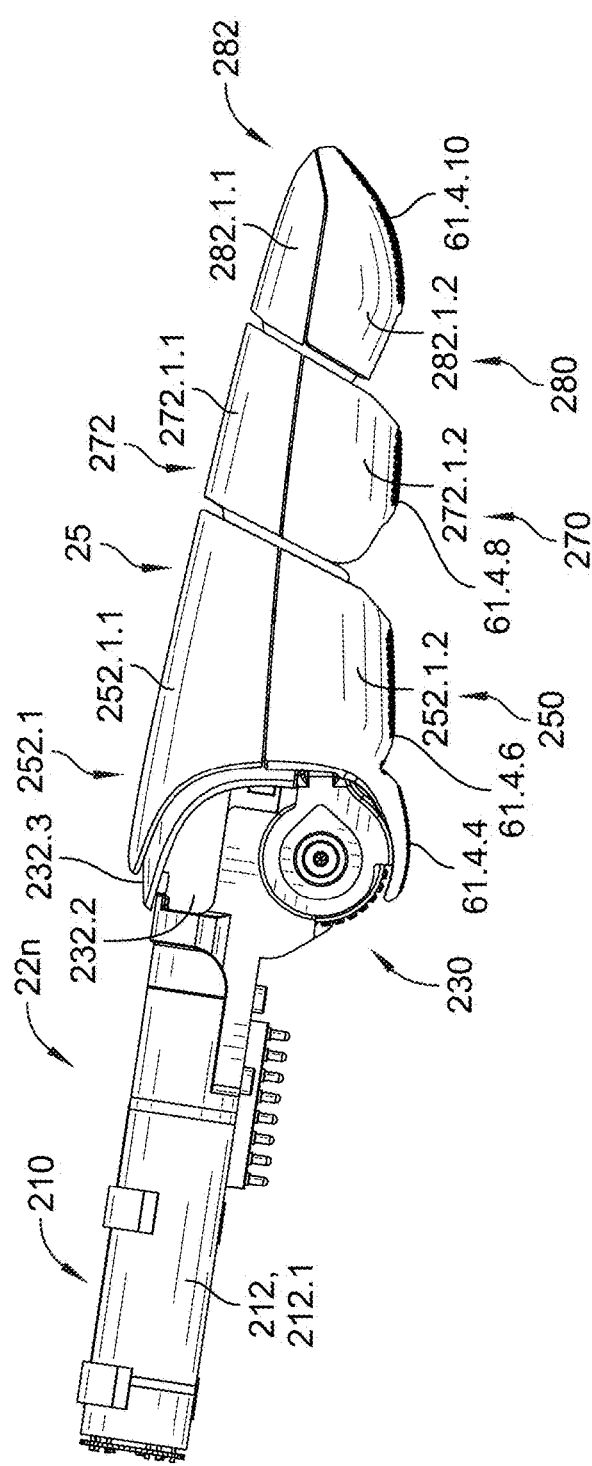
FIG. 19 is a left side view of the figure assembly of FIG. 17.
Figure 21:
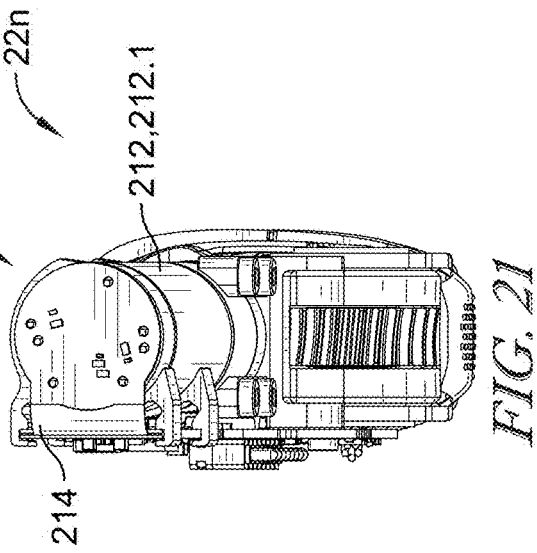
FIG. 21 is a rear view of the figure assembly of FIG. 17.

As best shown in FIGS. 12 and 15, the disclosed end effector 10 includes: (i) at least one, and preferably five, metacarpophalangeal (MCP) joints 23a-23e, (ii) at least one, and preferably four, proximal interphalangeal (PIP) joints 24a-24d, (iii) at least one, and preferably five, distal interphalangeals (DIP) joint 25a-25e, and (iv) at least one carpometacarpal (CMC) joint 26a, 26b. As shown in these Figures, each finger assembly 22a-22d includes a MCP joint 23a-23d or a first joint (IFJ1, MFJ1, RFJ1, LFJ1), (ii) a PIP joint 24a-24d or a second joint (IFJ2, MFJ2, RFJ2, LFJ2), and (iii) a DIP joint 25a-25d or a third joint (IFJ3, MFJ3, RFJ3, LFJ3). The inclusion of these three joints 23a-23d, 24a-24d, 25a-25d allows each finger assembly 22a-22d to have three degrees of freedom, while being driven by a single integrated motor 212.

The MCP joints 23a-23d of each finger assembly 22a-22d is defined between a lower extent of the motor assembly 210 and the First Link Plane $L_1$ (i.e., the plane that extends from the first pivot point $P_1$ to the fifth pivot point $P_5$) and has a range of motion that is between 70° and 135°, preferably between 80° and 120°, and most preferably between 75° and 110°. To provide the range of motion associated with the MCP joint 23a-23d, the internal angles (e.g., A88, A99, A121) ranges from 223° in the first configuration $C_1$ to 76° in configurations 4-7 $C_4$-$C_7$. It should be understood that the internal angle that extends from the lower extent of the motor assembly 210 to the contact pad/internal surface of the proximal assembly 250 ranges from 226° to 79°. As such, the internal angle has a range of motion that is between 70° and 110° and most preferably between 85° and 95°.

PIP joint 24a-24d is defined between the First Link Plane $L_1$ and the Second Link Plane $L_2$ (i.e., the plane that extends from the first pivot point $P_5$ to the sixth pivot point $P_6$) and has a range of motion that is between 65° and 140°, preferably between 75° and 120°, and most preferably between 85° and 105°. To provide the range of motion associated with the PIP joint, the internal angle (e.g., A89, A111, A122) ranges from 210° in configurations 1-4 $C_1$-$C_4$ to 74° in the seventh configuration $C_7$. It should be understood that the contact pad/internal surface of the proximal assembly 250 to the contact pad/internal surface of the medial assembly 270 ranges from 226° to 72°. As such, the internal angle has a range of motion that is between 70° and 110° and most preferably between 85° and 95°.

The DIP joint 25a-25d is defined between the Second Link Plane $L_2$ and the Third Link Plane $L_3$ (i.e., the plane that extends from the sixth pivot point $P_6$ to the forward most point of the finger FP) and has a range of motion that is between 30° and 90°, preferably between 50° and 70°, and most preferably between 55° and 75°. To provide the range of motion associated with the DIP joint 25a-25d, the internal angles (e.g., A90, A101, A123) ranges from 206° in configurations 1-4 $C_1$-$C_4$ to 104° in the seventh configuration $C_7$. It should be understood that the contact pad/internal surface of the medial assembly 270 to the contact pad/internal surface of the distal assembly 280 ranges from 248° to 95°. As such, the internal angle has a range of motion that is between 70° and 110° and most preferably between 85° and 95°. In summary: (i) the DIP joint 25a-25d is configured to have the largest range of motion, while the PIP joint 24a-24d has the smallest range of motion, (ii) the smallest internal angle is associated with the PIP joint 24a-24d, while the largest internal angle is associated with the DIP joint 25a-25d. Based on the above summary, the MCP joint 23a-23d: (i) has a range of motion that is between the PIP joint 24a-24d and the DIP joint 25a-25d, and (ii) does not have the smallest or largest internal angle.

As described above, the PIP joint 24a-24d and DIP joint 25a-25d are linked together in order to allow the finger assembly 20 to be underactuated. In operation, once the independent proximal assembly 250 comes into contact with a resistance point/surface (i.e., an object or the first limiting interface region 254.1.1.1.2.1 contacts an extent of the frame 232.1), the dependent medial and distal assemblies 270, 280 start moving or curling inward towards the palm 602. However, the differences between the internal angles that are formed between: (i) the First Link Plane $L_1$ and the Second Link Plane $L_2$, and (ii) the Second Link Plane $L_2$ and the Third Link Plane $L_3$ are substantially equal. In particular, said differences between the above described internal angles are less than 30°, preferably less than 20°, and most preferably less than 15°. Limiting the difference between the internal angles that are formed at the PIP joint 24a-24d and DIP joint 25a-25d helps ensure that the distal assembly 280 curls inward at a rate (i.e., Dcurl rate) that is approximately equal to a curl rate (i.e., Mcurl rate) of the medial assembly 270. Without having the Mcurl rate approximately (e.g., +/-20%) match the Dcurl rate, the finger assembly 20 would either: (i) fully curl the medial assembly 270 well before the distal assembly 280 was fully curled, or (ii) fully curl the distal assembly 280 well before the medial assembly is fully curled. Either one of these scenarios is not beneficial because it will limit the grasping ability of the end effector 10. Nevertheless, it should be understood that: (i) when the internal angle formed at the PIP joint 24a-24d joint is between approximately 180° to 120°, the internal angle formed at the DIP joint 25a-25d is less than the angle formed at the PIP joint 24a-24d, and (ii) when the internal angle formed at the PIP joint 24a-24d joint is between approximately 120° to 90°, the internal angle formed at the DIP joint 25a-25d is greater than the angle formed at the PIP joint 24a-24d. Additionally, other alterations or modifications to the movement of the PIP joint 24a-24d, DIP joint 25a-25d, curl rates, and/or ratios between the angles formed between said joints 24a-24d, 25a-25d is contemplated by this disclosure.

In addition to the above disclosed ratios and angles, the disclosed end effector 10 has the following upper and lower angular limits: (i) extending between the front edge of the knuckle assembly 230 and the rear surface of the proximal drive link 254.4.3 is between 0° and 153°, as such the range of motion is 153°, (ii) extending between the front edge of the knuckle assembly 230 and the top surface of the proximal assembly 250 is between 65° and 205°, as such the range of motion is 140°, (iii) extending between the top surface of the knuckle assembly 230 and the top surface of the proximal assembly 250 is between 5° and 98°, as such the range of motion is 93°, (iv) extending between the top surface of the proximal assembly 250 and the top surface of the medial assembly 270 is between 150° and 334°, as such the range of motion is 184°, (v) extending between the top surface of the medial assembly 270 and top surface of the distal assembly 280 and is between 143° and 320°, as such the range of motion is 177°, (vi) extending between the contact pad of the distal assembly 280 and the contact pad of the medial assembly 270 is between 95° and 248°, as such the range of motion is 154°, (vii) extending between the contact pad of the medial assembly 270 and the contact pad of the proximal assembly 250 is between 72° and 216°, as such the range of motion is 144°, (vii) extending between the contact pad of the proximal assembly 250 and a bottom extent of the motor 212 is between 79° and 208°, as such the range of motion is 129°. It should be understood that the above values are approximations and other similar values are contemplated by this disclosure. Also, other ratios, angles, and data can be derived from the figures and the below table of values.

a. Scenario 1: FIGS. 34-58

Figure 34:
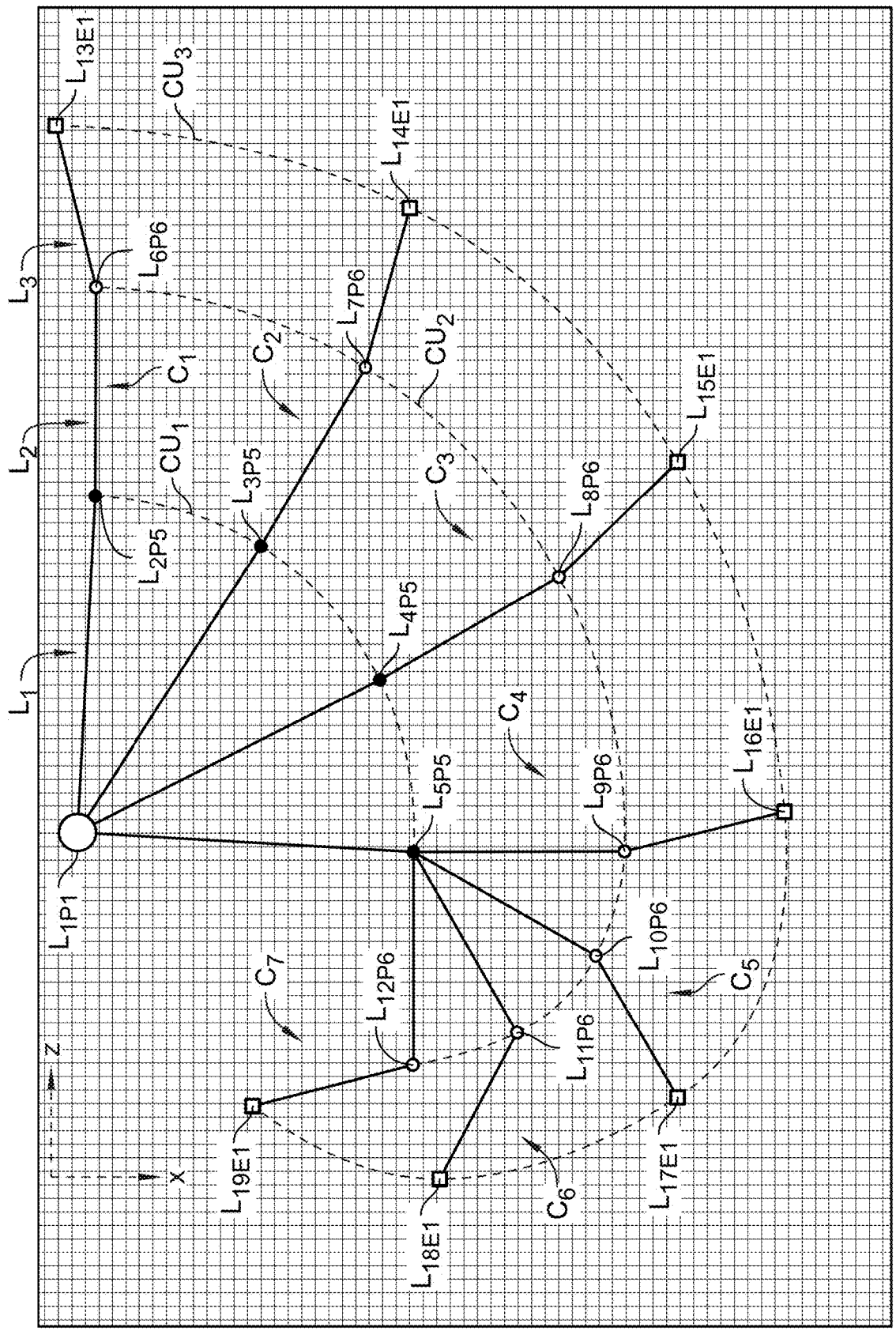
FIG. 34 is a schematic diagram showing the movement assembly moving from a first configuration to a configuration.
Figure 35:
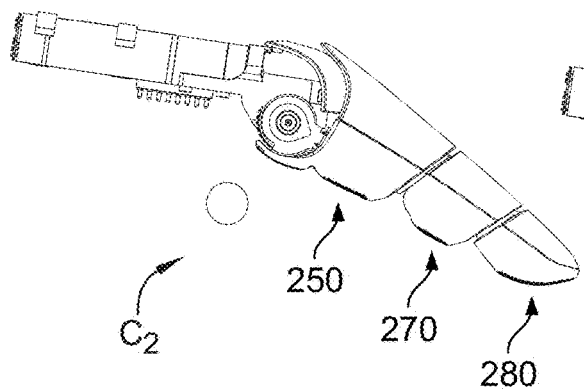
FIG. 35 shows an object in a first location and a right side view of the finger assembly in a second configuration $C_2$, wherein the proximal, medial, and distal assemblies are substantially aligned in a first state.
Figure 36:
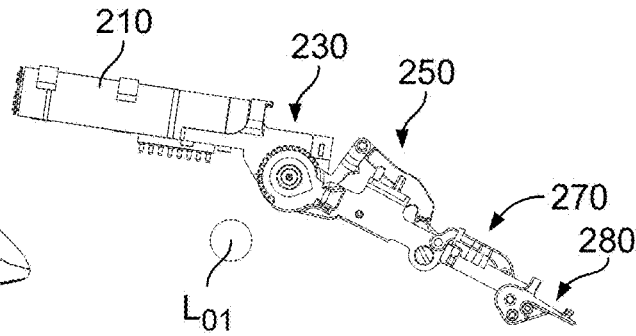
FIG. 36 shows the object in the first location and a right side view of the motor and movement assembly in the second configuration $C_2$.

The finger assembly 22a-22d moves from the first configuration $C_1$ until it reaches the seventh configuration $C_7$. During the movement between these configurations, the finger assembly 22a-22d curls around an object located at a first location $L_{O1}$, but does not come into contact with said object. In other words, the finger assembly 22a-22d is free to move, without being stopped or interrupted by making contact with said object from: (i) the open, uncurled, or neutral state, to (ii) a point where the proximal, medial and distal assemblies are at a maximum flexion position or the finger assembly is in a fully curled state. FIG. 34 is a schematic that shows the movement of the fifth pivot point (i.e., from the second location $L_{2P5}$ to the fifth location $L_{5P5}$, the sixth pivot point (i.e., from the sixth location $L_{6P6}$ to the twelfth location $L_{12P6}$), the end point of the finger assembly 20 (i.e., from the thirteenth location $L_{13PE1}$ to the nineteenth location $L_{19P5}$), the First Link Plane $L_1$, the Second Link Plane $L_2$, and the Third Link Plane $L_3$ caused by the movement of the finger assembly 20 from the first configuration $C_1$ to the seventh configuration $C_7$. As shown in this schematic, movement of said finger assembly 20 from the first configuration to the seventh configuration causes the fifth pivot point to move along a first curvilinear path $CU_1$, the sixth pivot point to move along a second curvilinear path $CU_2$, and the end point of the finger assembly 20 to move along a third curvilinear path $CU_3$, wherein first, second, or third curvilinear paths are not equal to one another. It can also be seen that the Second Link Plane $L_2$, and the Third Link Plane $L_3$ do not move relative to one another before the finger assembly moves to the fifth configuration $C_5$. Further, it can be seen that the First Link Plane $L_1$ does not move after the finger assembly has reached the fourth configuration $C_4$.

Figure 61:
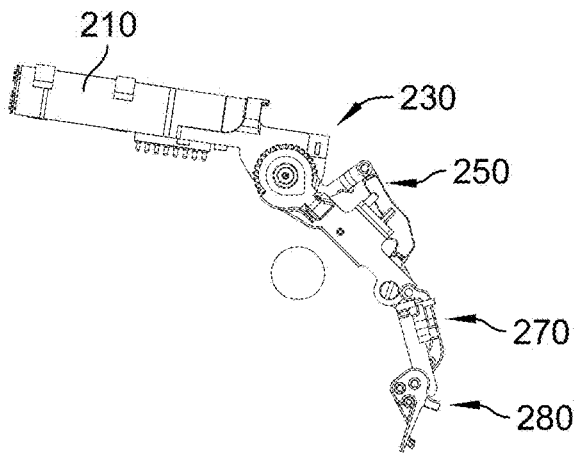
FIG. 61 shows the object in the second location and a right side view of the motor and movement assembly in the eighth configuration $C_8$.

As will be discussed in greater detail below, FIG. 61 is a schematic that shows the movement of each of the seven pivot points that are caused by the movement of the finger assembly 20 from the first configuration to the seventh configuration. Each pivot point is labeled X·Y, wherein X is the configuration of the finger assembly and Y is the number of the pivot point. For example, 4.2 indicates the location of the second pivot point when the finger assembly is in the fourth configuration. As shown in this schematic, movement of said finger assembly 20 from the first configuration $C_1$ to the seventh configuration $C_7$ causes the third and fourth pivot points to rotate around the fifth pivot point, the seventh pivot point to rotate around the sixth pivot point, all pivot points to rotate around the first pivot point, and other information that is discernable by one of skill in the art based on their review of the figures in this application, including FIG. 61.

FIGS. 1-33 show the finger assemblies 22a-22d in the first configuration $C_1$, wherein: (i) the proximal assembly 250 is offset from being parallel with the motor 112 by less than 15° (preferably less than 10°), and (ii) the proximal, medial, and distal assemblies 250, 270, 280 are substantially aligned in a first state. In this first configuration $C_1$, the finger assemblies 22a-22d are in the best position to start or begin to start the procedure for grasping an item due to the fact they are in hyperextension or near hyperextension.

FIGS. 32-37 show the finger assemblies 22a-22d in a second configuration $C_2$, wherein: (i) the proximal assembly 250 is offset from being parallel with the motor 112 by between 17° and 26°, and (ii) the proximal, medial, and distal assemblies 250, 270, 280 are still in the first state. In comparing FIGS. 1-33 and 35-37, the movement from the first configuration $C_1$ to the second configuration $C_2$ has caused the proximal assembly 250 to revolve around the first pivot point by approximately 10° to 15°.

FIGS. 38-40 show the finger assemblies 22a-22d in a third configuration $C_3$, wherein: (i) the proximal assembly 250 is offset from being parallel with the motor 112 by between 41° and 62°, and (ii) the proximal, medial, and distal assemblies 250, 270, 280 are still in the first state. In comparing FIGS. 35-37 and 38-40, the movement from the second configuration $C_2$ to the third configuration $C_3$ has caused the proximal assembly 250 to revolve around the first pivot point by approximately 25° to 35°.

FIGS. 41-43 and 53-54 show the finger assemblies 22a-22d in a fourth configuration $C_4$, wherein: (i) the proximal assembly 250 is offset from being parallel with the motor 112 by between 65° and 98°, and (ii) the proximal, medial, and distal assemblies 250, 270, 280 are still in the first state. As discussed below, the proximal assembly 250 is at maximum flexion position in configurations four through seven $C_4$-$C_7$. In comparing FIGS. 38-40 and 41-43, 53-54, the movement from the third configuration to the fourth configuration has caused the proximal assembly 250 to revolve around the first pivot point by approximately 25° to 35°. At this fourth configuration $C_4$, the first limiting interface region 254.1.1.1.2.1 of the primary proximal link 254.1 has come into contact with the frame assembly 232.1 of the knuckle assembly 230, which in turn has limited the revolution of the proximal assembly 250 around said first pivot point. Because of the interaction between an extent (i.e., first limiting interface region 254.1.1.1.2.1) of the proximal assembly 250 and the resistance surface/point (i.e., frame assembly 232.1), movement beyond the fourth configuration $C_4$ will: (i) not allow the proximal assembly 250 to curl or revolve inward, and (ii) cause engagement between the primary proximal link 254.1 and the worm bearings 256.2 in order to allow the finger assembly 22a-22d to continue bending or curling towards the palm 602. Without utilization of the worm bearings 256.2, the finger assembly 22a-22d could not continue bending or curling towards the palm 602 (i.e., the finger assembly 22a-22d would be locked out). It should be understood that in other embodiments, the frame assembly 232.1 may be modified in order to allow the proximal assembly 250 to: (i) further revolve around said first pivot point by another 10° to 40°, or (ii) revolve a smaller amount around said first pivot point by another 10° to 40°.

As discussed above, the movement from the fourth configuration $C_4$ to the fifth configuration $C_5$ causes: (i) the proximal housing assembly 252 to remain frozen in its position, and (ii) the medial and distal assemblies 270, 280 to start moving around additional pivot points (i.e., points 5 and 6). It should be understood from reviewing the Figures of this Application, that while the proximal housing assembly 252 may be frozen in its position due to the fact that said housing assembly 252 came into contact with the resistant point/surface, other components (e.g., biasing assembly 254.2 and the proximal drive link assembly 254.4) of the proximal assembly 250 can continue to move or are not frozen. Without permitting the movement of these other components, the motor 212 could not continue driving the closure of the finger assembly 22a-22d once the proximal assembly 250 comes into contact with a resistant surface/point. It should be understood that additional or fewer components of the finger assemblies 22a-22d may not be permitted to move once said assemblies 22a-22d to the fourth configuration.

FIGS. 44-46 and 55-56 show the finger assemblies 22a-22d in a fifth configuration $C_5$, wherein: (i) the proximal assembly 250 is in contact with a resistance point/surface, and (ii) the proximal, medial, and distal assemblies 250, 270, 280 are in a second state, wherein none of the assemblies 250, 270, 280 are substantially aligned. In said fifth configuration $C_5$, the proximal assembly is at a maximum flexion position and the medial and distal assemblies are in a partially curled state. In comparing FIGS. 41-43, 53-54 and 44-46, 55-56, the movement from the fourth configuration to the fifth configuration has caused: (i) the medial assembly 270 to revolve around the fifth pivot point by approximately 15° to 30°, and (ii) the distal assembly 280 to revolve around the sixth pivot point by approximately 10° to 25°. Movement from the fourth configuration $C_4$ to the fifth configuration illustrates that the medial assembly 270 may revolve around the fifth pivot point faster than the distal assembly revolves around the sixth pivot point.

Figure 47:
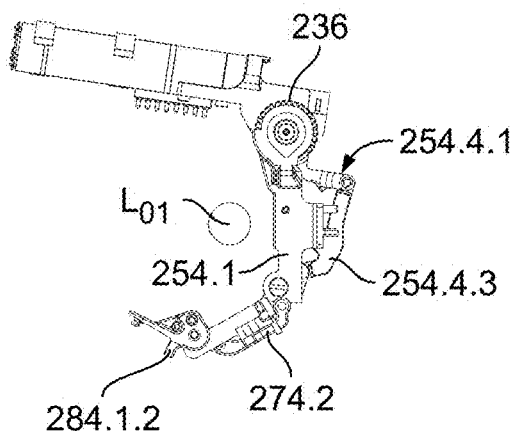
FIG. 47 shows the object in the first location and a right side view of the finger assembly in a sixth configuration $C_6$, wherein the proximal assembly is at maximum flexion position and the medial and distal assemblies are in a partially curled state.
Figure 48:
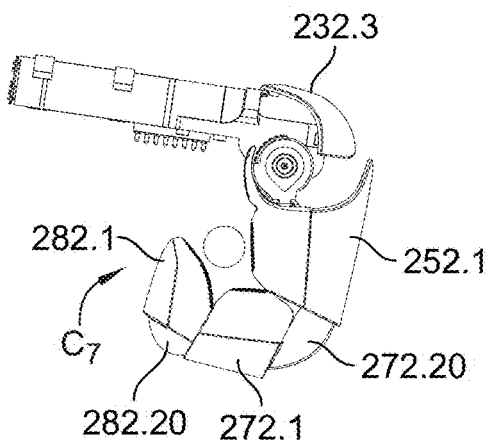
FIG. 48 shows the object in the first location and a right side view of the motor and movement assembly in the sixth configuration $C_6$.
Figure 49:
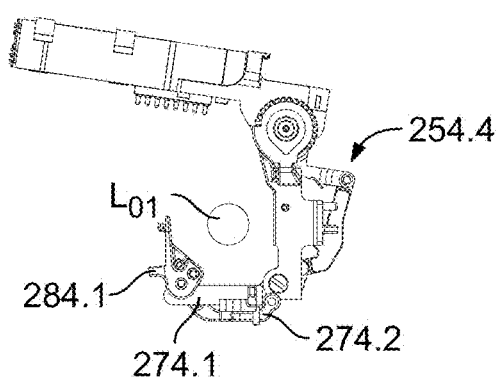
FIG. 49 shows the object in the first location and a right side cross-sectional view of the finger assembly in the sixth configuration $C_6$.
Figure 50:
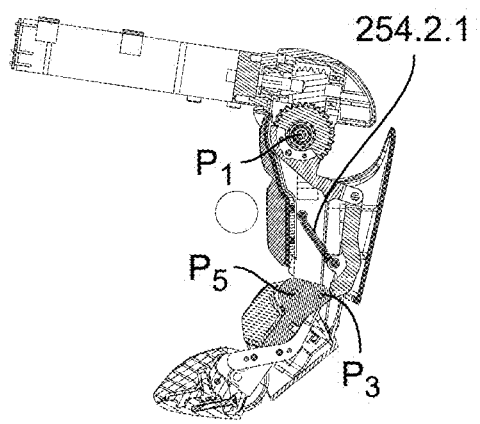
FIG. 50 shows the object in the first location and a right side view of the finger assembly in a seventh configuration $C_7$, wherein the proximal, medial and distal assemblies are at maximum flexion position or the finger assembly is in a fully curled state.
Figure 51:
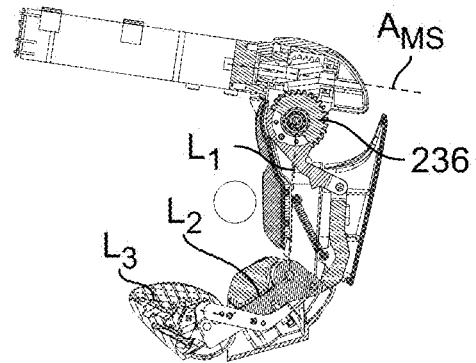
FIG. 51 shows the object in the first location and a right side view of the motor and movement assembly in the seventh configuration $C_7$.

FIGS. 47-49 show the finger assemblies 22a-22d in a sixth configuration $C_6$, wherein: (i) the proximal assembly 250 is in contact with a resistance point/surface, and (ii) the proximal, medial, and distal assemblies 250, 270, 280 are in a second state, wherein none of the assemblies 250, 270, 280 are substantially aligned. In said sixth configuration $C_6$, the proximal assembly is at maximum flexion position and the medial and distal assemblies are in a partially curled state. In comparing FIGS. 44-46, 55-56 and 47-49, the movement from the fifth configuration to the sixth configuration has caused: (i) the medial assembly 270 to revolve around the fifth pivot point by approximately 30° to 50°, and (ii) the distal assembly 280 to revolve around the sixth pivot point by approximately 20° to 35°. Movement from the fifth configuration $C_5$ to the sixth configuration $C_6$ illustrates that medial assembly 270 may revolve around the fifth pivot point faster than the distal assembly revolves around the sixth pivot point.

FIGS. 50-52 and 57-58 show the finger assemblies 22a-22d in a seventh configuration $C_7$, wherein: (i) the proximal assembly 250 is in contact with a resistance point/surface, (ii) the proximal, medial, and distal assemblies 250, 270, 280 are in a second state, wherein none of the assemblies 250, 270, 280 are substantially aligned, and (iii) the proximal, medial and distal assemblies are at maximum flexion position or the finger assembly is in a fully curled state. In comparing FIGS. 77-80 and FIGS. 81-83B, the movement from the sixth configuration to the seventh configuration has caused: (i) the medial assembly 270 to revolve around the fifth pivot point by approximately 16° to 24°, and (ii) the distal assembly 280 to revolve around the sixth pivot point by approximately 14° to 22°. Movement from the sixth configuration $C_6$ to the seventh configuration $C_7$ illustrates that the medial assembly 270 revolves around the fifth pivot point faster than the distal assembly revolves around the sixth pivot point. Overall, the quicker revolution of the medial assembly 270 around the fifth pivot point in comparison to the revolution of the distal assembly 280 around the sixth pivot point is desirable because the range of motion of the PIP joint 24a-24d is larger than the range of motion of the DIP joint 25a-25d.

In summary and to enable the finger assemblies 22a-22d to move in the above described fashion from the first configuration $C_1$ or open, uncurled, or neutral state until it reaches the seventh configuration $C_7$ or fully curled state, the internal components of the motor 212 are configured to rotate the motor shaft 212.2 around the motor shaft axis $A_{MS}$. The rotation of the motor shaft 212.2 around the motor shaft axis $A_{MS}$ causes the worm drive gear 216 to rotate about a worm drive gear axis $A_{WDG}$. The rotation of the worm drive gear 216 about a worm drive gear axis $A_{WDG}$ causes the worm wheel 236 to rotate above the worm wheel axis $A_{WW}$ or the first pivot point $P_1$. The rotation of the worm wheel 236 causes the worm drive link 254.4.1 to also rotate about the worm wheel axis $A_{WW}$ or the first pivot point $P_1$. Said rotation of the worm drive link 254.4.1 causes rotation of: (i) the main proximal link 254.1, and (ii) proximal drive link 254.4.3, and (iii) a majority of the components of said finger assembly 22a-22d. The movement of the proximal drive link 254.4.3 causes: (i) the main medial link 274.1 to rotate about the pivot point $P_5$ or medial axis $A_M$, (ii) the distal housing 282 to rotate about the pivot point $P_6$ or distal axis $A_D$. The rotation of the main proximal link 254.1 and the main medial link 274.1 causes the proximal housing assembly 252 and medial housing assembly 272 to rotate, respectively. It should be understood that the main proximal link 254.1 will continue rotating in response to the rotation of the worm wheel 236 until it reaches a contact or resistance point. Once it makes contact with said resistance point, the main proximal link 254.1 will stop rotating and the bias member 254.2.1 will start moving or deforming from a first or collapsed position with a length of $LT_1$ to a second or extended position with a length $LT_2$.

b. Scenario 2: FIGS. 62-70

Figure 62:
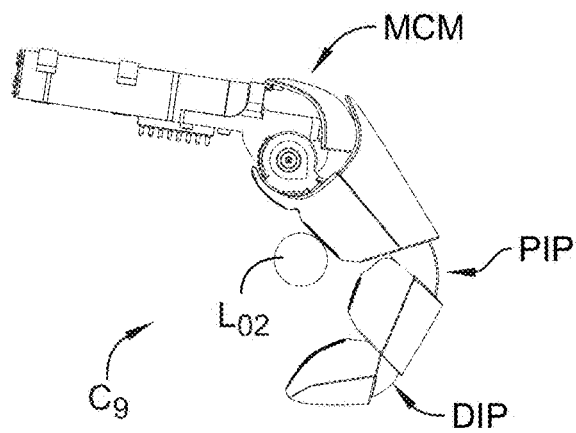
FIG. 62 shows the object in the second location and a right side cross-sectional view of the finger assembly in the eighth configuration $C_8$.
Figure 63:
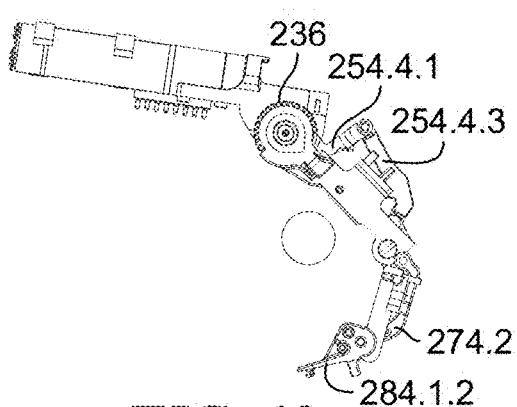
FIG. 63 shows the object in the second location and a right side view of the finger assembly in a ninth configuration $C_9$, and wherein: (i) the proximal assembly is in contact with the object, and (ii) the medial and distal assemblies are in a partially curled state.
Figure 64:
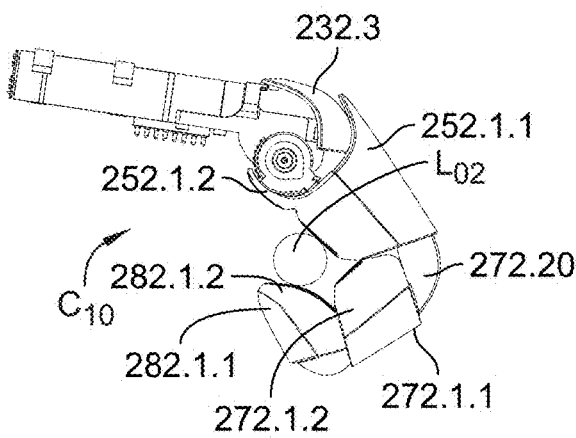
FIG. 64 shows the object in the second location and a right side view of the motor and movement assembly in the ninth configuration $C_9$.
Figure 65:
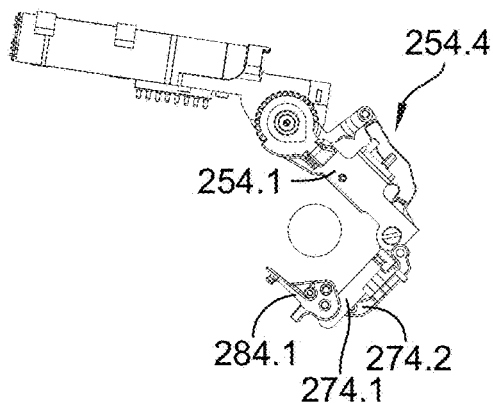
FIG. 65 shows the object in the second location and a right side cross-sectional view of the finger assembly in the ninth configuration $C_9$.
Figure 66:
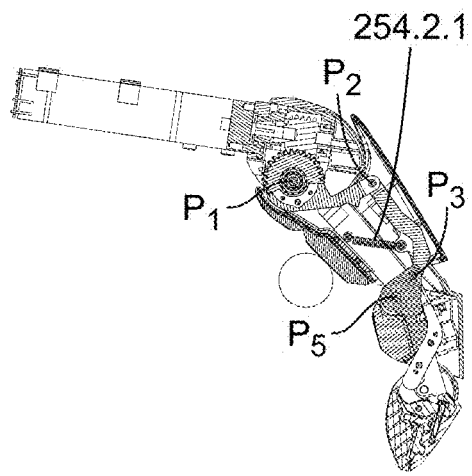
FIG. 66 shows the object in the second location and a right side view of the finger assembly in a tenth configuration $C_{10}$, and wherein: (i) the proximal assembly is in contact with the object, and (ii) the medial and distal assemblies are at maximum flexion position.
Figure 67:
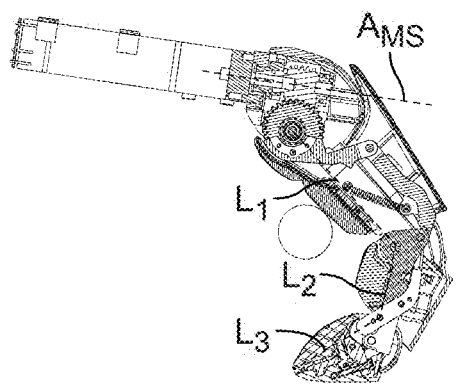
FIG. 67 shows the object in the second location and a right side view of the motor and movement assembly in the tenth configuration $C_{10}$.
Figure 68:
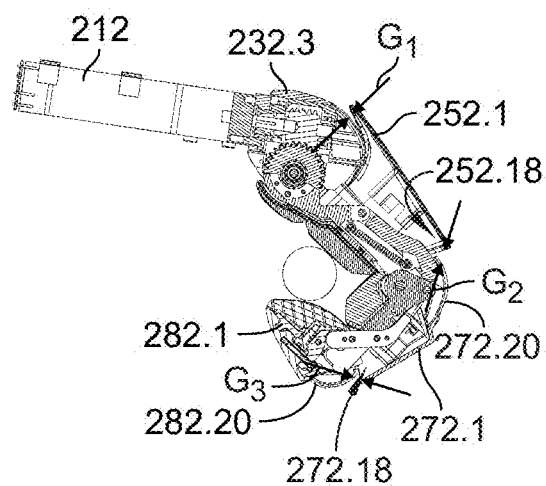
FIG. 68 shows the object in the second location and a right side cross-sectional view of the finger assembly in the tenth configuration $C_{10}$.
Figure 69:
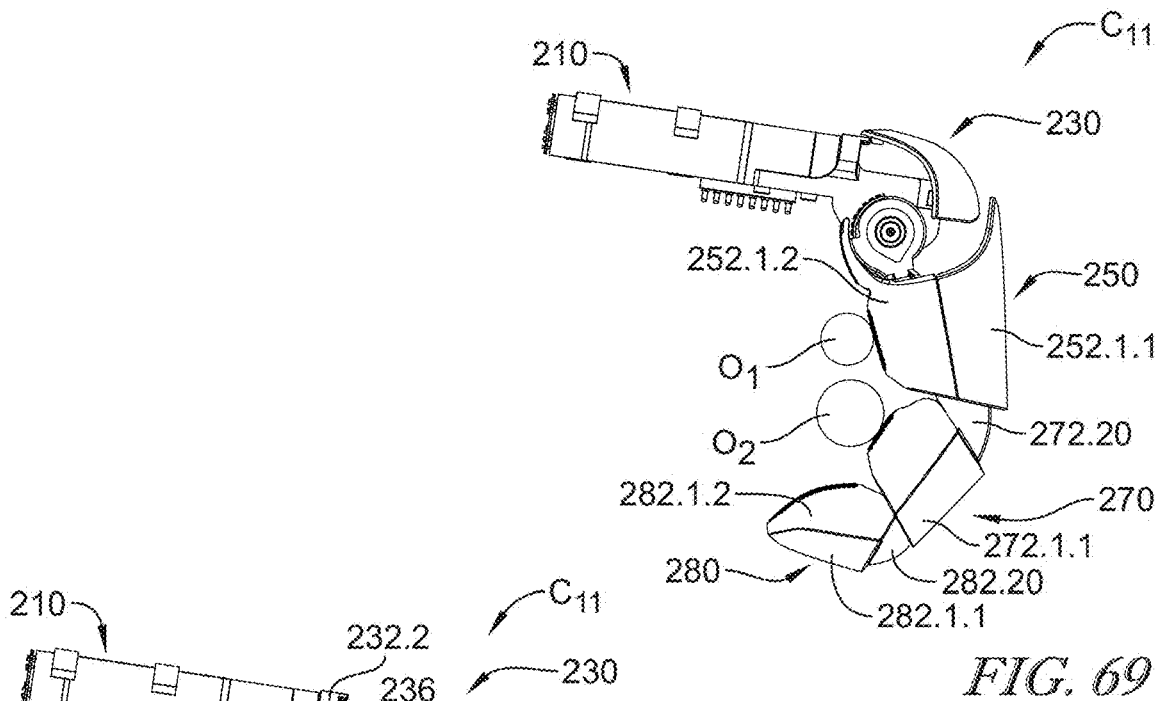
FIG. 69 shows two objects in third and fourth locations and a right side view of the finger assembly in an eleventh configuration $C_{11}$, and wherein: (i) the proximal assembly is in contact with the first object, (ii) the medial assembly is in contact with the second object, and (iii) none of the proximal, medial, or distal assemblies are at minimum or maximum flexion position.
Figure 70:
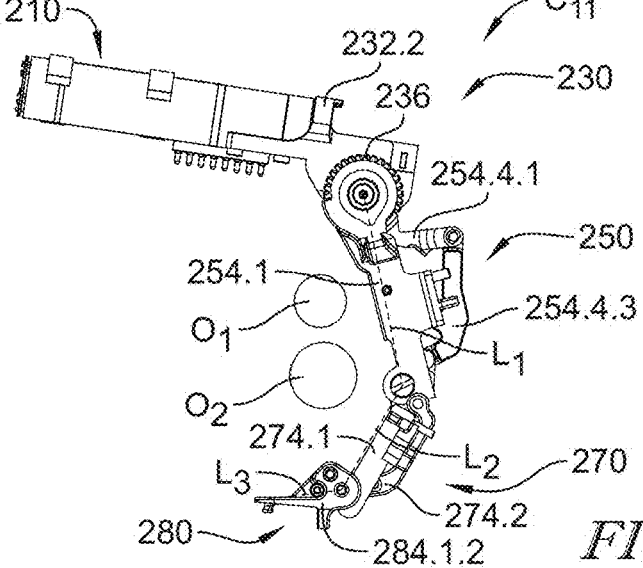
FIG. 70 shows the two objects in the third and fourth locations and a right side view of the motor and movement assembly in the eleventh configuration $C_{11}$.

The finger assembly 22a-22d moves from the first configuration $C_1$ to configurations eight through ten $C_8$-$C_{10}$. During the movement, the finger assembly 22a-22d starts to curl, but the proximal assembly 250 come into contact with an object before the proximal assembly 250 can be fully curled inward (i.e., allow contact between the first limiting interface region 254.1.1.1.2 and the frame 232.1). In other words, by positioning the object in a second location the finger assembly 22a-22d cannot maximize the range of movement of each joint contained in said finger assembly 22a-22d. FIGS. 62-64 show the finger assemblies 22a-22d in an eighth configuration, wherein: (i) the proximal assembly 250 is in contact with a resistance point/surface (i.e., the object), and (ii) the proximal, medial, and distal assemblies 250, 270, 280 are in a second state, wherein none of the assemblies 250, 270, 280 are substantially aligned. In these Figures: (i) proximal assembly 250 revolved about the first pivot point by approximately 25° to 45°, (ii) the medial assembly 270 to revolve around the fifth pivot point by approximately 15° to 30°, and (ii) the distal assembly 280 to revolve around the sixth pivot point by approximately 10° to 25°. In the eighth and ninth configurations $C_8$-$C_{10}$ the medial and distal assemblies are in partially curled states, while the medial and distal assemblies are at maximum flexion position or the finger assembly is in a fully curled state.

Figure 71:
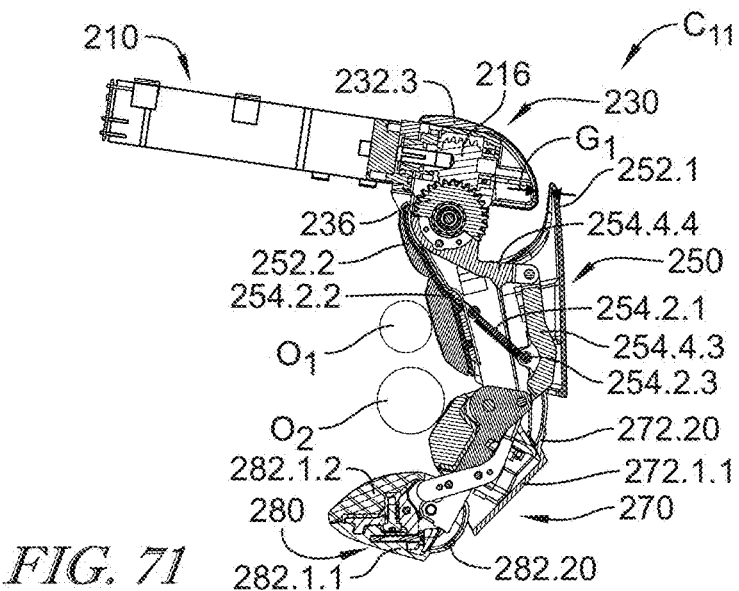
FIG. 71 shows the two objects in the third and fourth locations and a right side cross-sectional view of the finger assembly in the eleventh configuration $C_{11}$.
Figure 72:
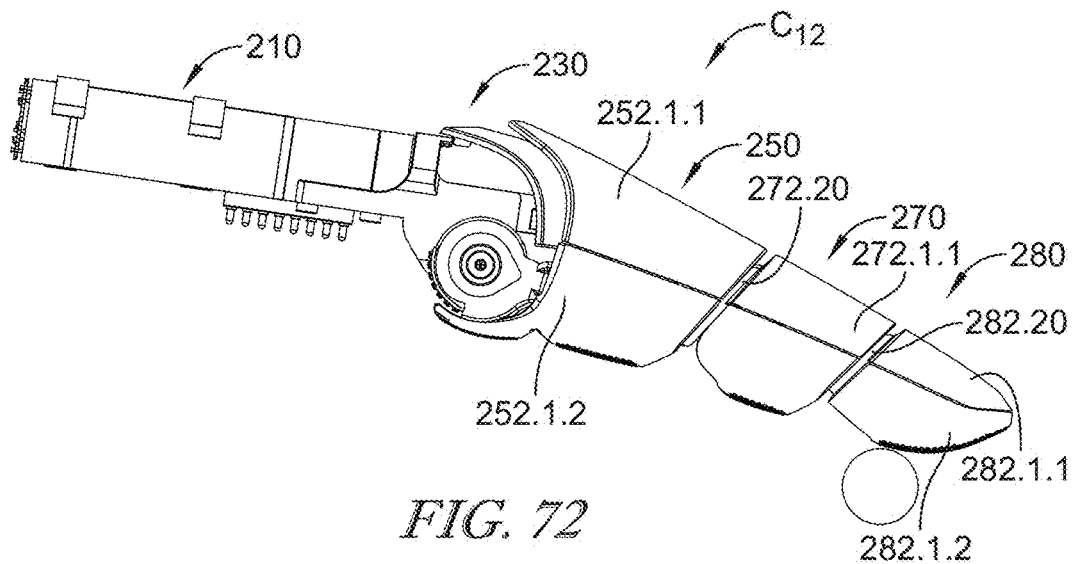
FIG. 72 shows the object in a fifth location and a right side view of the finger assembly in a twelfth configuration $C_{12}$, and wherein: (i) the distal assembly is in contact with the object, and (ii) neither the proximal assembly nor medial assembly are at minimum or maximum flexion position.
Figure 73:
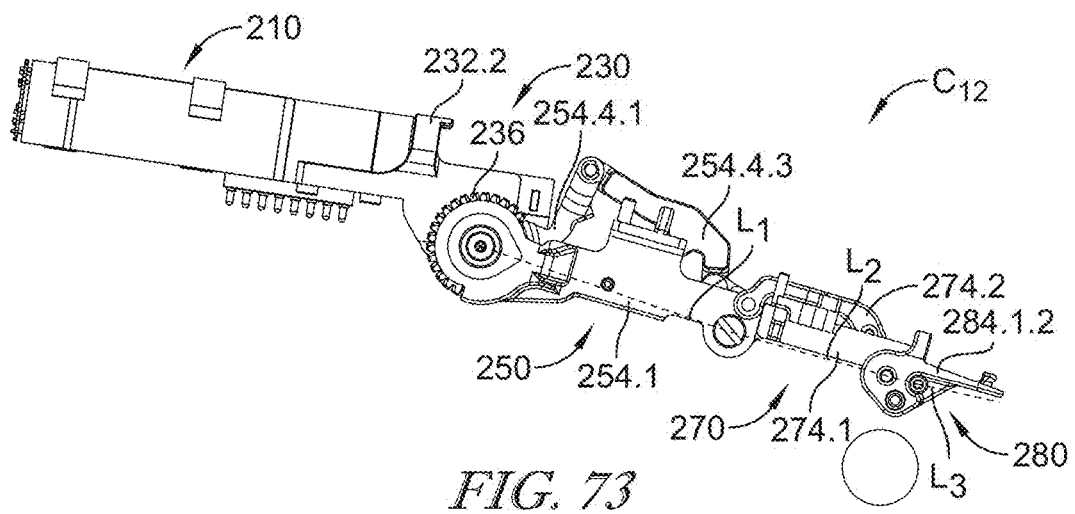
FIG. 73 shows the object in the fifth location and a right side view of the motor and movement assembly in the twelfth configuration $C_{12}$.

For sake of brevity, movement from configuration eight to nine and from configuration nine to ten will not be discussed due to the fact that these movements are similar, if not the same as, the movements that the finger assembly 22a-22d undergoes when moving from the fourth configuration to the seventh configuration $C_4$-$C_7$. However, it should be noted that the ninth configuration is not the same as any of the first through the seventh configurations $C_1$-$C_7$ because the rotation of the components is slightly different. In particular, the positional relationships between: (i) the medial and distal assemblies 270, 280: (a) shown in FIGS. 62-64 (e.g., configuration eight) are positioned between the relationships discussed in connection with fifth and sixth configurations, and (b) shown in FIGS. 65-67 (i.e., configuration nine) are positioned between the relationships discussed in connection with sixth and seventh configurations, and (ii) the motor 112 and the proximal assembly 250 of the eight-tenth configurations are positioned between the relationships discussed in connection with second and third configurations.

c. Scenario 3: FIGS. 71-73

The finger assembly 22a-22d moves from the first configuration $C_1$ to the eleventh configuration $C_{11}$. During the movement, the finger assembly 22a-22d starts to curl, but the proximal assembly 250 comes into contact with a first object and then the medial assembly 270 come into contact with a second object. Contact between the first and second objects and the assemblies 250, 270 prevents the finger assembly 22a-22d being fully curled inward. In other words, by positioning the first and second objects in the disclosed locations, the finger assembly 22a-22d cannot maximize the range of movement of each joint contained in said finger assembly 22a-22d. In fact, said contact between the second object and the medial assembly 270 locks the finger 22a-22d in position. Stated another way, said contact prevents the finger assembly 22a-22d from curling around the object. If this scenario happens while the end effector 10 is in use, said system will typically move the objects due to compliance in the overall environment or the robot will try to reposition the finger assembly 22a-22d within the environment.

FIGS. 71-73 show the finger assemblies 22a-22d in the eleventh configuration $C_{11}$, wherein: (i) the medial assembly 270 is in contact with a resistance point/surface (i.e., the object), and (ii) the proximal, medial, and distal assemblies 250, 270, 280 are in a second state, wherein none of the assemblies 250, 270, 280 are substantially aligned. In said eleventh configuration neither the proximal assembly nor distal assembly are at minimum or maximum flexion position. In these Figures: (i) proximal assembly 250 revolved about the first pivot point by approximately 50° to 75°, (ii) the medial assembly 270 to revolve around the fifth pivot point by approximately 30° to 45°, and (ii) the distal assembly 280 to revolve around the sixth pivot point by approximately 25° to 40°. It should be noted that the eleventh configuration is not the same as any of the first through the tenth configurations $C_1$-$C_{10}$ because the rotation of the components is slightly different. In particular, the positional relationships between: (i) the medial and distal assemblies 270, 280 are positioned between the relationships discussed in connection with eighth and ninth configurations, and (ii) the motor 112 and the proximal assembly 250 is positioned between the relationships discussed in connection with second and third configurations.

d. Scenario 4: FIGS. 71-76

The finger assembly 22a-22d moves from the first configuration $C_1$ to the twelfth configuration $C_{12}$. During the movement, the finger assembly 22a-22d starts to curl, but the distal assembly 280 come into contact with an object before the proximal assembly 250 can be fully curled inward (i.e., allow contact between the first limiting interface region 254.1.1.1.2 and the frame 232.1). In other words, by positioning the object in a fourth location the finger assembly 22a-22d cannot maximize the range of movement of each joint contained in said finger assembly 22a-22d. In fact, said contact between the object and the distal assembly 280 locks the finger 22a-22d in position. Stated another way, said contact prevents the finger assembly 22a-22d from curling around the object. If this scenario happens while the end effector 10 is in use, said system will typically try to reposition the finger assembly 22a-22d and try and grasp the object with a different approach angle.

Figure 74:
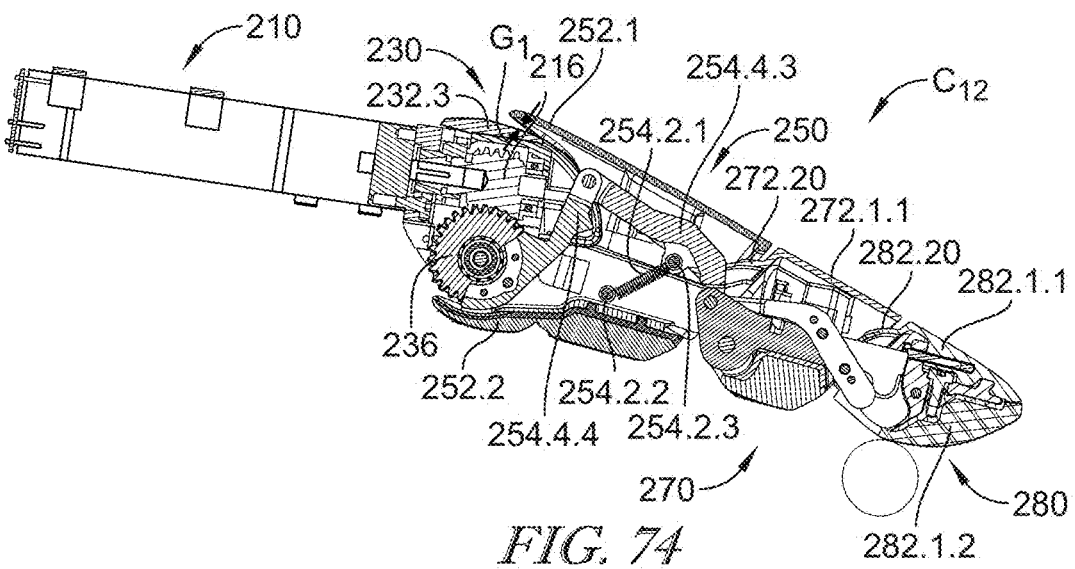
FIG. 74 shows the object in the fifth location and a right side cross-sectional view of the finger assembly in the twelfth configuration $C_{12}$.

FIGS. 74-76 show the finger assemblies 22a-22d in the twelfth configuration $C_{12}$, wherein: (i) the distal assembly 280 is in contact with a resistance point/surface (i.e., the object), and (ii) the proximal, medial, and distal assemblies 250, 270, 280 are in the first state, wherein all assemblies 250, 270, 280 are substantially aligned. In said twelfth configuration $C_{12}$ neither the proximal assembly nor medial assembly are at minimum or maximum flexion position. In these Figures: (i) proximal assembly 250 revolved about the first pivot point by approximately 2° to 10°, (ii) the medial assembly 270 has not revolved around the fifth pivot point, and (ii) the distal assembly 280 has not revolved around the sixth pivot point. It should be noted that the twelfth configuration is not the same as any of the first through the eleventh configurations $C_1$-$C_{11}$ because the rotation of the components is slightly different. In particular, the positional relationships between the motor 112 and the proximal assembly 250 is positioned between the relationships discussed in connection with first and second configurations.

e. Scenario 5: FIGS. 77-79

The finger assembly 22a-22d moves from the first configuration $C_1$ to the thirteenth configuration $C_{13}$. During the movement, the finger assembly 22a-22d starts to curl, but the medial assembly 270 come into contact with an object before the proximal assembly 250 can be fully curled inward (i.e., allow contact between the first limiting interface region 254.1.1.1.2 and the frame 232.1). In other words, by positioning the object in a fifth location the finger assembly 22a-22d cannot maximize the range of movement of each joint contained in said finger assembly 22a-22d. In fact, said contact between the object and the medial assembly 270 locks the finger 22a-22d in position. Stated another way, said contact prevents the finger assembly 22a-22d from curling around the object. If this scenario happens while the end effector 10 is in use, said system will typically move the objects due to compliance in the overall environment or the robot will try to reposition the finger assembly 22a-22d within the environment.

FIGS. 77-79 show the finger assemblies 22a-22d in the thirteenth configuration $C_{13}$, wherein: (i) the medial assembly 270 is in contact with a resistance point/surface (i.e., the object), and (ii) the proximal, medial, and distal assemblies 250, 270, 280 are in the first state, wherein all assemblies 250, 270, 280 are substantially aligned. In these Figures: (i) proximal assembly 250 revolved about the first pivot point by approximately 45° to 70°, (ii) the medial assembly 270 has not revolved around the fifth pivot point, and (ii) the distal assembly 280 has not revolved around the sixth pivot point. It should be noted that the thirteenth configuration is not the same as any of the first through the eleventh configurations because the rotation of the components is slightly different. In particular, the positional relationships between the motor 112 and the proximal assembly 250 is positioned between the relationships discussed in connection with third and eleventh configurations.

E. Configurations, Planes, Pivot Points, Angles, and Distances

TABLES 3 and 4

| | | | |
|---|---|---|---|
| $C_1$ | First Configuration | $P_1$ | First Pivot Point-Fixed |
| $C_2$ | Second Configuration | $P_2$ | Second Pivot Point-Not Fixed |
| $C_3$ | Third Configuration | $P_3$ | Third Pivot Point-Not Fixed |
| $C_4$ | Fourth Configuration | $P_4$ | Fourth Pivot Point-Semi-Fixed |
| $C_5$ | Fifth Configuration | $P_5$ | Fifth Pivot Point-Semi-Fixed |
| $C_6$ | Sixth Configuration | $P_6$ | Sixth Pivot Point-Semi-Fixed |
| $C_7$ | Seventh Configuration | $P_7$ | Seventh Pivot Point-Not Fixed |

TABLE 5

| | |
|---|---|
| $P_{22a}$ | Pointer Finger Plane |
| $P_S$, $P_{22b}$ | Sagittal Plane or Middle Finger Plane |
| $P_{22c}$ | Ring Finger Plane |
| $P_{22d}$ | Small Finger Plane |
| $P_{FM}$ | Finger Motor Plane |
| $P_{TM}$ | Thumb Motor Plane |
| $P_{FC}$ | Finger Coronal Plane |
| $P_{SU}$ | Surface Plane |
| $S_1$ | First Section Plane |
| $S_2$ | Second Section Plane |
| $S_3$ | Third Section Plane |
| $M_1$ | First Medial Section Plane |
| $M_2$ | Second Medial Section Plane |

TABLE 6

| | | |
|---|---|---|
| $F_{CP}$ | Finger Coronal Plane | Extends Between $P_1$ and LFP |
| $L_1$ | First Link Plane | Extends Between $P_1$ and $P_5$ |
| $L_2$ | Second Link Plane | Extends Between $P_5$ and $P_6$ |
| $L_3$ | Third Link Plane | Extends Between $P_6$ and FP |
| $L_4$ | Fourth Link Plane | Extends Between $P_1$ and $P_6$ |
| $L_5$ | Fifth Link Plane | Extends Between $P_1$ and $P_2$ |
| $L_6$ | Sixth Link Plane | Extends Between $P_2$ and $P_6$ |
| $L_7$ | Seventh Link Plane | Extends Between $P_2$ and $P_3$ |
| $L_8$ | Eighth Link Plane | Extends Between $P_3$ and $P_6$ |
| $L_9$ | Ninth Link Plane | Extends Between $P_4$ and $P_6$ |
| $L_{10}$ | Tenth Link Plane | Extends Between $P_1$ and $P_3$ |
| $L_{11}$ | Eleventh Link Plane | Extends Between $P_4$ and $P_7$ |
| $L_{12}$ | Twelfth Link Plane | Extends Between $P_3$ and $P_7$ |
| $L_{13}$ | Thirteenth Link Plane | Extends Between $P_5$ and $P_7$ |
| $L_{14}$ | Fourteen Link Plane | Extends Between $P_6$ and $P_7$ |

TABLE 7

| | | | |
|---|---|---|---|
| 1.1 | First Configuration, First Pivot Point | 6.2 | Sixth Configuration, Second Pivot Point |
| 2.1 | Second Configuration, First Pivot Point | 7.2 | Seventh Configuration, Second Pivot Point |
| 3.1 | Third Configuration, First Pivot Point | 1.3 | First Configuration, Third Pivot Point |
| 4.1 | Fourth Configuration, First Pivot Point | 2.3 | Second Configuration, Third Pivot Point |
| 5.1 | Fifth Configuration, First Pivot Point | 3.3 | Third Configuration, Third Pivot Point |
| 6.1 | Sixth Configuration, First Pivot Point | 4.3 | Fourth Configuration, Third Pivot Point |
| 7.1 | Seventh Configuration, First Pivot Point | 5.3 | Fifth Configuration, Third Pivot Point |
| 1.2 | First Configuration, Second Pivot Point | 6.3 | Sixth Configuration, Third Pivot Point |
| 2.2 | Second Configuration, Second Pivot Point | 7.3 | Seventh Configuration, Third Pivot Point |
| 3.2 | Third Configuration, Second Pivot Point | 1.4 | First Configuration, Fourth Pivot Point |
| 4.2 | Fourth Configuration, Second Pivot Point | 2.4 | Second Configuration, Fourth Pivot Point |
| 5.2 | Fifth Configuration, Second Pivot Point | 4.6 | Fourth Configuration, Sixth Pivot Point |
| 3.4 | Third Configuration, Fourth Pivot Point | 5.6 | Fifth Configuration, Sixth Pivot Point |
| 4.4 | Fourth Configuration, Fourth Pivot Point | 6.6 | Sixth Configuration, Sixth Pivot Point |
| 5.4 | Fifth Configuration, Fourth Pivot Point | 7.6 | Seventh Configuration, Sixth Pivot Point |
| 6.4 | Sixth Configuration, Fourth Pivot Point | 1.7 | First Configuration, Seventh Pivot Point |
| 7.4 | Seventh Configuration, Fourth Pivot Point | 2.7 | Second Configuration, Seventh Pivot Point |
| 1.5 | First Configuration, Fifth Pivot Point | 3.7 | Third Configuration, Seventh Pivot Point |
| 2.5 | Second Configuration, Fifth Pivot Point | 4.7 | Fourth Configuration, Seventh Pivot Point |
| 3.5 | Third Configuration, Fifth Pivot Point | 5.7 | Fifth Configuration, Seventh Pivot Point |
| 4.5 | Fourth Configuration, Fifth Pivot Point | 6.7 | Sixth Configuration, Seventh Pivot Point |
| 5.5 | Fifth Configuration, Fifth Pivot Point | 7.7 | Seventh Configuration, Seventh Pivot Point |
| 6.5 | Sixth Configuration, Fifth Pivot Point | | |
| 7.5 | Seventh Configuration, Fifth Pivot Point | | |
| 1.6 | First Configuration, Sixth Pivot Point | | |
| 2.6 | Second Configuration, Sixth Pivot Point | | |
| 3.6 | Third Configuration, Sixth Pivot Point | | |

TABLE 8

| Configuration 1 | | | Configuration 4 | | |
|---|---|---|---|---|---|
| Angle | Lower Bound | Upper Bound | Angle | Lower Bound | Upper Bound |
| A190 | 72° | 108° | A80 | 72° | 108° |
| A23 | 150° | 224° | A83' | 150° | 224° |
| A193 | 150° | 224° | A84 | 143° | 214° |
| A194 | 166° | 248° | A85" | 166° | 248° |
| A195 | 144° | 216° | A86 | 144° | 216° |
| A196 | 137° | 205° | A87 | 79° | 118° |
| A197 | 149° | 223° | A88 | 77° | 115° |
| A198 | 140° | 210° | A89 | 140° | 210° |
| A199 | 165° | 247° | A90 | 165° | 247° |

| Configuration 5 | | | Configuration 7 | | |
|---|---|---|---|---|---|
| Angle | Lower Bound | Upper Bound | Angle | Lower Bound | Upper Bound |
| A91 | 78° | 117° | A113" | 102° | 153° |
| A94" | 174° | 260° | A116" | 222° | 332° |
| A95" | 178° | 266° | A117" | 214° | 320° |
| A96" | 130° | 196° | A118 | 95° | 142° |
| A97 | 120° | 180° | A119 | 72° | 108° |
| A98 | 79° | 118° | A120 | 79° | 118° |
| A99 | 77° | 115° | A121 | 76° | 115° |
| A100 | 122° | 183° | A122 | 74° | 111° |
| A101 | 120° | 180° | A123 | 84° | 125° |

F. Industrial Application

While the disclosure shows illustrative embodiments of a robot (in particular, a humanoid robot), it should be understood that embodiments are designed to be examples of the principles of the disclosed assemblies, methods and systems, and are not intended to limit the broad aspects of the disclosed concepts to the embodiments illustrated. As will be realized, the disclosed robot, and its functionality and methods of operation, are capable of other and different configurations and several details are capable of being modified all without departing from the scope of the disclosed methods and systems. For example, one or more of the disclosed embodiments, in part or whole, may be combined with a disclosed assembly, method and system. As such, one or more steps from the diagrams or components in the Figures may be selectively omitted and/or combined consistent with the disclosed assemblies, methods and systems. Additionally, one or more steps from the arrangement of components may be omitted or performed in a different order. Accordingly, the drawings, diagrams, and detailed description are to be regarded as illustrative in nature, not restrictive or limiting, of the said humanoid robot.

While the above-described robot is designed as a head for use with a general-purpose humanoid robot, it should be understood that its assemblies, components, learning capabilities, and/or kinematic capabilities may be used with other robots. Examples of other robots include: articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robot systems. The robot system may include one or more sensors (e.g., cameras, temperature, pressure, force, inductive or capacitive touch), motors (e.g., servo motors and stepper motors), actuators, biasing members, encoders, housing, or any other component known in the art that is used in connection with robot systems. Likewise, the robot system may omit one or more sensors (e.g., cameras, temperature, pressure, force, inductive or capacitive touch), motors (e.g., servo motors and stepper motors), actuators, biasing members, encoders, housing, or any other component known in the art that is used in connection with robot systems.

In other embodiments, other configurations and/or components may be utilized. For example, the end effector 10 may include one or more tactile sensor assemblies. The tactile sensor assembly may measure the load experienced on the finger assemblies of the end effector using a strain gauge or arrays of strain gauges. The strain gauges may measure strain, which may be used to determine the force, stress, torque, pressure, deflection, etc. experienced on the finger assemblies. The feedback provided by these tactile sensor assemblies embedded in the end effector (finger assemblies) can be combined with data from the encoders, torque sensors and/or other sensors that are positioned adjacent to or configured to obtain information from each joint. This combination of feedback, data, and/or information can be used to control the actuation of the finger assemblies, potentially enabling the robot to perform complex manipulations that require delicate touch. While the tactile sensor assemblies may be primarily designed to be embedded in the distal assembly of the finger assemblies, it should be understood that: (i) the tactile sensor assemblies may be positioned at any location in the end effector (e.g., palm, finger, thumb), (ii) may not be embedded in the assembly; instead, may be integrally formed therewith or directly secured to an outer extent of said assembly, (iii) may be formed in a layer or external covering (e.g., textile assembly—namely, a glove) that is positioned on top of or over said assembly, and/or (iv) a combination of any one of the described options. Examples of possible combinations include: (i) a portion of the tactile sensor assembly positioned in the textile assembly (e.g., glove) and a portion of the tactile sensor assembly embedded within the end effector, (ii) a portion of the tactile sensor assembly secured to the exterior of the housing of said end effector and a portion of the tactile sensor assembly embedded within the end effector, (iii) a portion of the tactile sensor assembly positioned in the textile assembly (e.g., glove), a portion of the tactile sensor assembly secured to the exterior of the housing of said end effector, and a portion of the tactile sensor assembly embedded within the end effector, (iv) a portion of the tactile sensor assembly positioned in the textile assembly (e.g., glove), a portion of the tactile sensor assembly integrally formed with the exterior of the housing of said end effector, and a portion of the tactile sensor assembly embedded within the end effector, and/or (v) any combination of hybrid thereof.

The strain gauges included in the tactile sensor assemblies may be any type of strain gauge including: (i) linear strain gauges, (ii) double linear strain gauges, (iii) shear or torsional strain gauges, (iv) rosette strain gauges (T (or Tec) shaped, rectangular shaped, delta shaped, stacked), (v) diaphragm strain gauges, (vi) biaxial strain gauges, (vii) bi-directional strain gauges, (viii) stacked strain gauges, (ix) cross strain gauges, (x) double shear, (xi) circular, (xii) any hybrid or combination thereof, and/or (xi) any other suitable strain gauge type that is known to one of skill in the art. The strain gauges may be arranged in different configurations including: (i) quarter-bridge configurations, (ii) half-bridge configurations, and/or (iii) full-bridge configurations. The strain gauges may also be foil strain gauges, semiconductor strain gauges, thin-film strain gauges, ink based strain gauges, thick-film strain gauges, optical, nano composite, and/or any combination or hybrid thereof. Further, the strain gauges may be directly integrated into the housings (interior or exterior), coupled to said housings (interior or exterior) after the housing is manufactured, coupled to another structure (e.g., bridge, spring, etc.) positioned within the housing, integrated into or coupled to the motor or motor housing, positioned between housings, and/or any other known configuration or combination thereof.

The foil strain gauges may be made from or include: (i) foils that may be or may include constantan (copper-nickel alloy) karma (nickel-chromium alloy) isoelastic (nickel-iron alloy) evanohm (nickel-chromium alloy) nichrome v (nickel-chromium alloy), and (ii) carrier that may be or may include polyimide film, epoxy or phenolic resin, glass-fiber reinforced epoxy, ceramic backing, and/or polyurethane. Finally, the strain gauges may be any gauge that meets, uses, and/or was tested with at least one of the flowing standards: ASTM E251-13 (2018), Standard Test Methods for Performance Characteristics of Metallic Bonded Resistance Strain Gages, ASTM International, ISO 376:2011, Metallic materials—Calibration of force-proving instruments used for the verification of uniaxial testing machines, ISO 9513:2012, Metallic materials—Calibration of extensometer systems used in uniaxial testing, VDI/VDE 2635 Blatt 2, Experimental structural analysis-Recommendation on the implementation of strain measurements at high temperatures, IEC 61298-3:1998, Process measurement and control devices—General methods and procedures for evaluating performance-Part 3: Tests for the effects of influence quantities, DIN 51301, which is hereby incorporated by reference for all purposes. The strain gauges may be used in combination with other sensors in the sensing assembly or at alternate locations in the robot. Other sensors or technology that may replace or be added to the tactile sensor assembles are discussed below.

It should be understood that other sensors and/or technology may be used instead of or in combination with the sensor assemblies discussed above. Other strain gauge technology that may be used includes: (i) mems-based strain gauges, (ii) nanocomposite strain gauges, (iii) thin-film or thick-film strain gauges (e.g., C4A Series or EA Series from Vishay Precision Group, RF9 Series or Y Series from Hottinger Bruel & Kjær, KFG Series or KFR Series from Kyowa Electronic Instruments, TFSG Series from BCM Sensor Technologies, SGT Series or KFH Series from Omega Engineering, ELF Series or EPL Series from Meggitt Sensing Systems, or any other known manufacture), (iv) inductive strain gauges, (v) capacitive strain gauges, (vi) piezoelectric strain gauges, (vii) optical fiber strain gauges, (viii) semiconductor strain gauges, and/or (ix) a hybrid or combination thereof. The strain gauges may provide measurements with high accuracy, but may lack high resolution. The additional sensors used in combination with the strain gauges in the sensor assembly may help provide a higher resolution. Alternative or additional sensors/technology may include photodiodes, Hall Effect sensors, capacitive sensors, piezoelectric sensors, piezoresistive sensors, optical sensors, force-sensitive resistors (FSRs), magnetic sensors, inductive sensors, micro-electro-mechanical systems (MEMS) sensors, dielectric elastomer sensors, quantum tunneling composite (QTC) sensors, fiber Bragg grating sensors, ultrasonic sensors, thermal sensors, electroactive polymers, triboelectric nanogenerators (TENGs), linear variable differential transformers (LVDTs), flex sensors, acoustic emission sensors, resistive touch sensors, proximity sensors, hydrogel-based sensors, smart skin technologies, magnetoelastic sensors, capacitive micromachined ultrasonic transducers (CMUTs), pressure-sensitive adhesives, electromagnetic acoustic transducers (EMATs), photonic crystal sensors, laser doppler vibrometers, electrical impedance tomography sensors, graphene-based sensors, nanowire sensors, electronic skin (e-skin) sensors, carbon nanotube-based sensors, barometric pressure sensors, eddy current sensors, microfluidic tactile sensors, nanogenerators, stretchable electronic sensors, force torque sensors, rheological sensors, haptic feedback sensors, polymer nanofiber sensors, ionic liquid-based sensors, thermocouple sensors, touch-sensitive field-effect transistors, terahertz radiation sensors, radar sensors, LIDAR sensors, infrared touch sensors, humidity sensors, mechanical limit switches, pressure mapping sensors, distributed fiber optic sensors, magnetostrictive sensors, optoelectronic sensors, surface acoustic wave (SAW) sensors, capaciflectance sensors, tribo-skin sensors, spintronic sensors, photonic touch sensors, acoustic resonant sensors, and capacitive tomography sensors, or any other suitable technology that is known to one of skill in the art.

As is known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer. In operation, the code is stored within the general-purpose computer platform. At other times, however, the software may be stored at other locations and/or transported for loading into the appropriate general-purpose computer system.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute the processing load.

Hence, aspects of the disclosed methods and systems outlined above may be embodied in programming. Program aspects of the technology may be thought of as "products" or "articles of manufacture" typically in the form of executable code and/or associated data that is carried on or embodied in a type of machine-readable medium. "Storage" type media includes any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the disclosed methods and systems. Volatile storage media include dynamic memory, such as the main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims. It should also be understood that substantially utilized herein means a deviation less than 15% and preferably less than 5%. It should also be understood that other configuration or arrangements of the above-described components is contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

In this Application, to the extent any U.S. patents, U.S. patent applications, or other materials (e.g., articles) have been incorporated by reference, the text of such materials is only incorporated by reference to the extent that they do not conflict with materials, statements and drawings set forth herein. In the event of such conflict, the text of the present document controls, and terms in this document should not be given a narrower reading in virtue of the way in which those terms are used in other materials incorporated by reference. It should also be understood that structures and/or features not directly associated with a robot cannot be adopted or implemented into the disclosed humanoid robot without careful analysis and verification of the complex realities of designing, testing, manufacturing, and certifying a robot for completion of usable work nearby and/or around humans. Theoretical designs that attempt to implement such modifications from non-robotic structures and/or features are insufficient (and in some instances, woefully insufficient) because they amount to mere design exercises that are not tethered to the complex realities of successfully designing, manufacturing and testing a robot.

The invention claimed is:

1. A finger assembly for an underactuated end effector for a humanoid robot, the finger assembly comprising:
a motor including a motor shaft with a motor shaft axis, wherein the motor shaft is configured to rotate about the motor shaft axis;
a worm drive gear coupled to the motor shaft, wherein the worm drive gear has a worm drive gear axis that is coaxial with the motor shaft axis, and wherein the worm drive gear is configured for rotation with the motor shaft;
a worm wheel in geared engagement with the worm drive gear, wherein the worm wheel has a worm wheel axis that is arranged perpendicular to the worm drive gear axis, and wherein the worm wheel is configured for rotation about the worm wheel axis in response to rotation of the worm drive gear about the worm drive gear axis;
a worm drive link fixedly connected to the worm wheel and rotatable about the worm wheel axis in response to rotation of the worm wheel about the worm wheel axis;
a proximal drive link pivotably connected to the worm drive link and moveable in response to rotation of the worm drive link; and
a main proximal link having a proximal link pivot axis that is coaxial with the worm wheel axis, wherein the main proximal link is rotatable about the worm wheel axis independently from rotation of the worm wheel.

2. The finger assembly of claim 1, the finger assembly further comprising:
a medial housing assembly having an internal cavity;
a distal housing assembly including: (i) a rear external surface with a first end positioned adjacent to the medial housing assembly when the finger assembly is in an uncurled state, and (ii) a rearwardly extending distal tongue that has an upper surface that is offset inwardly from the rear external surface; and
wherein, when the finger assembly is in the uncurled state, a majority of the tongue is positioned within the internal cavity of the medial housing assembly.

3. The finger assembly of claim 1, wherein the finger assembly is designed to be encased within a textile covering.

4. The finger assembly of claim 1, wherein the finger assembly further comprises a biasing member having both a first extent connected to the main proximal link and a second extent connected to the proximal drive link, and wherein the biasing member is configured to bias the proximal drive link toward an uncurled state.

5. The finger assembly of claim 1, wherein the finger assembly further includes:
a knuckle assembly;
a proximal assembly pivotably coupled to the knuckle assembly and having a medial end, and wherein said proximal assembly includes the main proximal link and the proximal drive link;
a medial assembly pivotably coupled to the medial end of the proximal assembly and having a distal end;
a distal assembly pivotably coupled to the distal end of the medial assembly;
a metacarpophalangeal joint formed between the knuckle assembly and the proximal assembly;
a proximal finger interphalangeal joint formed between the proximal assembly and the medial assembly; and
a distal finger interphalangeal joint formed between the medial assembly and the distal assembly.

6. The finger assembly of claim 5, further comprising:
a first finger encoder positioned proximate to the metacarpophalangeal joint and configured to collect data related to rotation of the metacarpophalangeal joint; and
a second finger encoder positioned proximate to the proximal finger interphalangeal joint and configured to collect data related to rotation of the proximal finger interphalangeal joint.

7. The finger assembly of claim 5, wherein:
an extent of the proximal assembly is configured to be directly driven about a metacarpophalangeal joint axis between: (i) a first curling direction by the motor, and (ii) a second uncurling direction by the motor;
an extent of the medial assembly is configured to be indirectly driven about a proximal finger interphalangeal joint axis between: (i) the first curling direction by the motor, and (ii) the second uncurling direction by a biasing member; and
an extent of the distal assembly is configured to be indirectly driven about a distal finger interphalangeal joint axis between: (i) the first curling direction by the motor, and (ii) the second uncurling direction by the motor.

8. The finger assembly of claim 1, wherein the main proximal link includes a proximal link recess configured to selectively receive both at least a portion of the worm drive link and at least a portion of the proximal drive link.

9. The finger assembly of claim 1, further comprising a knuckle assembly positioned between the motor and the main proximal link, wherein the knuckle assembly includes a worm wheel interface that allows the main proximal link to rotate about the worm wheel axis independently from rotation of the worm wheel.

10. The finger assembly of claim 9, wherein the main proximal link includes a limiting interface region configured to contact a portion of the knuckle assembly to limit rotation of the main proximal link.

11. The finger assembly of claim 1, wherein the main proximal link is configured to stop rotating when contacting a resistance point while the worm wheel continues to rotate.

12. The finger assembly of claim 1, wherein the finger assembly lacks articulation cables for actuating movement of the finger assembly.

13. The finger assembly of claim 1, wherein the finger assembly includes a distal link assembly having a tip assembly configured to accept interchangeable tip members.

14. The finger assembly of claim 1, wherein the finger assembly includes a distal housing assembly having a distal jacket assembly with: a top member made from a first material, and a bottom member made from a second material that is softer than the first material.

15. The finger assembly of claim 1, further comprising a medial link pivotably connected to a proximal drive link and including a medial link recess configured to receive an extent of a medial drive link; and
the medial drive link pivotably connected to the medial link within the medial link recess by at least one first pivotable coupling located on a first side of a sagittal plane extending through the finger assembly and at least one second pivotable coupling located on a second side of the sagittal plane.

16. An underactuated end effector for a humanoid robot, the underactuated end effector comprising:
a frame;
a plurality of finger assemblies removably connected to the frame, each finger assembly of the plurality of finger assemblies comprising:
a motor assembly including: a motor having a motor housing, and a motor shaft rotatable about a motor shaft axis;
a worm drive gear coupled to the motor shaft and configured for rotation about: the motor shaft axis, and a worm drive gear axis, and wherein the motor shaft axis and the worm drive gear axis are arranged coaxially to each other;
a worm wheel in geared engagement with the worm drive gear and configured for rotation about a worm wheel axis in response to rotation of the worm drive gear, and wherein the worm wheel axis is arranged perpendicular to the worm drive gear axis;
a worm drive link having a first end and a second end, and wherein the first end of the worm drive link is fixedly connected to the worm wheel whereby the worm drive link is rotatable about the worm wheel axis in response to rotation of the worm wheel about the worm wheel axis;
a proximal drive link having a first end and a second end, and wherein the first end of the proximal drive link is pivotably connected to the second end of the worm drive link; and
a biasing member configured to bias an extent of the proximal drive link toward a first location, and wherein said extent of the proximal drive link is in the first location when the finger assembly is in an uncurled state.

17. The underactuated end effector of claim 16, wherein a finger assembly of the plurality of finger assemblies includes: (i) a proximal housing assembly with an internal proximal recess, and (ii) a medial housing assembly with a tongue;
wherein said tongue is positioned within the internal proximal recess of the proximal housing assembly when the finger assembly is in the uncurled state; and
wherein said tongue is not positioned within the internal proximal recess of the proximal housing assembly when the finger assembly is in a curled state.

18. The underactuated end effector of claim 16, wherein a finger assembly of the plurality of finger assemblies includes further includes:
a proximal assembly that includes the worm drive link, the proximal drive link and a main proximal link;
a knuckle positioned adjacent to the proximal assembly;
a metacarpophalangeal joint located between the knuckle and the proximal assembly; and
a first finger encoder configured to collect data related to rotation of the metacarpophalangeal joint.

19. The underactuated end effector of claim 16, further comprising a medial link pivotably connected to the proximal drive link and including a medial link recess configured to receive an extent of a medial drive link; and
the medial drive link pivotably connected to the medial link within the medial link recess by at least one first pivotable coupling located on a first side of a sagittal plane extending through the finger assembly and at least one second pivotable coupling located on a second side of the sagittal plane.

20. The underactuated end effector of claim 16, wherein the end effector includes more than twelve degrees of freedom and less than eight motors.

21. The underactuated end effector of claim 16, wherein each finger assembly of the plurality of finger assemblies lacks a mechanical cable configured to actuate any component of the finger assembly.

22. The underactuated end effector of claim 16, wherein each finger assembly of the plurality of finger assemblies are configured to be swappable with every other finger assembly of the plurality of finger assemblies that is removably connected to the frame.

23. The underactuated end effector of claim 16, wherein in the uncurled state, each finger assembly is angularly offset within a single plane with respect to every other finger assembly of the plurality of finger assemblies.

24. The underactuated end effector of claim 16, wherein the finger assembly includes a distal housing assembly having a distal jacket assembly with: a top member made from a first material, and a bottom member made from a second material that is softer than the first material.

25. The underactuated end effector of claim 16, wherein the finger assembly includes a distal link assembly having a tip assembly with interchangeable tip members.

26. The underactuated end effector of claim 16, further comprising a main proximal link pivotably connected to the worm drive link, and wherein the main proximal link is configured to stop rotating when contacting a resistance point while the worm wheel continues to rotate.

27. The underactuated end effector of claim 16, wherein the end effector is designed to be encased within a textile covering.

* * * * *